(12) United States Patent
Takahashi et al.

(10) Patent No.: US 9,330,320 B2
(45) Date of Patent: May 3, 2016

(54) OBJECT DETECTION APPARATUS, OBJECT DETECTION METHOD, OBJECT DETECTION PROGRAM AND DEVICE CONTROL SYSTEM FOR MOVEABLE APPARATUS

(71) Applicants: Sadao Takahashi, Kanagawa (JP); Soichiro Yokota, Kanagawa (JP); Tomoko Ishigaki, Kanagawa (JP)

(72) Inventors: Sadao Takahashi, Kanagawa (JP); Soichiro Yokota, Kanagawa (JP); Tomoko Ishigaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/682,496

(22) Filed: Apr. 9, 2015

(65) Prior Publication Data

US 2015/0294160 A1    Oct. 15, 2015

(30) Foreign Application Priority Data

Apr. 10, 2014  (JP) .................................. 2014-081390
Mar. 25, 2015  (JP) .................................. 2015-062340

(51) Int. Cl.

| G06K 9/00 | (2006.01) |
|---|---|
| G06K 9/46 | (2006.01) |
| G06T 7/20 | (2006.01) |
| G06T 7/00 | (2006.01) |

(Continued)

(52) U.S. Cl.
CPC .............. *G06K 9/00791* (2013.01); *G06K 9/46* (2013.01); *G06T 7/0042* (2013.01); *G06T 7/20* (2013.01); *G06T 11/206* (2013.01); *H04N 13/0203* (2013.01); *G06K 2009/4666* (2013.01); *H04N 2013/0081* (2013.01)

(58) Field of Classification Search
CPC .......... G06K 9/00791; G06K 9/00797; G06K 9/00798; G06K 9/46; G06K 2009/4666; G06T 11/206; G06T 7/20; G06T 7/0042; G06T 2207/10016; G06T 2207/30256; B60R 1/00; G08G 1/04; H04N 13/0203; H04N 2013/0081

See application file for complete search history.

(56) References Cited

U.S. PATENT DOCUMENTS 6,384,414 B1 * 5/2002 Fisher ....................... G01J 5/08
                                                       250/339.05
7,132,975 B2 * 11/2006 Fullerton ............ G01S 13/0209
                                                       342/106

(Continued)

FOREIGN PATENT DOCUMENTS

| JP | 11-351862 | 12/1999 |
|---|---|---|
| JP | 2010-271964 | 12/2010 |

(Continued)

*Primary Examiner* — Amir Alavi
(74) *Attorney, Agent, or Firm* — Oblon, McClelland, Maier & Neustadt, L.L.P.

(57) ABSTRACT

An object detection apparatus mountable to a moveable apparatus for detecting an object existing outside the moveable apparatus by capturing a plurality of images using a plurality of imaging devices mounted to the moveable apparatus and generating a disparity image from the captured images includes a map generator to generate a map indicating a frequency profile of disparity values correlating a horizontal direction distance of the object with respect to a movement direction of the moveable apparatus, and a distance to the object in the movement direction of the moveable apparatus based on the disparity image, an isolated area detection unit to detect an isolated area based on the frequency profile, an isolated area divider to divide the isolated area into two or more isolated areas based on the frequency profile in the isolated area, and an object detector to detect an object based on the divided isolated area.

10 Claims, 53 Drawing Sheets

(51) Int. Cl.
*G06T 11/20* (2006.01)
*H04N 13/02* (2006.01)
*H04N 13/00* (2006.01)

(56) References Cited

U.S. PATENT DOCUMENTS

| | | | |
|---|---|---|---|
| 7,852,492 B2 * | 12/2010 | Berner | G01B 11/2513 |
| | | | 356/605 |
| 9,229,102 B1 * | 1/2016 | Wright | G01S 13/888 |
| 2007/0076984 A1 | 4/2007 | Takahashi et al. | |
| 2007/0195070 A1 | 8/2007 | Takahashi et al. | |
| 2007/0195370 A1 | 8/2007 | Suga et al. | |
| 2012/0242835 A1 | 9/2012 | Li et al. | |
| 2013/0129148 A1 | 5/2013 | Nanri et al. | |
| 2014/0309841 A1 * | 10/2014 | Hara | G05D 1/024 |
| | | | 701/26 |
| 2014/0319349 A1 * | 10/2014 | Horie | G01J 1/44 |
| | | | 250/338.3 |
| 2015/0049195 A1 | 2/2015 | Ishigaki et al. | |
| 2015/0294160 A1 * | 10/2015 | Takahashi | G06K 9/00791 |
| | | | 382/104 |

FOREIGN PATENT DOCUMENTS

| | | |
|---|---|---|
| JP | 2014-006885 | 1/2014 |
| WO | WO2012/017650 A1 | 2/2012 |

* cited by examiner

CAPTURED IMAGE

V MAP

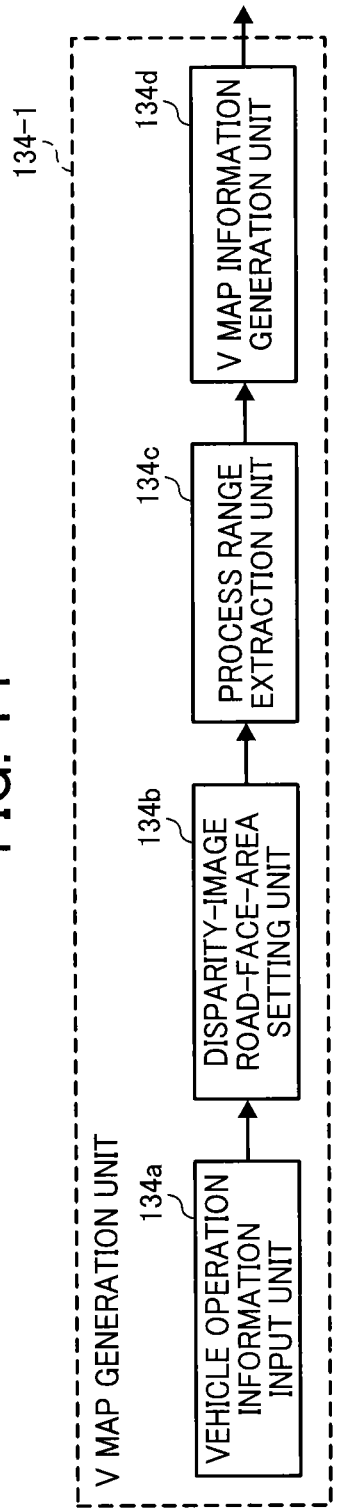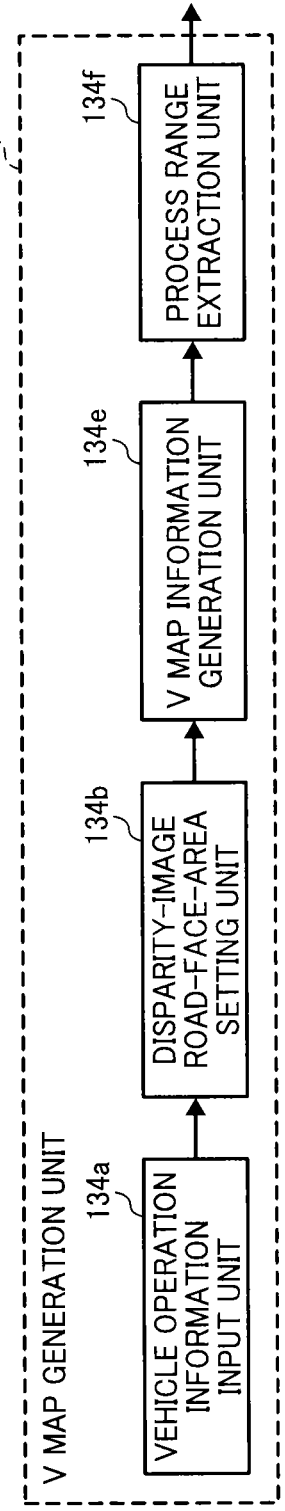

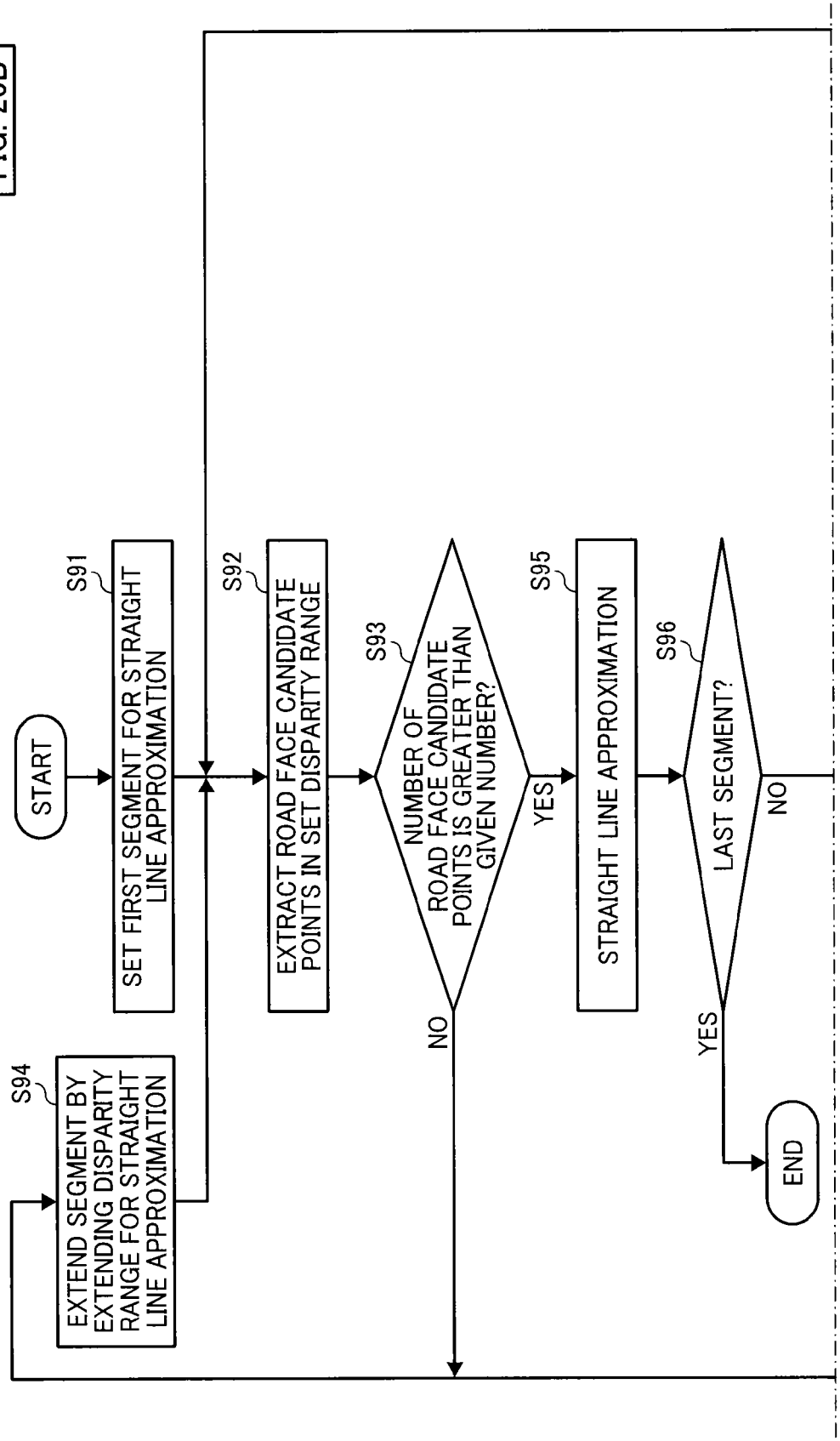

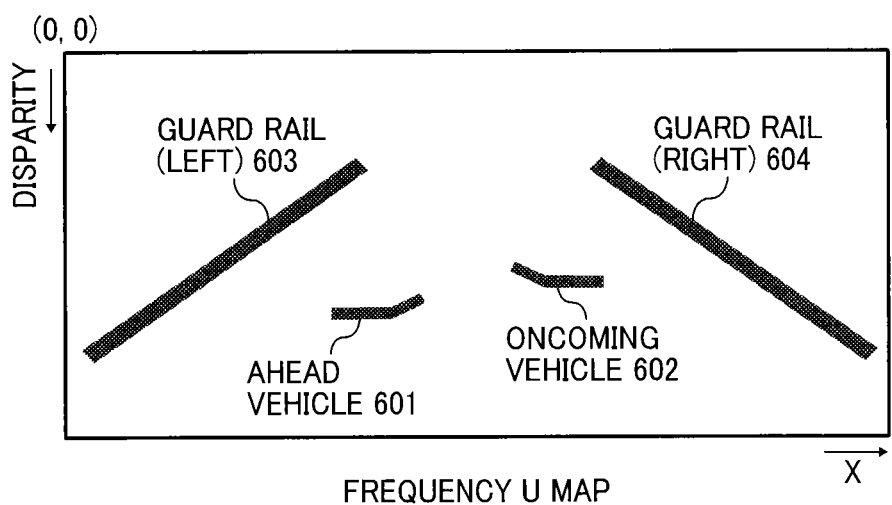
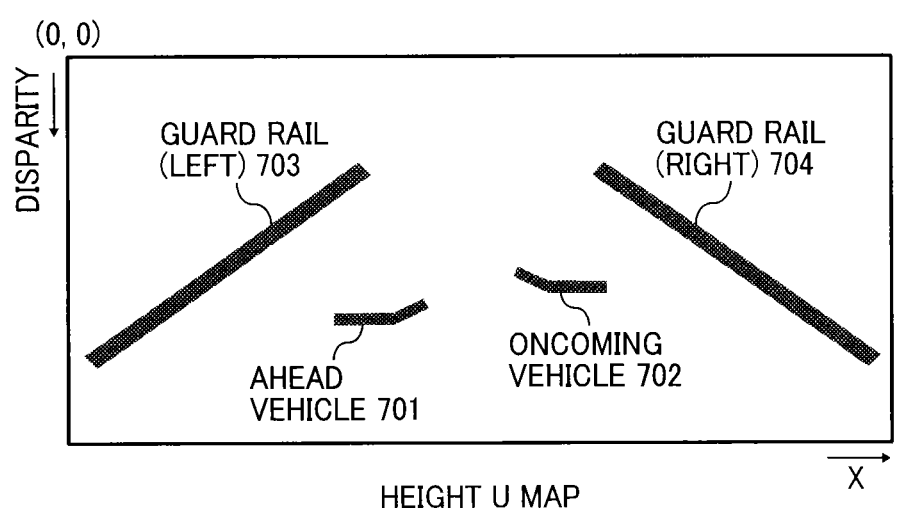

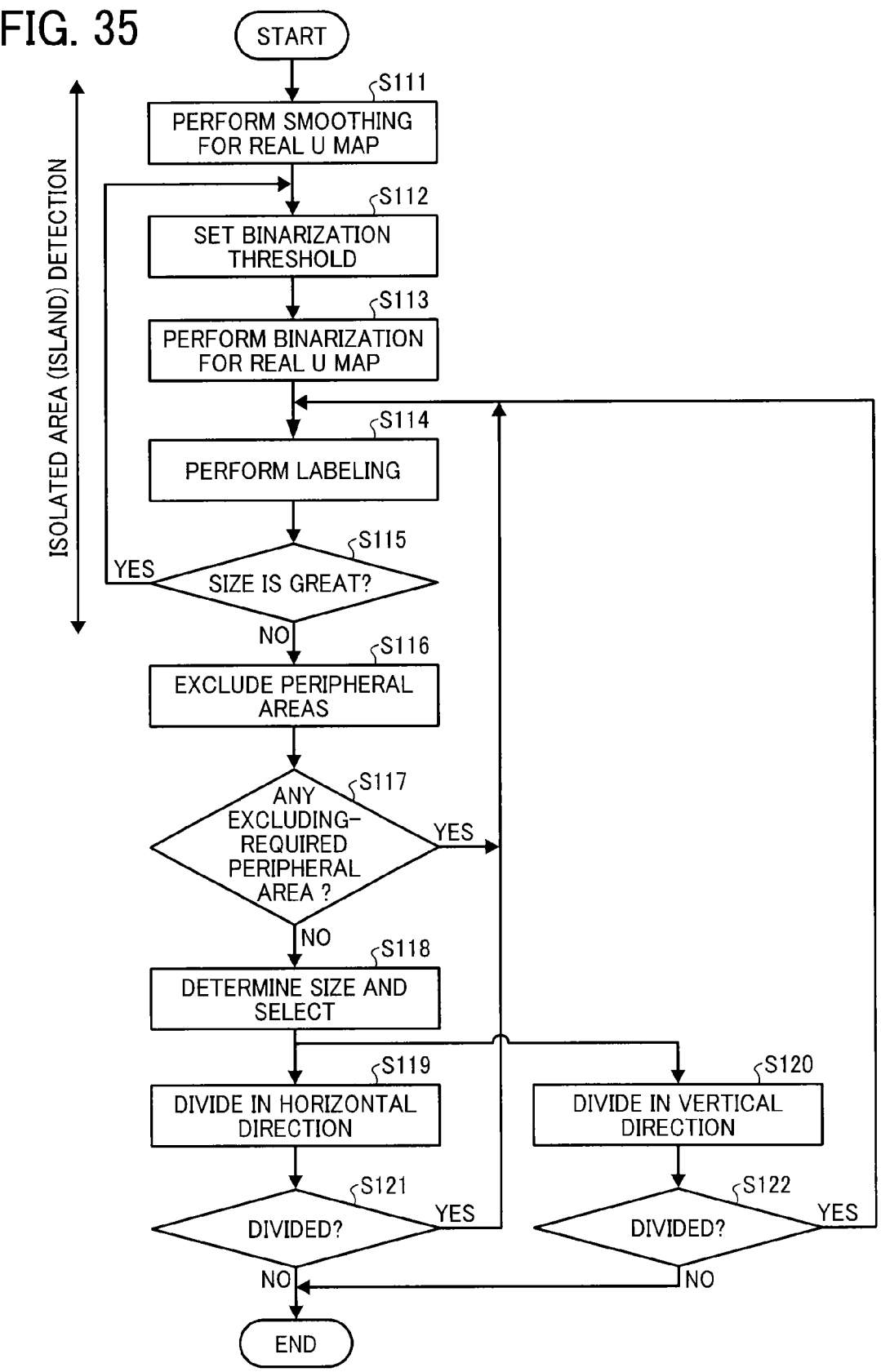

☒ FREQUENCY: SMALL

☒ FREQUENCY: LARGE

☒ HEIGHT: LOW

☒ HEIGHT: HIGH

▦ LOW HEIGHT AREA EXCLUDED BY EXCLUDING RIGHT AREA

▨ LOW HEIGHT AREA EXCLUDED BY EXCLUDING LEFT AREA

▩ LOW HEIGHT AREA EXCLUDED BY EXCLUDING NEAR SIDE AREA

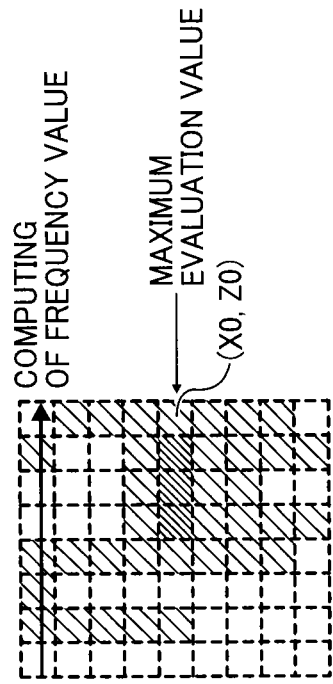
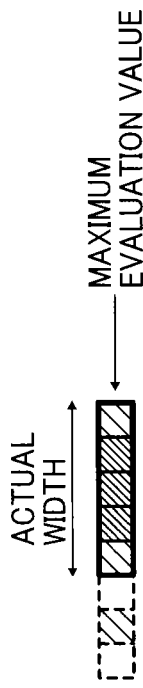
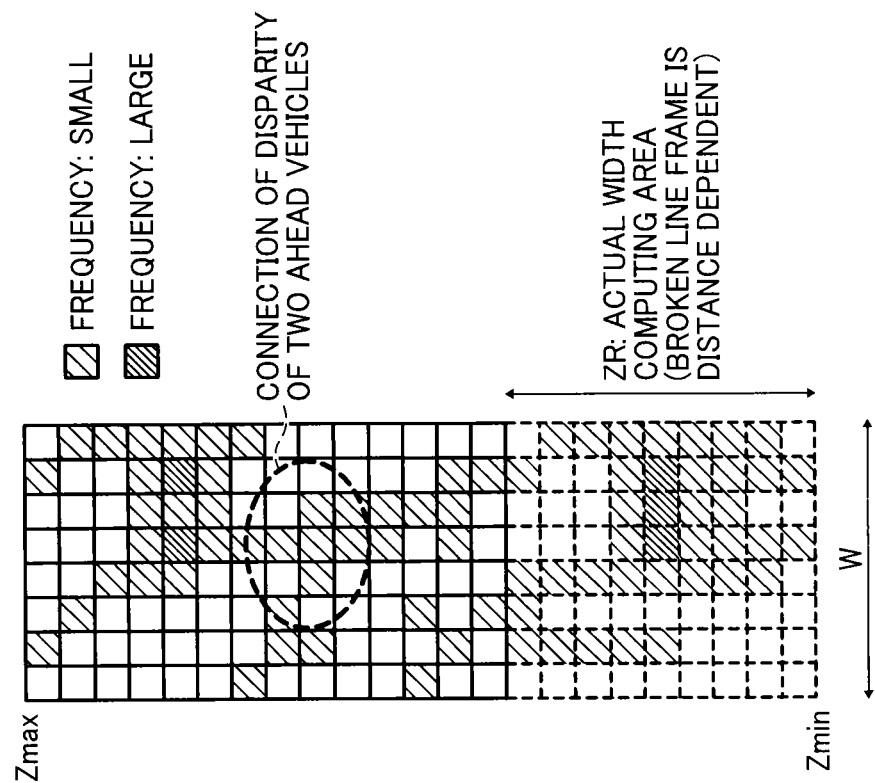

| OBJECT TYPE | WIDTH | HEIGHT | DEPTH |
|---|---|---|---|
| MOTOR CYCLE, BICYCLE | < 1100 | < 2500 | > 1000 |
| PEDESTRIAN | < 1100 | < 2500 | ≤ 1000 |
| SMALL CAR | < 1700 | < 1700 | < 10000 |
| MEDIUM CAR | < 1700 | < 2500 | < 10000 |
| TRUCKS | < 3500 | < 3500 | < 15000 |
| OTHERS | OBJECT HAVING OTHER SIZE | | |

UNIT (mm)

ically vertical edges or strong texture with high precision, but the block matching method detects disparity at substantially horizontal edges with lower precision, in particular, cannot detect disparity at substantially horizontal edges.

OBJECT DETECTION APPARATUS, OBJECT DETECTION METHOD, OBJECT DETECTION PROGRAM AND DEVICE CONTROL SYSTEM FOR MOVEABLE APPARATUS

CROSS-REFERENCE TO RELATED APPLICATION

This application claims priority pursuant to 35 U.S.C. §119 (a) to Japanese Patent Application Nos. 2014-081390, filed on Apr. 10, 2014 and 2015-062340, filed on Mar. 25, 2015 in the Japan Patent Office, the disclosure of which are incorporated by reference herein in their entirety.

BACKGROUND

1. Technical Field

The present invention relates to an object detection apparatus, an object detection method, an object detection program, and a device control system for moveable apparatus to detect an object ahead of a moveable apparatus based on a plurality of captured images captured by a plurality of image capturing units, and to control devices mounted to the moveable apparatus using a detection result.

2. Background Art

Safety technologies have been developed for automobiles. For example, body structures of automobiles have been developed to protect pedestrians, and drivers/passengers when automobile collisions occur. Recently, technologies that can detect pedestrians and automobiles with a faster processing speed have been developed with the advancement of information processing technologies and image processing technologies. These technologies have been applied to automobiles to automatically activate brakes before collisions to prevent the collisions. The automatic braking requires a correct range finding or distance measurement to passengers and/or automobiles, and the range finding can be performed using millimeter-wave radar, laser radar, and stereo cameras.

To correctly detect positions and sizes of objects such as pedestrians and automobiles in three dimensional space by using stereo cameras, disparity in the horizontal direction is required to be detected correctly, and a block matching method can be used for detecting disparity.

The block matching method can detect disparity at substantially vertical edges or strong texture with high precision, but the block matching method detects disparity at substantially horizontal edges with lower precision, in particular, cannot detect disparity at substantially horizontal edges.

Therefore, it is difficult to detect an object such as an ahead automobile as one object by stereo imaging. Since automobiles have a box-shaped objects composed of vertical lines at the left and right sides and horizontal lines connecting the vertical lines, the block matching method can only detect disparity of the vertical lines at the left and right sides of objects, and thereby one object (one automobile) may be recognized or detected as two objects (two automobiles) running side by side.

SUMMARY

In one aspect of the present invention, an object detection apparatus mountable to a moveable apparatus for detecting an object existing outside the moveable apparatus by capturing a plurality of images using a plurality of imaging devices mounted to the moveable apparatus and generating a disparity image from the captured images is devised. The object detection apparatus includes a map generator to generate a map indicating a frequency profile of disparity values correlating a horizontal direction distance of the object with respect to a movement direction of the moveable apparatus, and a distance to the object in the movement direction of the moveable apparatus based on the disparity image, an isolated area detection unit to detect an isolated area based on the frequency profile, an isolated area divider to divide the isolated area into two or more isolated areas based on the frequency profile in the isolated area, and an object detector to detect an object based on the divided isolated area.

In another aspect of the present invention, a method of detecting an object, existing outside a moveable apparatus by capturing a plurality of images using a plurality of imaging devices mounted to the moveable apparatus and generating a disparity image from the captured images is devised. The method includes the steps of generating a map indicating a frequency profile of disparity values correlating a horizontal direction distance of the object with respect to a movement direction of the moveable apparatus, and a distance to the object in the movement direction of the moveable apparatus based on the disparity image, detecting an isolated area based on the frequency profile, dividing the isolated area based on the frequency profile in the isolated area, and detecting an object based on the divided isolated area.

In another aspect of the present invention, a non-transitory computer-readable storage medium storing a program that, when executed by a computer, causes the computer to execute a method of detecting an object, existing outside a moveable apparatus by capturing a plurality of images using a plurality of imaging devices mounted to the moveable apparatus and generating a disparity image from the captured images is devised. The method includes the steps of generating a map indicating a frequency profile of disparity values correlating a horizontal direction distance of the object with respect to a movement direction of the moveable apparatus, and a distance to the object in the movement direction of the moveable apparatus based on the disparity image, detecting an isolated area based on the frequency profile, dividing the isolated area based on the frequency profile in the isolated area, and detecting an object based on the divided isolated area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 5A to 5E illustrate an example image for interpolation processing of disparity image, in which FIG. 5A is an example of a captured image, FIG. 5B is an example of a disparity image, and FIGS. 5C, 5D, and 5E are schematic images for explaining conditions for executing interpolation processing of disparity image;

FIG. 14 is a block diagram of a process performable in a V map generation unit of FIG. 4;

FIG. 15 is another block diagram of a process performable in a V map generation unit of FIG. 4;

FIGS. 25A and 25B are a flowchart showing the steps of a process of approximation of lines of segments performable by a segment line approximation unit;

FIG. 32 illustrates U maps corresponding to the image of FIG. 31, in which FIG. 32A illustrates a frequency U map, and FIG. 32B illustrates a height U map;

FIG. 35 is a flowchart showing the steps of a process of detecting an object candidate area performable by an object candidate area detection unit;

FIG. 37 is a real U map showing a process of excluding peripheral areas, in which

FIG. 39 illustrates a process of dividing in the horizontal direction horizontal direction dividing, in which

FIG. 42 illustrates a process of dividing a disparity image in the vertical direction, in which FIG. 42A is an example of a real frequency U map after performing a smoothing, in which two ahead vehicles running on a next lane are detected as one isolated area, FIG. 42B is a computing process of each line in an actual width computing area, FIG. 42C is a computing process of each line in an actual width computing area.

Figure 1:
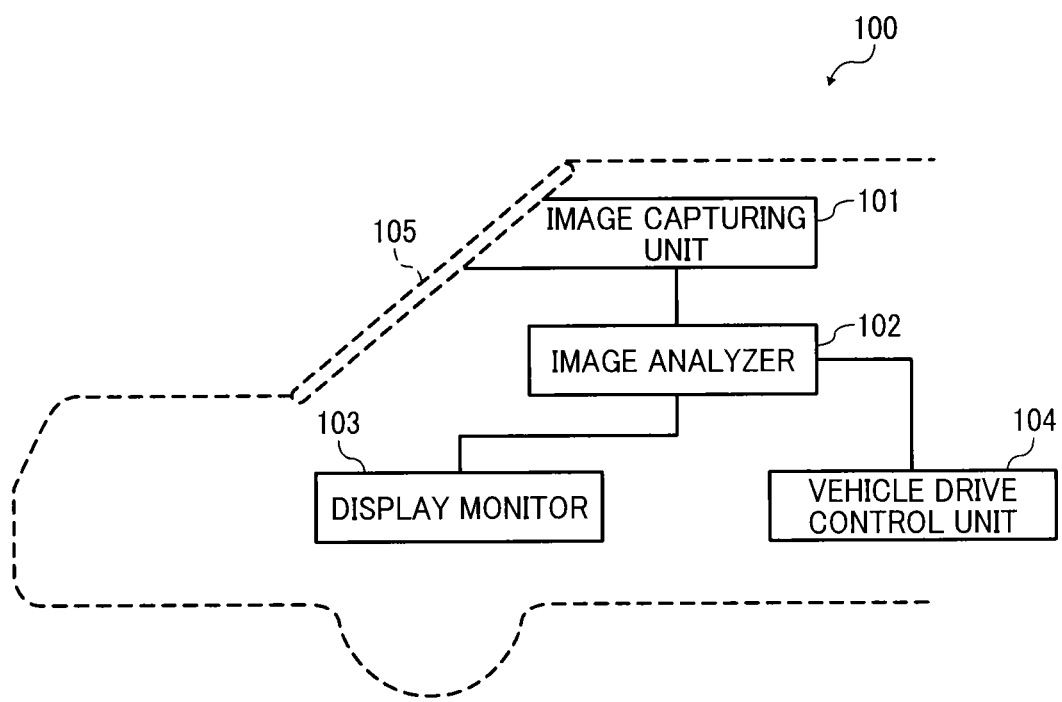
FIG. 1 is a schematic view a vehicle-mounted device control system according to one or more example embodiments.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, apparatus or system according to one or more example embodiments are described hereinafter.

A description is given of a device control system for a moveable apparatus employing an object detection apparatus according to one or more example embodiments of the present invention. The movable apparatus can be vehicles such as automobiles, ships, airplanes, motor cycles, robots, or the like. Further, the object detection apparatus according to one or more example embodiments can be applied to non-movable apparatuses such as factory robots, monitoring cameras, surveillance cameras or the like that are fixed at one position, area, or the like. Further, the object detection apparatus according to one or more example embodiments can be applied to other apparatuses as required.

(Overview of Vehicle-Mounted Device Control System)

FIG. 1 illustrates a schematic configuration of a vehicle-mounted device control system according to one or more example embodiments. In this description, the vehicle-mounted device control system is described as an example of a device control system for a moveable apparatus. The vehicle-mounted device control system can be mounted to a vehicle 100, which is an example of a moveable apparatus, such as an automobile. As illustrated in FIG. 1, the vehicle-mounted device control system includes, for example, an image capturing unit 101, an image analyzer 102, a display monitor 103, and a vehicle drive control unit 104. The image capturing unit 101 is used as an image capturing device or unit to capture an image of an area or scene ahead of the vehicle 100 that can move (e.g., run) in a given direction. The area ahead of the vehicle 100 may be referred to as an image capturing area, a captured image area, or a captured image area ahead of the vehicle, as required. Based on the captured image data ahead of the vehicle 100 captured by the image capturing unit 101, the vehicle-mounted device control system can detect relative height information such as relative slope information at each point on a road face ahead of the vehicle 100, and can detect a three dimensional shape of road ahead of the vehicle 100 based on the detection result, and then the vehicle-mounted device control system can control the vehicle-mounted devices based on the detected three dimensional shape of road.

The image capturing unit 101 is mounted, for example, near a rear-view mirror disposed at a windshield 105 of the vehicle 100. Various data such as image data captured by the image capturing unit 101 is input to the image analyzer 102 used as an image processing unit. The image analyzer 102 analyzes the data, transmitted from the image capturing unit 101, in which the image analyzer 102 detects relative height at each point (referred to as position information) on a road face ahead of the vehicle 100, and detects a three dimensional shape of road ahead of the vehicle 100, in which the relative height is a height from the road face where the vehicle 100 is running such as the road face right below the vehicle 100.

Further, the analysis result of the image analyzer 102 is transmitted to the vehicle drive control unit 104. The display monitor 103 displays image data captured by the image capturing unit 101, and the analysis result of the image analyzer 102. The vehicle drive control unit 104 recognizes a recognition target object such as pedestrians, other vehicles, and various obstacles ahead of the vehicle 100 based on a recognition result of relative slope condition of road face by the image analyzer 102. Then, the vehicle drive control unit 104 performs a cruise assist control based on the recognition or detection result of recognition target object such as pedestrians, other vehicles and various obstacles recognized or detected by using the image analyzer 102. Specifically, when the vehicle 100 is in a danger of collision with other object, the vehicle drive control unit 104 conducts the cruise assist control such as reporting a warning to a driver of the vehicle 100, and controlling the steering and brakes of the vehicle 100.

(Configuration of Image Capturing Unit and Image Analyzer)

Figure 2:
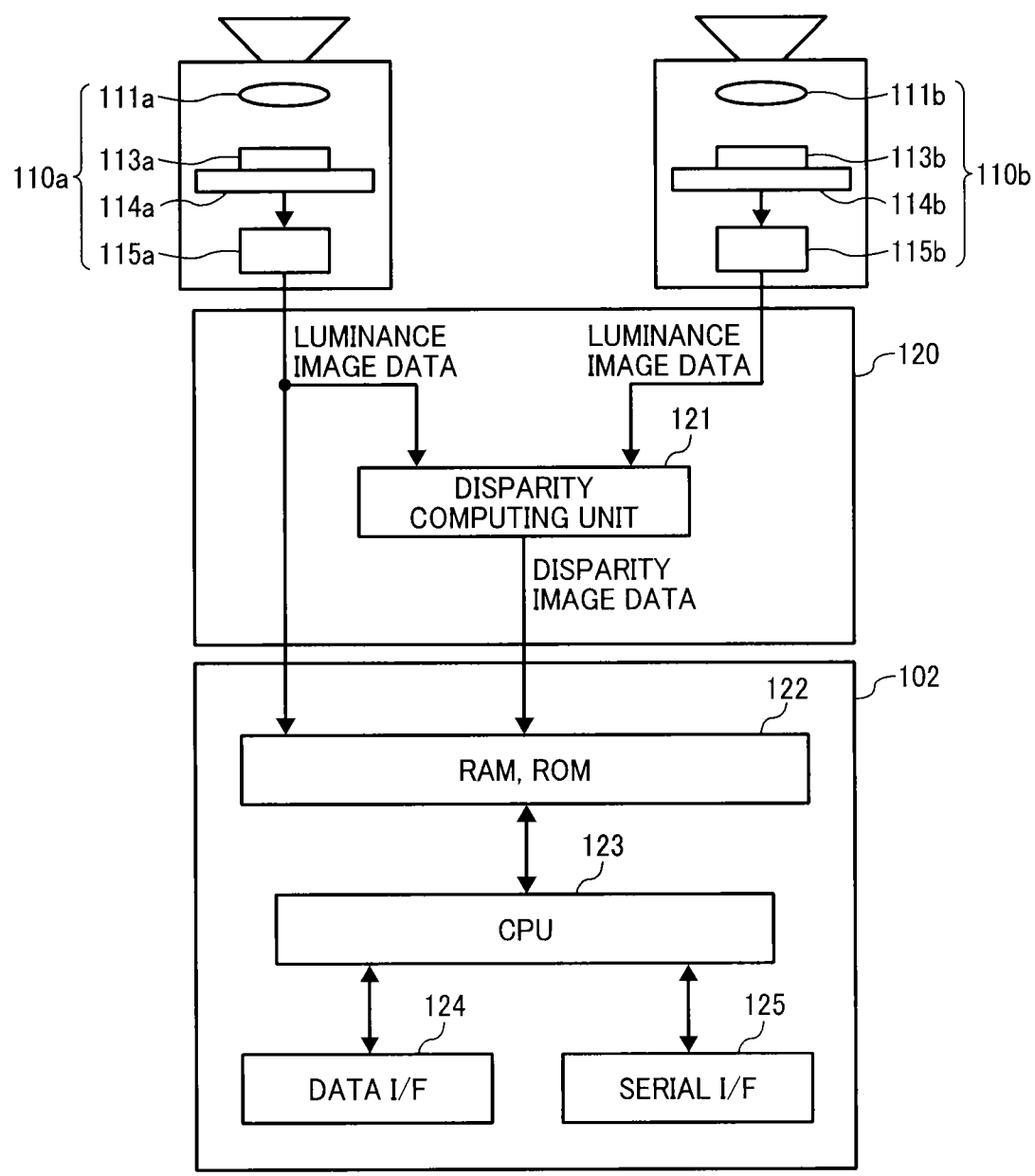
FIG. 2 is a schematic configuration of an image capturing unit and an image analyzer of the vehicle-mounted device control system of FIG. 1.

FIG. 2 illustrates a schematic configuration of the image capturing unit 101 and the image analyzer 102. The image capturing unit 101 is, for example, a stereo camera having two imaging devices such as a first capturing unit 110A and a second capturing unit 110B, in which the first capturing unit 110A and the second capturing unit 110B have the same configuration. The first capturing unit 110A is configured with a first capturing lens 111A, a first image sensor 113A, a first sensor board 114A, and a first signal processor 115A. The second capturing unit 110B is configured with a second capturing lens 111B, a second image sensor 113B, a second sensor board 114B, and a second signal processor 115B.

The first sensor board 114A is disposed with the first image sensor 113A having arranged image capturing elements (or light receiving elements) two-dimensionally, and the second sensor board 114B is disposed with the second image sensor 113B having arranged image capturing elements (or light receiving elements) two-dimensionally.

The first signal processor 115A converts analog electrical signals output from the first sensor board 114A (i.e., light quantity received by light receiving elements on the first image sensor 113A) to digital signals to generate captured image data, and outputs the captured image data. The second signal processor 115B converts analog electrical signals output from the second sensor board 114B (i.e., light quantity received by light receiving elements on the second image sensor 113B) to digital signals to generate captured image data, and outputs the captured image data. The image capturing unit 101 can output luminance image data and disparity image data.

Further, the image capturing unit 101 includes a processing hardware 120 employing, for example, a field-programmable gate array (FPGA). The processing hardware 120 includes a disparity computing unit 121 to obtain disparity image from luminance image data output from the first capturing unit 110A and the second capturing unit 110B. The disparity computing unit 121 computes disparity between an image captured by the first capturing unit 110A and an image captured by the second capturing unit 110B by comparing a corresponding image portion on the captured images. The disparity computing unit 121 can be used as a disparity information generation unit, which computes disparity values.

The disparity value can be computed by comparing one image captured by one of the first and second capturing units 110A and 110B as a reference image, and the other image captured by the other one of the first and second capturing units 110A and 110B as a comparing image. Specifically, a concerned image area or portion at the same point are compared between the reference image and the comparing image to compute a positional deviation between the reference image and the comparing image as a disparity value of the concerned image area or portion. A distance to the same point of the concerned image portion in the image capturing area can be computed by applying the fundamental of triangulation to the disparity value.

Figure 3:
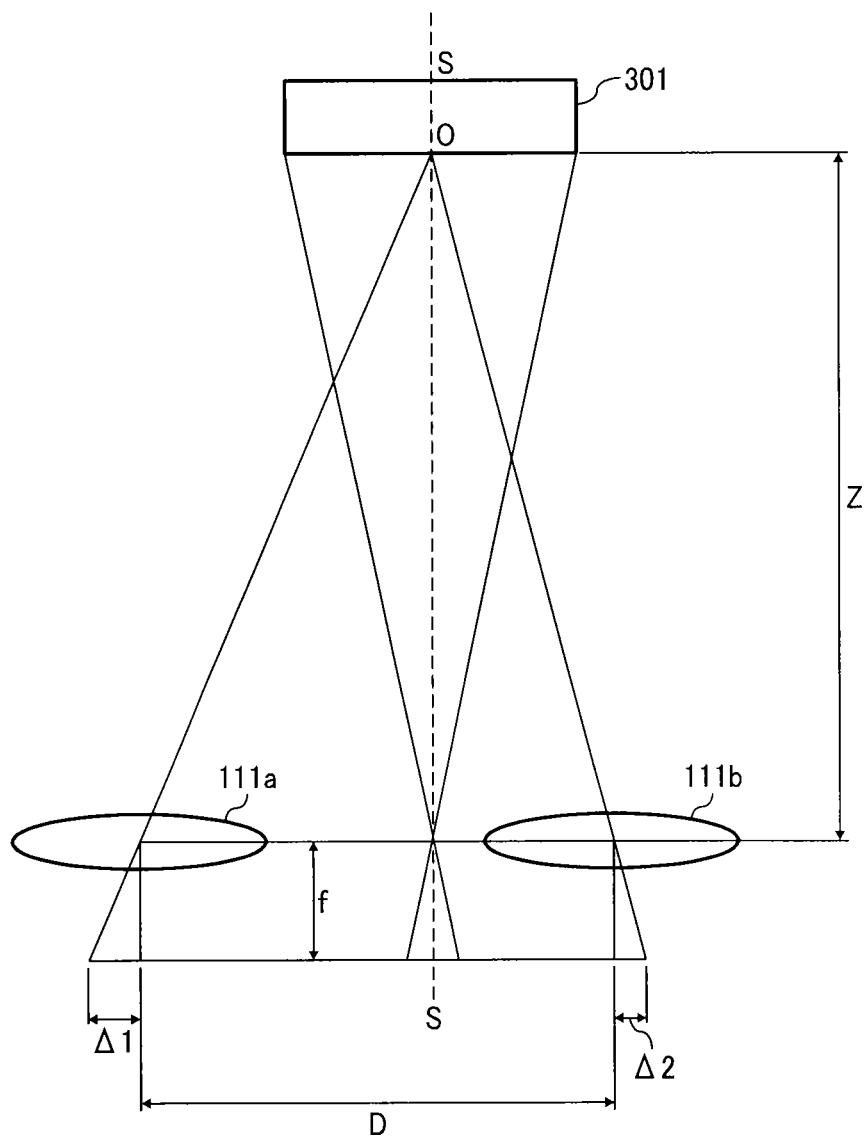
FIG. 3 illustrates the fundamental of triangulation for computing a distance to an object based on disparity.

FIG. 3 illustrates the fundamental of triangulation used for computing a distance to an object based on a disparity value. As illustrated in FIG. 3, the first capturing lens 111A and the second capturing lens 111B have the focal length f, and the optical axes of the first capturing lens 111A and the second capturing lens 111B are spaced apart with the distance D. The first capturing lens 111A and the second capturing lens 111B exist at the positions distanced from an object 301 with the distance Z, in which the distance Z is parallel to the optical axes of the first capturing lens 111A and the second capturing lens 111B. The disparity value can computed using the fundamental of triangulation as illustrated in FIG. 3, in which a point O on the object 301 is captured on left and right images, and distance $\Delta 1$ between the focal position and the focal center on the left image, and distance $\Delta 2$ between the focal position and the focal center for the right image are computed, with which the disparity value d ($\Delta$) can be computed as $\Delta = \Delta 1 + \Delta 2$. With this processing, disparity values can computed for each of pixels, and a disparity image can be generated from the disparity values.

Referring back to FIG. 2, the image analyzer 102, which is configured as an image processing board, includes, for example, a memory 122, a central processing unit (CPU) 123, a data interface (I/F) 124, and a serial interface (I/F) 125. The memory 122 such as a random access memory (RAM) and a read only memory (ROM) stores luminance image data and disparity image data output from the image capturing unit 101. The CPU 123 executes computer programs for recognizing target objects and controlling the disparity computation.

The FPGA configuring the processing hardware 120 performs real-time processing to image data stored in the RAM such as gamma correction, distortion correction (parallel processing of left and right captured images), disparity computing using block matching to generate disparity image information, and writing data to the RAM of the image analyzer 102.

The CPU 123 of the image analyzer 102 controls image sensor controllers of the first capturing unit 110A and the second capturing unit 110B, and an image processing circuit. Further, the CPU 123 loads programs used for a detection process of three dimensional shape of road, and a detection process of objects (or recognition target object) such as guard rail from the ROM, and performs various processing using luminance image data and disparity image data stored in the RAM as input data, and outputs processing results to an external unit via the data IF 124 and the serial IF 125. When performing these processing, vehicle operation information such as vehicle speed, acceleration (acceleration in front-to-rear direction of vehicle), steering angle, and yaw rate of the vehicle 100 can be input using the data IF 124, and such information can be used as parameters for various processing. Data output to the external unit can be used as input data used for controlling various devices of the vehicle 100 such as brake control, vehicle speed control, and warning control.

(Process of Detecting Object)

Figure 4:
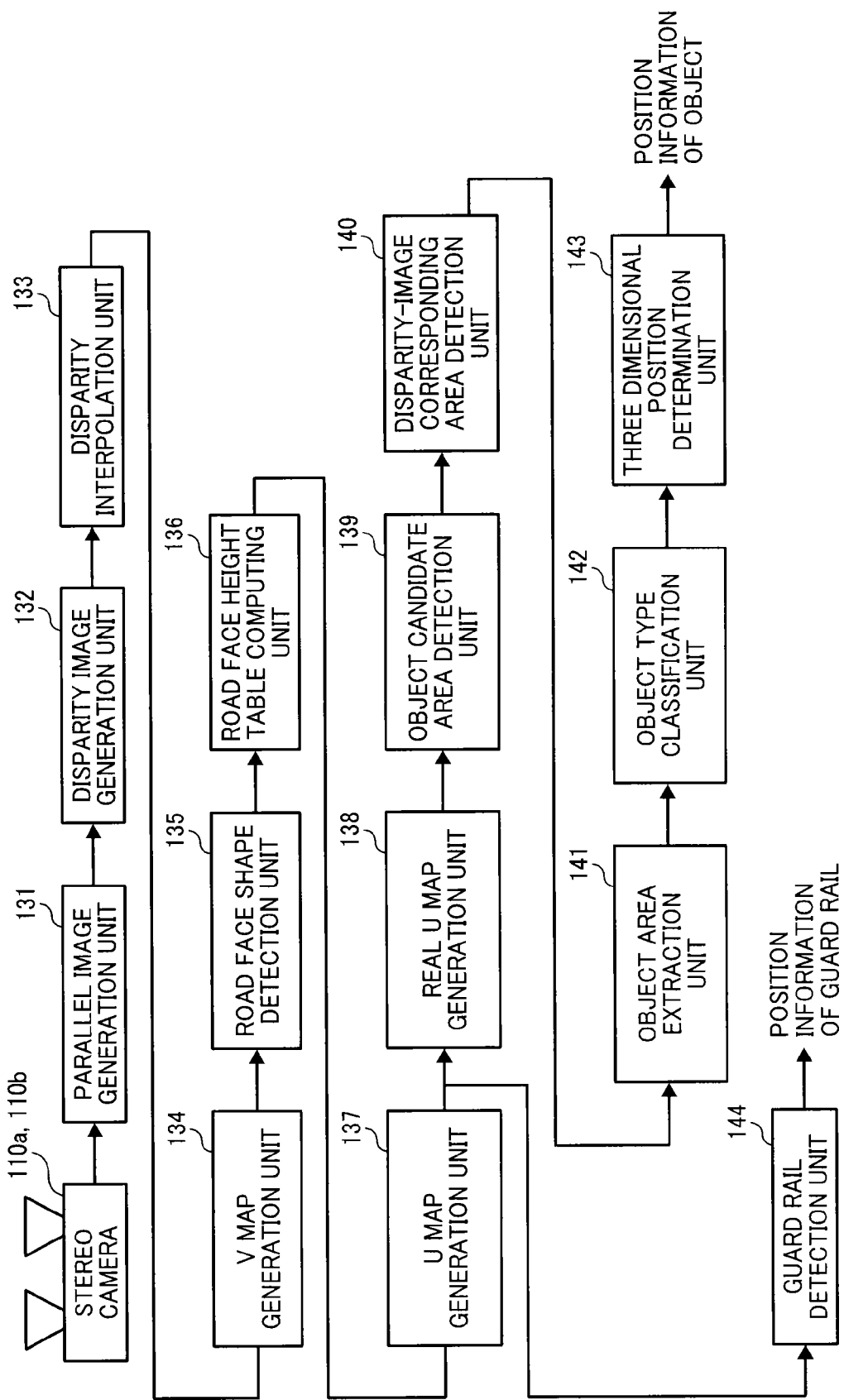
FIG. 4 is a functional block diagram for an object detection processing performable by a processing hardware and the image analyzer.

A description is given of an object detection processing of road according to an example embodiment. FIG. 4 is a functional block diagram of an object detection processing according to one or more example embodiments, which can be performed by the processing hardware 120 and the image analyzer 102 of FIG. 2.

The luminance image data is output from the first capturing unit 110A and the second capturing unit 110B of the stereo camera. If color image data is output from the first capturing unit 110A and the second capturing unit 110B, color luminance conversion for obtaining luminance signal (Y) from RGB signals is performed, for example, using the following formula (1).

$$Y = 0.3R + 0.59G + 0.11B \tag{1}$$

(Process of Generating Parallel Image)

When the luminance image data is input, at first, a parallel image generation unit 131 conducts parallel image generation processing. In this parallel image generation processing, based on the optical system distortion in the first capturing unit 110A and the second capturing unit 110B and relative positional relationship of the first capturing unit 110A and the second capturing unit 110B, the luminance image data (reference image and comparison image) output from each of the first capturing unit 110A and the second capturing unit 110B is converted to an ideal parallel stereo image, which can be obtained when two pin-hole cameras are disposed in parallel, in which distortion amount at each pixel is computed using polynomial expressions such as $\Delta x = f(x, y)$, $\Delta y = g(x, y)$. By using the computed distortion amount, each of pixels of the luminance image data (reference image and comparison image) output from each of the first capturing unit 110A and the second capturing unit 110B is converted. The polynomial expression is based on, for example, a fifth-order of polynomial expressions for x (horizontal direction position in image) and y (vertical direction position in image).

(Process of Generating Disparity Image)

Upon performing the parallel image generation processing, a disparity image generation unit 132 configured with the disparity computing unit 121 conducts disparity image generation processing that generates disparity image data (disparity information or disparity image information). In the disparity image generation processing, luminance image data of one capturing unit (first capturing unit 110A) is used as reference image data, and luminance image data of the other capturing unit (second capturing unit 110B) is used as comparison image data, and the disparity of two images is computed by using the reference image data and comparison image data to generate and output disparity image data. The disparity image data indicates a disparity image composed of pixel values corresponding to disparity values "d" computed for each of image portions on the reference image data.

Specifically, the disparity image generation unit 132 defines a block composed of a plurality of pixels (e.g., 16 pixels×1 pixel) having one concerned pixel at the center for one line in the reference image data. Further, in the same one line of the comparison image data, a block having the same size of the block defined for the reference image data is shifted for one pixel in the horizontal line direction (X direction), and a feature value indicating pixel value of the block defined in the reference image data a is computed, and a correlating value indicating correlation between the feature value indicating pixel value of the block defined in the reference image data and a feature value indicating pixel value of the block in the comparing image data is computed. Then, based on the computed correlating value, among blocks in the comparing image data, one block in the comparing image data having the most close correlated relation with the block defined in the reference image data is selected, wherein this block selection process may be called as block matching algorithm or matching processing. Then, a positional deviation between the concerned pixel of the block in the reference image data, and a corresponding pixel in the block in the comparing image data selected by the block matching algorithm is computed as the disparity value "d." By performing the computing process of disparity value "d2 for a part or the entire area of the reference image data, disparity image data can be obtained.

As to the feature value of block used for the block matching algorithm or processing, for example, value of each pixel (luminance value) in the block can be used. As to the correlating value, for example, a difference between a value of each pixel (luminance value) in the block in the reference image data and a value of corresponding each pixel (luminance value) in the block in the comparing image data is computed, and absolute values of the difference of the pixels in the block are totaled as the correlating value. In this case, a block having the smallest total value can be the most correlated block.

When the matching processing performable by the disparity image generation unit 132 is devised using hardware processing, for example, SSD (Sum of Squared Difference), ZSSD (Zero-mean Sum of Squared Difference), SAD (Sum of Absolute Difference), and ZSAD (Zero-mean Sum of Absolute Difference) can be used. In the matching processing, the disparity value is computed only with the unit of pixels. Therefore, if disparity value of sub-pixel level, which is less than one pixel is required, an estimation value is used. The estimation value can be estimated using, for example, equiangular straight line method, quadratic curve method or the like. Because an error may occur to the estimated disparity value of sub-pixel level, EEC (Estimation Error Correction) that can decrease the estimation error is used.

(Overview of Interpolation of Disparity)

Figure 5A:
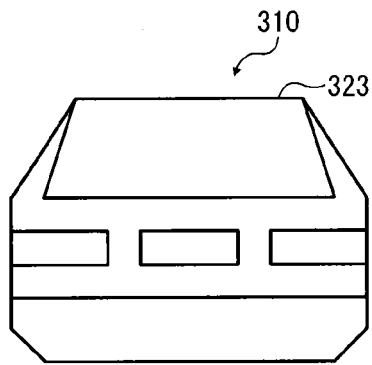

After generating the disparity image, a disparity interpolation unit 133, implementable by the image analyzer 102, performs disparity image interpolation processing to generate an interpolated disparity image. FIG. 5 illustrates example images for the disparity image interpolation processing, in which FIG. 5A is an example of a captured image, FIG. 5B is an example of a disparity image, and FIG. 5C to 5E are schematic images for explaining conditions for executing the interpolation processing of disparity image.

Figure 5B:
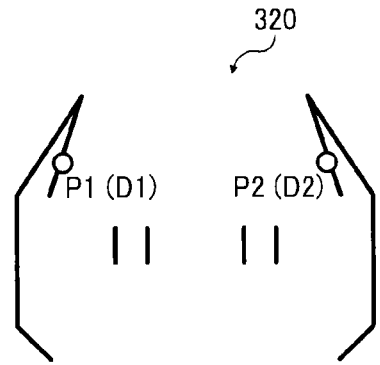
Figure 5C:
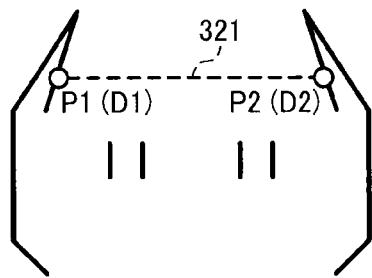
Figure 5D:
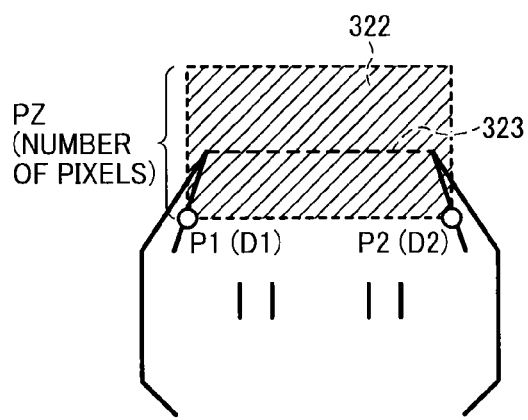
Figure 5E:
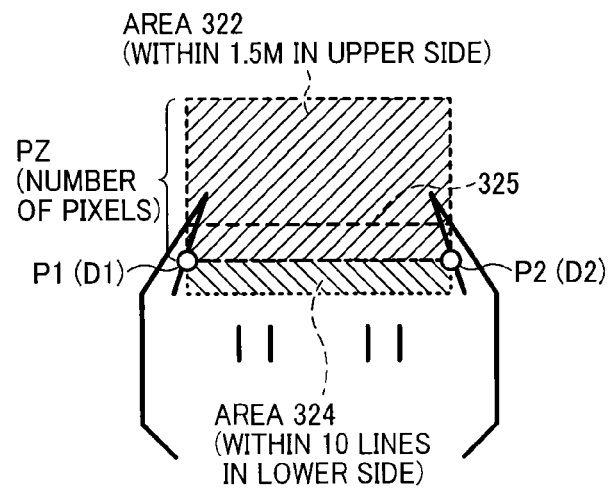

Based on a captured image 310 such as a luminance image (FIG. 5A) of a vehicle, the disparity image generation unit 132 generates a disparity image 320 (FIG. 5B). Since the disparity value "d" indicates a level of positional deviation in the horizontal direction, the disparity value "d" cannot be computed at a portion of horizontal edge and a portion having small or little luminance change in the captured image 310, with which a vehicle may not be detected or recognized as one object.

Therefore, the disparity interpolation unit 133 interpolates between two points existing on the same line in a disparity image. Specifically, the disparity interpolation unit 133 interpolates between a point (pixel) P1 having disparity value D1, and a point (pixel) P2 having disparity value D2 existing on the same Y coordinate (i.e., vertical direction of image) shown in FIG. 5B based on following five determination conditions (a) to (e).

Condition (a): real distance between the two points is shorter than a given length (hereinafter, first determination condition). When distance Z1 is set for the disparity value D1, distance PX is set as a distance between the pixels P1 and P2 on an image, and the focal distance "f" is set for a stereo camera, a approximated real distance RZ between the two points can be expressed "RZ=Z1/f×PX." If the real distance RZ is within a given value (e.g., 1900 mm-width of car), the condition (a) is satisfied.

Condition (b): disparity values do not exist between the two points (hereinafter, second determination condition), which means that no disparity values exist on pixels existing on a line 321 connecting the pixels P1 and P2 (FIG. 5C).

Condition (c): a difference of depth of the two points (difference of distance in the ahead direction of the vehicle 100) is smaller than a threshold set based on one of the distance Z1 and Z2, or the difference of depth of the two points is smaller than a threshold set based on distance measurement (range finding) precision of one of the distance Z1 and Z2 (hereinafter, third determination condition).

In this example case, the distance Z1 for the pixel P1 at the left side is computed based on the disparity value D1. The distance measurement (range finding) precision of the stereo imaging such as distance measurement (range finding) precision of the block matching depends on distance. For example, the precision can be set "distance±10%," in which the distance measurement precision is 10%, and a threshold for the difference of depth is set 20% of Z1 (=Z1×0.2).

Condition (d): a horizontal edge exists at a position higher than the two points and at a given height or less such as a vehicle height of 1.5 m or less (hereinafter, fourth determination condition). As illustrated in FIG. 5D, for example, it is determined whether a given number or more of horizontal edges exist in an area 322, which is up to 1.5 m-height from the two points. The pixel number PZ corresponding to the 1.5 m-height area can be computed by a formula of "PZ=1.5 m×f/Z1" using the distance Z1 computed from the disparity value D1 of the pixel P1, and the focal distance "f" of the stereo camera.

In this configuration, "a case that a horizontal edge exists" means that the horizontal edge exists in the area 322, which is the upward of a pixel (concerned pixel) existing between the pixels P1 and P2, which means a value in a line buffer of an edge position count, to be described later, is set 1 to PZ at the position of the concerned pixel.

Then, after performing the horizontal edge detection for one line (step S2 of FIG. 6, FIG.7A), to be described later, a disparity interpolation is to be performed on a next line between the pixels P1 and P2. If the number of pixels having the horizontal edge between the pixels P1 and P2 is greater than one half (½) of the number of pixels existing between the pixel P1 and P2 when the disparity interpolation is to be performed on a next line, the fourth determination condition becomes true. For example, the fourth determination condition can be used for a roof 323 of a vehicle. If the horizontal edges are continuous, and a difference of disparity value D1 of the pixel P1 and the disparity value D2 of the pixel P2 is less than a given value, the disparity interpolation is performed.

Condition (e): disparity information at points far from the two points do not exist near an upper and lower sides of a line connecting the two points (hereinafter, fifth determination condition), wherein the disparity information at the far points may be referred to far-point disparity information or far-point disparity value. The far-point disparity information means a disparity value at a point existing at a far distance, which is far from the distance Z1 and Z2 obtained from the disparity values D1 and D2. For example, the far distance means a distance of 120% or more of one of the distance Z1 and Z2, which may be greater than the other (i.e., Z1>Z2 or Z1<Z2).

For example, as illustrated in FIG. 5E, the area 322 is set higher than pixels P1 and P2 (e.g., within 1.5 m in the upper side, pixel numbers are within PZ), and the area 324 is set lower than pixels P1 and P2 (e.g., within 10 lines in the lower side). Then, as to all pixels existing between the pixels P1 and P2, the number of pixels having a far-point disparity in the area 322 (i.e., upper side) are counted for all pixels existing between the pixels P1 and P2, and the number of pixels having a far-point disparity in the area 324 (i.e., lower side) are counted for all pixels existing between the pixels P1 and P2. Then, a total of the number of pixels having the far-point disparity is calculated. When the total becomes a given value (e.g., 2) or less, the fifth determination condition becomes true.

In this configuration, "a case that a pixel existing between the pixels P1 and P2 has a far-point disparity" means that a value of 1 to PZ is set in a upper-side disparity position count, to be described later, or 1 is set in any one of bits of a lower-side disparity position bit flag, to be described later. The fifth determination condition becomes untrue when a far-point disparity exists near a line to be interpolated, which means that an object at a far distance is seen. In this case, the disparity interpolation is not performed.

(Process of Interpolation of Disparity Image)

Figure 6:
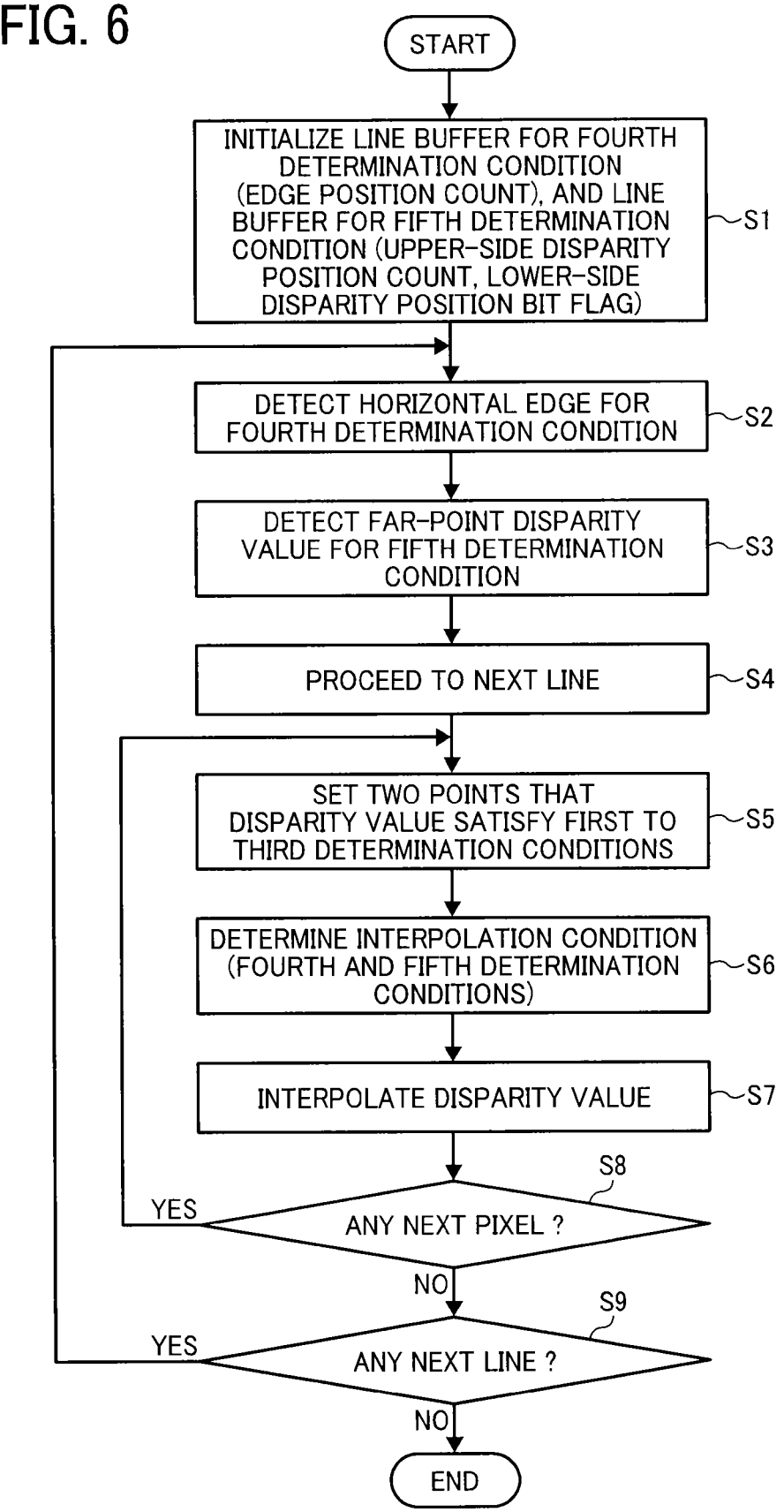
FIG. 6 is a flowchart showing the steps of interpolation processing of disparity image.

A description is given of the disparity interpolation processing. FIG. 6 is a flowchart showing the overall steps of interpolation of a disparity image. At first, a line buffer used for the fourth determination condition (edge position count), and a line buffer used for the fifth determination condition (upper-side disparity position count, lower-side disparity position bit flag) are initialized (step S1).

The edge position count is a counter set for a line buffer to retain information of line having the horizontal edge such as information of a level of the line having the horizontal edge indicating what level the horizontal edge exists above the line used for the disparity interpolation.

The upper-side disparity position count is a counter set for a line buffer to retain information of line having the far-point disparity value in the area 322 such as information of a level of the line having the far-point disparity value indicating that the line having the far-point disparity value exists at what level above the line used for the disparity interpolation.

The lower-side disparity position bit flag is a counter set for a line buffer to retain information indicating that the far-point disparity value exists within 10 lines (i.e., area 324) lower than the line used for the disparity interpolation. The lower-side disparity position bit flag prepares 11-bit flag for the number of pixels in one line.

Figure 7A:
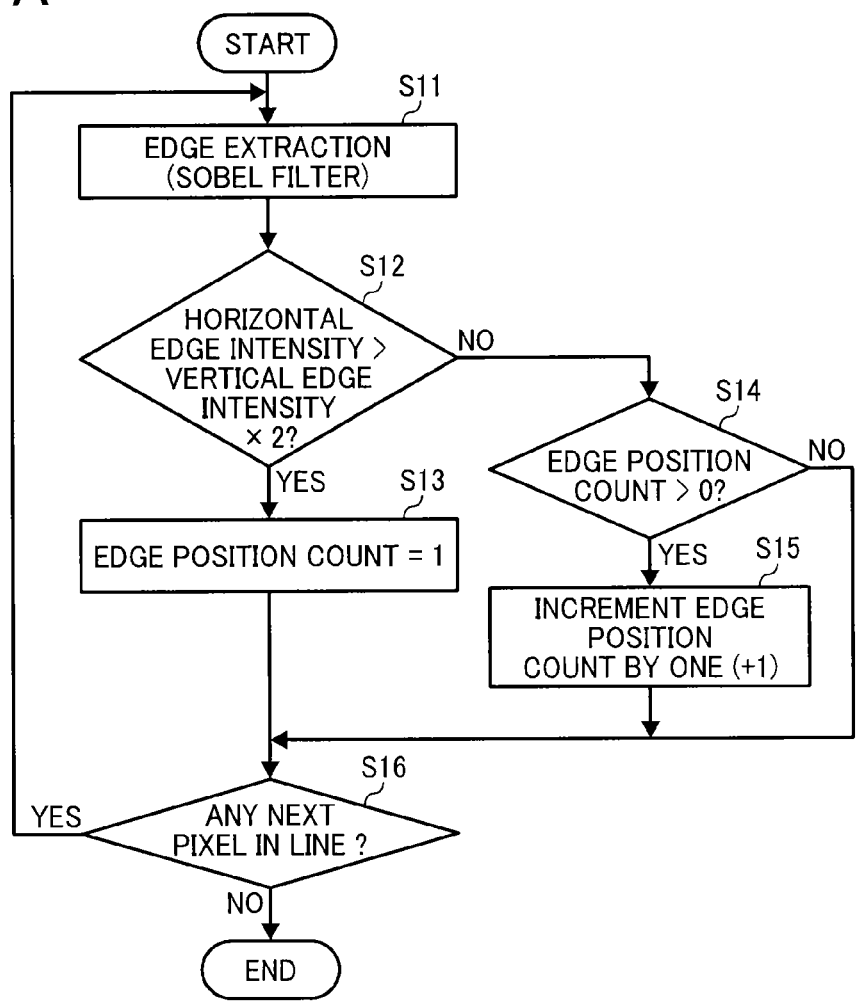
FIG. 7A is a flowchart showing the steps of process of detecting a horizontal edge.
Figure 7B:
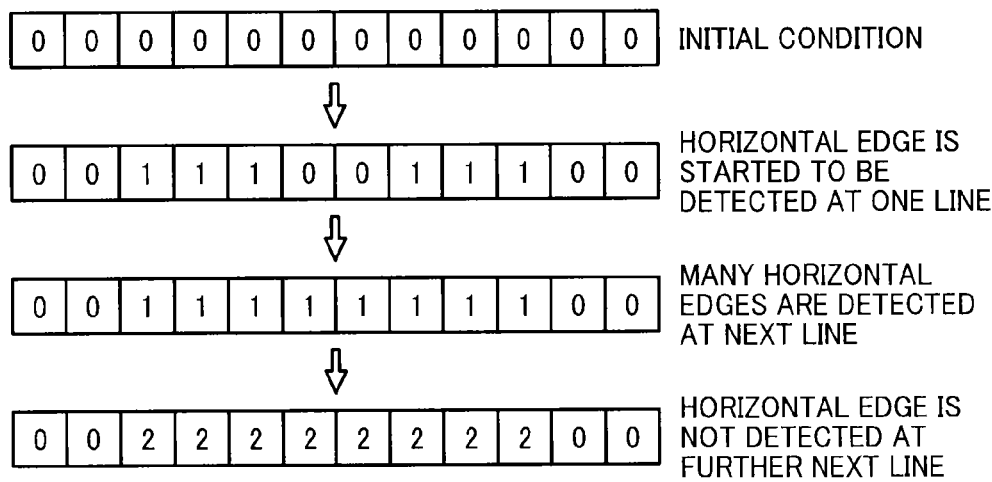
FIG. 7B is an example of an edge position count and changing of count values of the edge position count.

Then, as to the fourth determination condition, the horizontal edge of one line is detected (step S2). FIG. 7 is a flowchart showing the steps of the a process of detecting the horizontal edge at step S2 of FIG. 6, in which FIG. 7A is a flowchart showing the steps or algorithm of detecting the horizontal edge, and FIG. 7B is an example of an edge position count, and changing of the count values of the edge position count.

By applying a Sobel filter to luminance image data, intensity of the vertical edge and intensity of the horizontal edge are obtained (step S11), and it is determined whether the horizontal edge intensity is greater than the two times of the vertical edge intensity (horizontal edge intensity>vertical edge intensity×2) (step S12).

If the horizontal edge intensity is greater than the two times of the vertical edge intensity (step S12: YES), it is determined that the horizontal edge exists, and the edge position count is set with "1" (step S13). By contrast, if the horizontal edge intensity is the two times of the vertical edge intensity or less (step S12: NO), it is determined that the horizontal edge does not exist, and it is determined whether the edge position count is greater than zero "0" (step S14). If the edge position count is greater than zero "0" (step S14: YES), the edge position count is incremented by "1" (step S15). If it is determined that the edge position count is zero "0" (step S14: NO), the edge position count is not updated.

After updating the count value of the edge position count at steps S13 or S15 based on a determination result of existence or non-existence of the horizontal edge and the count value of the edge position count, or after determining that the edge position count is zero "0" at step S14 (S14: NO), the sequence proceeds to step S16 to determine whether a next pixel exists in the line.

If the next pixel exists (step S16: YES), the sequence proceeds to step S11, and repeats steps S11 to S15. If the next pixel does not exist (step S16: NO), the horizontal edge detection processing for one line (FIG. 7A) is completed.

As illustrated in FIG. 7B, an initial value of the edge position count at each pixel is initialized to zero "0" at step S1 of FIG. 7A. When the horizontal edge is started to be detected at one line, the edge position count of "1" is set at step S13. FIG. 7B illustrates an example case using lines composed of twelve pixels. At one line (e.g., first line), the horizontal edge is detected at 6 pixels of the 12 pixels while the horizontal edge is not detected at 2 pixels at the center and 4 pixels at the both ends. At a next line (e.g., second line), the horizontal edge is detected at 8 pixels while the horizontal edge is not detected at 4 pixels at the both ends. At a further next line (e.g., third line), the horizontal edge is not detected, and thereby the edge position count is incremented and becomes "2" at step S15.

When the horizontal edge is detected at subsequent each line, the value of edge position count becomes "1," and when the horizontal edge is not detected, the value of edge position count is incremented by one. Therefore, based on the value of edge position count corresponded to each pixel, it can determine a level of line having the horizontal edge indicating what level the horizontal edge exists above the line used for the disparity interpolation.

Figure 8:
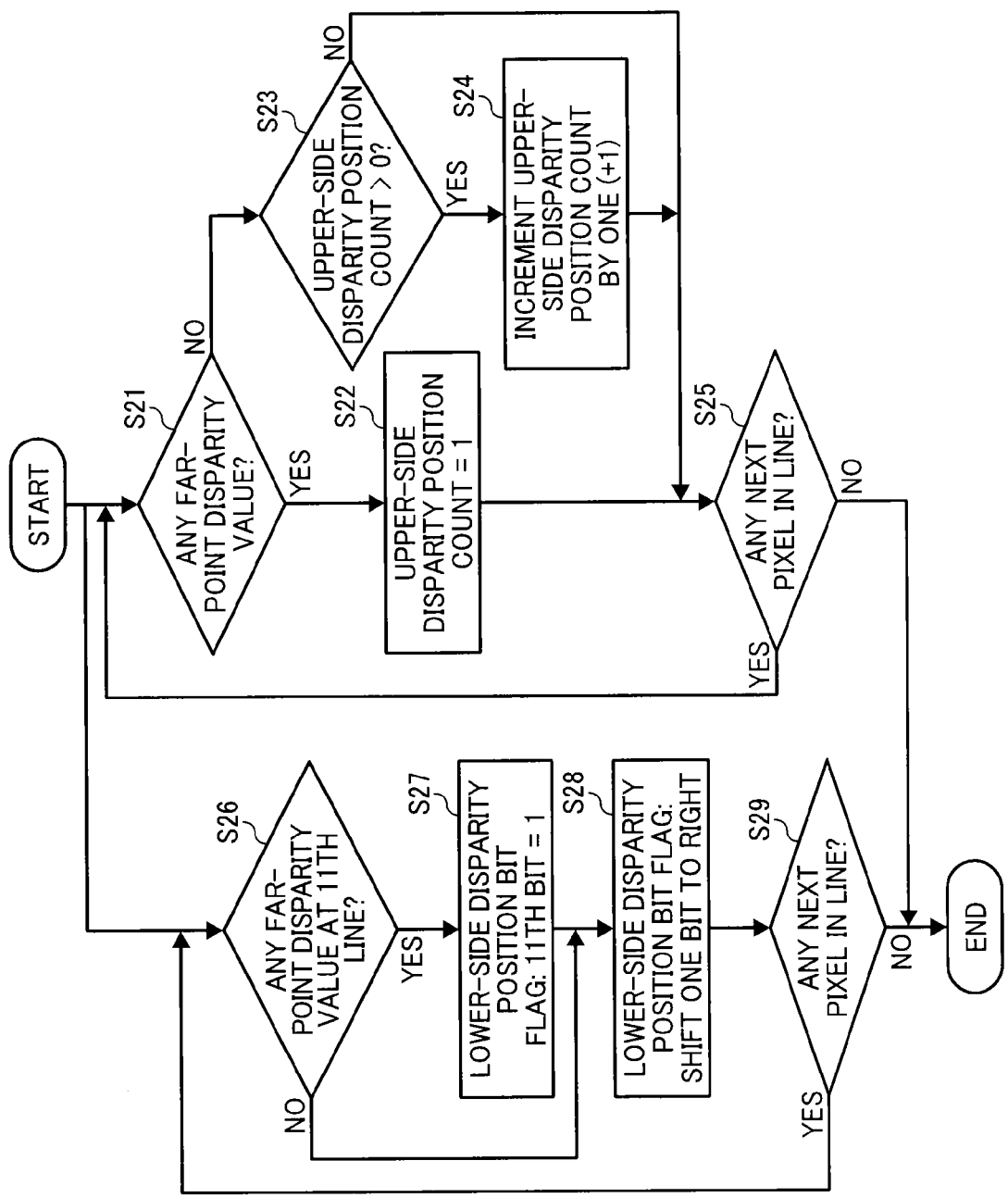
FIG. 8 is a flowchart showing the steps of a process of detecting a far-point disparity value.

When the horizontal edge detection processing for each one line is completed, the far-point disparity value is detected for the fifth determination condition (step S3). FIG. 8 is a flowchart showing the steps or algorithm of detecting the far-point disparity value at step S3 of FIG. 6.

At a stage of FIG. 5E, the processing of the upper area 322 (hereinafter, process of detecting the upper-side far-point disparity value), and the processing of the lower area 324 (hereinafter, process of detecting the lower-side far-point disparity value) are concurrently performed. However, for the simplicity of description, the process of detecting the upper-side far-point disparity value is described at first, and then the process of detecting the lower-side far-point disparity value is described.

As to the process of detecting the upper-side far-point disparity value, it is determined whether a far-point disparity value exists (step S21) at first. If it is determined that the far-point disparity value exists (step S21: YES), the upper-side disparity position count is set with "1" (step S22). If it is determined that the far-point disparity value does not exist (step S21: NO), it is determined whether the upper-side disparity position count is greater than zero "0" (step S23). If it is determined that the upper-side disparity position count is greater than zero "0" (step S23: YES), the upper-side disparity position count is incremented by one (step S24).

After updating the count value at step S22, or after determining that the upper-side disparity position count is zero "0" at step S23 (S23: NO), the sequence proceeds to step S25, in which it is determined whether a next pixel exists in the line.

If it is determined that the next pixel exists (step S25: YES), the sequence proceeds to step S21, and repeats steps S21 to S24. If it is determined that the next pixel does not exist (step S25: NO), the process of detecting the upper-side far-point disparity value for one line (FIG. 8) is completed.

Therefore, the process of detecting the upper-side far-point disparity value can be performed similar to the processing shown in FIG. 7A except changing the horizontal edge to the far-point disparity value.

As to the process of detecting the lower-side far-point disparity value, at first, it is determined whether a far-point disparity value exists on the 11th line in the lower-side (step S26). If it is determined that the far-point disparity value exists (step S26: YES), the 11th bit of the lower-side disparity position bit flag is set with one "1" (step S27), and then the lower-side disparity position bit flag is shifted to the right by one bit (step S28). If it is determined that the far-point disparity value does not exist (step S26: NO), the lower-side disparity position bit flag is shifted to the right by one bit without changing the flag. With this processing, a position of the lower-side far-point disparity value existing at a line closest to the two pixels P1 and P2 within the 10-line area under the two pixels P1 and P2 can be determined.

If a next pixel exists in the line (step S29: YES), steps S26 to S28 are repeated. When the next pixel does not exist (step S29: NO), the process of detecting the lower-side far-point disparity value for one line (FIG. 8) is completed.

When the far-point disparity detection processing for one line is completed, the sequence proceeds to a next line (step S4), and set two points that satisfy the first to third determination conditions (step S5). Then, it is checked whether the two points set at step S5 satisfy the fourth and fifth determination conditions (step S6). If the two points satisfy the fourth and fifth determination conditions, the disparity value is interpolated (step S7), in which an average of disparity values of the two points is used as a disparity value between the two points.

If a pixel to be processed for the disparity interpolation still exists (step S8: YES), steps S5 to S7 are repeated. If the to-be-processed pixel does not exist (step S8: NO), the sequence proceeds to step S9, and it is determined whether a next line exists. If the next line to be processed for the disparity interpolation still exists (step S9: YES), steps S2 to S8 are repeated. If the to-be-processed line does not exist (step S9: NO), the disparity interpolation processing is completed.

An additional description is given for the horizontal edge detection processing (step S2 of FIG. 6, steps S11 to S16 of FIG. 7), and the process of detecting the lower-side far-point disparity value (step S26 to S29 of FIG. 8).

As to the horizontal edge detection processing, for example, it can be assumed that the horizontal edge detection processing is started from the upper end line of luminance image illustrated in FIG. 5A, and then the horizontal edge is detected for the first time at a line corresponding to the roof 323 (FIG. 5D).

In this case, when the horizontal edge detection processing is being performed from the upper end line of the luminance image to a line, which is one line above the roof 323, a value of the edge position count is remained "0" that is the initial value (S12: NO→S14: NO). Therefore, even if the sequence proceeds to the far-point disparity value detection processing (step S3), proceeds to a next line (step S4), sets the two points (step S5), and determines whether the fourth determination condition is satisfied (step S6) after the horizontal edge detection processing, this case (S12: NO→S14: NO) does not correspond to "a case that the horizontal edge exists," and thereby the fourth determination condition is not satisfied.

When the horizontal edge is detected at the line corresponding to the roof 323 (step S12: YES), a value of the edge position count, corresponding to a pixel where the horizontal edge is detected, is set with "1" (step S13). In this case, when the determination of the fourth determination condition (step S6) is performed for a next line, next to the line corresponding to the roof 323, this case (S12→S13) corresponds to "a case that the horizontal edge exists." Therefore, if the number of pixels having the horizontal edge between the pixels P1 and P2 is greater than one-half of the number of pixels between the pixels P1 and P2" is satisfied, the fourth determination condition is satisfied. In this case, the value of "1 set in the edge position count means that the horizontal edge exists on a line, which is one line above the line of the two points (pixels P1 and P2), which means that the horizontal edge exists on a line corresponding to the roof 323.

Further, if the horizontal edge is not detected at a next line, next to the line corresponding to the roof 323, and the subsequent below lines (step S12: NO), the value of the edge position count, set for the pixel detected as having the horizontal edge on the line corresponding to the roof 323, is incremented by one every time the horizontal edge detection processing is performed (S14: YES→S15). This case (S14: YES→S15) corresponds to "a case that the horizontal edge exists. Therefore, if it is determined that the number of pixels having the horizontal edge between the pixels P1 and P2 is greater than one-half of the number of pixels between the pixels P1 and P2," the fourth determination condition is satisfied. Further, the value of the edge position count that is incremented by one every time the horizontal edge detection processing is performed indicates the number of lines counted from the line connecting the two points (pixels P1 and P2), set at step S5, to the line corresponding to the roof 323.

As to the process of detecting the lower-side far-point disparity value, it can be assumed that the lower-side far-point disparity value is detected at a line 325 (FIG. 5E) for the first time after performing the process of detecting the far-point disparity value from the upper end line of luminance image (FIG. 5A).

In this case, when the process of detecting the lower-side far-point disparity value is being performed from the upper end line of the luminance image to a line, which is one line above the line 325, all of 11 bits of the lower-side disparity position bit flag are remained at zero "0" (S26: NO→S28). Therefore, even if the sequence proceeds to a next line (step S4), sets the two points (step S5), and determines whether the fifth determination condition is satisfied (step S6) after the far-point disparity value detection processing, this case (S26: NO→S28) does not correspond to "a case that one is set at any one of bits of the lower-side disparity position bit flag" in a case that "a pixel existing between the pixels P1 and P2 has the far-point disparity."

When the lower-side far-point disparity value is detected on the line 325, the 11th bit of the lower-side disparity position bit flag is set with one (S26: YES→S27), and further the 10th bit is set with one (step S28). When a determination process of the fifth determination condition (step S6) is performed for a next line, next to the line 325, this case (S26: YES→S27) corresponds to a case that "one is set at any one of bits of the lower-side disparity position bit flag." In this case, the 10th bit of the lower-side disparity position bit flag has the value of "1", which means that the far-point disparity value exists on the line, which is below the two points (pixels P1 and P2) for 10 lines.

Further, if the lower-side far-point disparity value is not detected at a next line, next to the line 325, and the subsequent below lines (step S26: NO), "1" set in the lower-side disparity position bit flag is shifted to the right when a target line, which is processed for detecting the lower-side far-point disparity value, is shifted to the next lower line each time. Therefore, for example, if the 8th bit of the lower-side disparity position bit flag is "1," it means that the lower-side far-point disparity value exists at 8 lines below the line of the two points (pixel P1, P2).

The interpolation processing of disparity image has following features. When the interpolation of disparity value is to be performed between two points (pixels P1 and P2) shown in FIG. 5B, the following four determination steps (1) to (4) are required such as (1) a step of determining whether disparity values at the two points are close with each other, (2) a step of determining whether a horizontal edge exists within a 1.5 m-area above the two points, (3) a step of determining whether a far-point disparity value exists below the horizontal edge, and (4) a step of determining whether a far-point disparity value exists below the two points.

When each time it is determined that the disparity values are close with each other, the process of detecting horizontal edge and the process of detecting far-point disparity value can be performed. However, the process of detecting horizontal edge and the process of detecting far-point disparity value may require too long time in this case, which means that execution time cannot be estimated effectively.

By contrast, as to the one or more example embodiments, the process of determining whether disparity values are close each other can be synchronized with the process of detecting whether the horizontal edge and far-point disparity exist by performing the line scanning operation, in which the processing time can be maintained at a substantially constant level even if images having various contents are input, with which the execution time can be estimated easily, and thereby apparatuses or systems for performing real time processing can be designed effectively. Further, if faster processing speed is demanded, the processing time can be reduced greatly by thinning out pixels used for the processing.

(Process of Generating V Map)

Upon performing the interpolation of disparity image as above described, a V map generation unit 134 performs V map generation processing that generates a V map. Disparity pixel data included in disparity image data can be expressed by a combination of x direction position, y direction position, and disparity value "d" such as (x, y, d). Then, (x, y, d) is converted to three dimensional coordinate information (d, y, f) by setting "d" for X-axis, "y" for Y-axis, and frequency "f" for Z-axis to generate disparity histogram information. Further, three dimensional coordinate information (d, y, f) exceeding a given frequency threshold among such three dimensional coordinate information (d, y, f) can be generated as disparity histogram information. In this description, the disparity histogram information is composed of three dimensional coordinate information (d, y, f), and a map of mapping this three dimensional histogram information on two dimensional coordinate system of X-Y is referred to as "V map" or disparity histogram map.

Specifically, an image is divided in a plurality of areas in the upper-lower direction to obtain each line area in the disparity image data. The V map generation unit 134 computes a frequency profile of disparity values for each of the line area in the disparity image data. Information indicating this frequency profile of disparity values becomes "disparity histogram information."

Figure 9A:
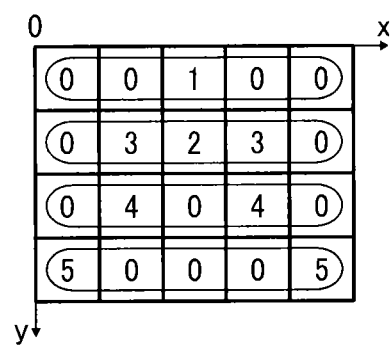
FIG. 9A is an example of a disparity value profile of disparity image.
Figure 9B:
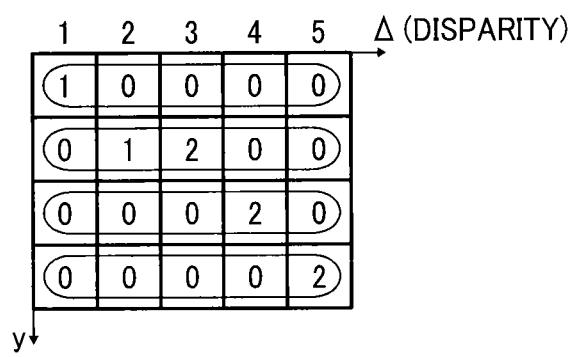
FIG. 9B is a V map indicating information of frequency profile of disparity values at each line in the disparity image of FIG. 9A.

FIGS. 9A and 9B are an example of disparity image data, and a V map generated from the disparity image data, in which FIG. 9A is an example of a disparity value profile of disparity image, and FIG. 9B is a V map indicating information of frequency profile of disparity values at each line in the disparity image of FIG. 9A.

Specifically, when the disparity image data having the disparity value profile shown in FIG. 9A is input, the V map generation unit 134 computes a frequency profile of disparity values, which is a frequency profile for the number of data of disparity values at each line, and outputs the frequency profile of disparity values as disparity histogram information. Information of the frequency profile of disparity values for each line area obtained by this processing is expressed as two dimensional orthogonal coordinate system that sets the "y" direction position (upper-lower direction position in captured image) of disparity image on Y-axis, and disparity values on X-axis, with which a V map shown in FIG. 9B can be obtained. The V map can be expressed as an image by mapping pixels having pixel values, depending on the frequency "f," on the two-dimensional orthogonal coordinate system.

Figure 10A:
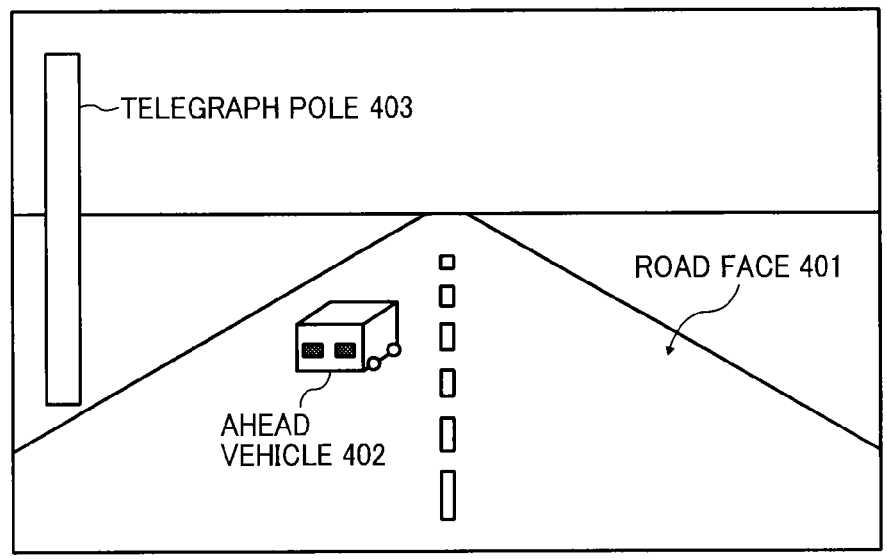
FIG. 10A is an example of an image captured by one capturing unit as a reference image.
Figure 10B:
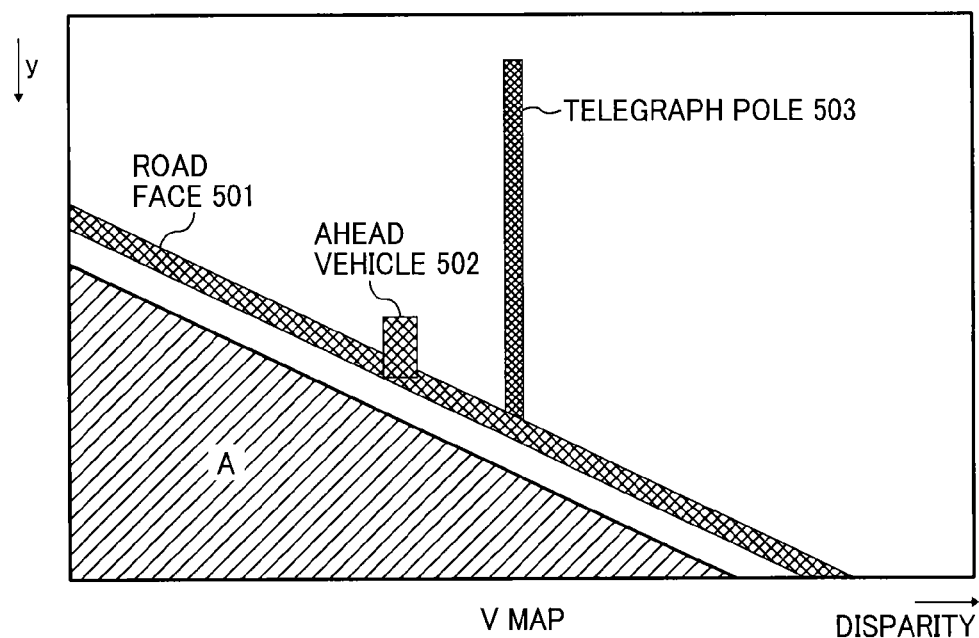
FIG. 10B is a V map corresponding to the captured image of FIG. 10A.

FIG. 10 is an example of an image captured by one capturing unit as a reference image, and a V map corresponding to the captured image. FIG. 10A is an example of an image captured by the first capturing unit 110A as a reference image, and FIG. 10B is a V map corresponding to the captured image of FIG. 10A, which means the V map of FIG. 10B is generated from the captured image of FIG. 10A. Since the disparity is not detected at an area under the road face for the V map, the disparity is not counted at an area A indicated by slanted lines in FIG. 10B.

As to the image of FIG. 10A, the image includes a road face 401 where the vehicle 100 is moving or running, an ahead vehicle 402 existing ahead of the vehicle 100, and a telegraph pole 403 existing outside the road. The V map of FIG. 10B includes the road face 501, the ahead vehicle 502, and the telegraph pole 503 corresponding to the image of FIG. 10A.

In this example image, a road face ahead of the vehicle 100 is relatively flat, in which the road face ahead of the vehicle 100 can be matched to a virtual extended face obtained by extending a face parallel to a road face right below the vehicle 100 into a direction ahead of the vehicle 100 (i.e., image capturing direction), wherein the virtual extended face is also referred to as a reference road face or a virtual reference face. In this case, as to high frequency points at the lower part of the V map corresponding to the lower part of image, the high frequency points have the disparity values "d" that become smaller as closer to the upper part of the image, and the high frequency points can be expressed as a substantially straight line having a gradient. Pixels having this feature exist at the substantially same distance on each line of the disparity image, and have the greatest occupation ratio, and such pixels display a target object having a feature that the distance of the target object becomes continuously farther from the vehicle 100 as closer to the upper part of the image.

The first capturing unit 110A can capture images of the area ahead of the vehicle 100. Therefore, as illustrated in FIG. 10B, the disparity value "d" of the road face in the captured image becomes smaller as closer to the upper part of the captured image. Further, as to the same line (horizontal line) in the captured image, pixels displaying the road face have substantially the same disparity value "d." Therefore, the high frequency points plotted as the substantially straight line in the above described V map correspond to pixels displaying the road face. Therefore, pixels on or near an approximated straight line obtained by the linear approximation of high frequency points on the V map can be estimated as pixels displaying the road face with higher precision. Further, a distance to the road face displayed by each pixel can be obtained based on the disparity value "d" of corresponding points on the approximated straight line with higher precision.

When the linear approximation of the high frequency points on the V map is performed, the precision of processing result varies depending on a sampling size of high frequency points used for the linear approximation. The greater the sampling size used for the linear approximation, the greater the number of points not corresponding to the road face, with which the processing precision decreases. Further, the smaller the sampling size used for the linear approximation, the smaller the number of points corresponding to the road face, with which the processing precision decreases. In view of such issue, in the example embodiment, disparity histogram information, which is a target of a to-be-described linear approximation is extracted as follows.

Figure 11A:
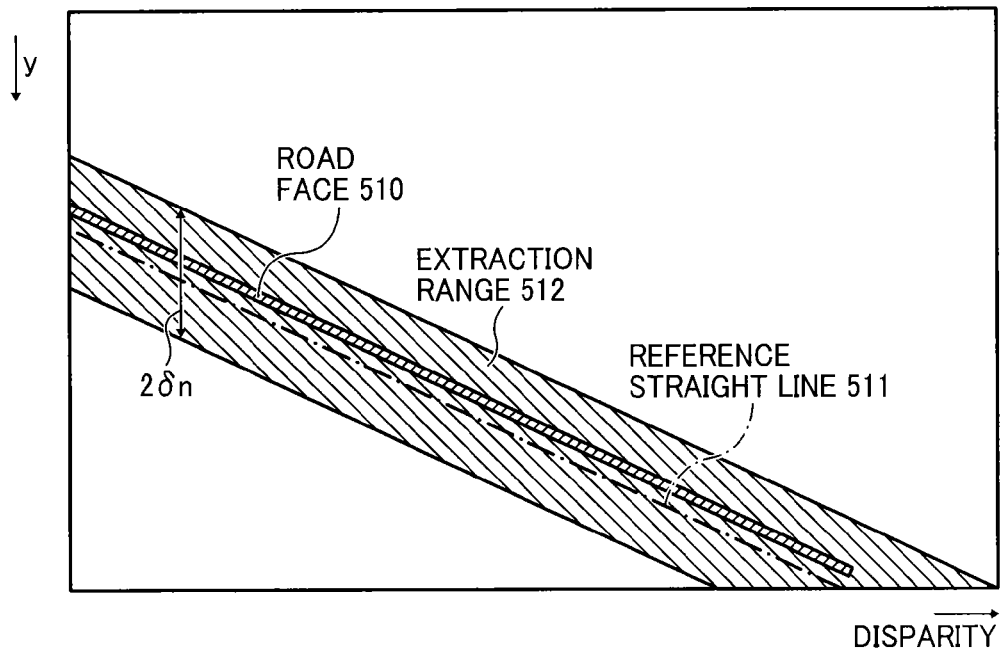
FIGS. 11A and 11B are an example of V map for explaining an extraction condition.
Figure 11B:
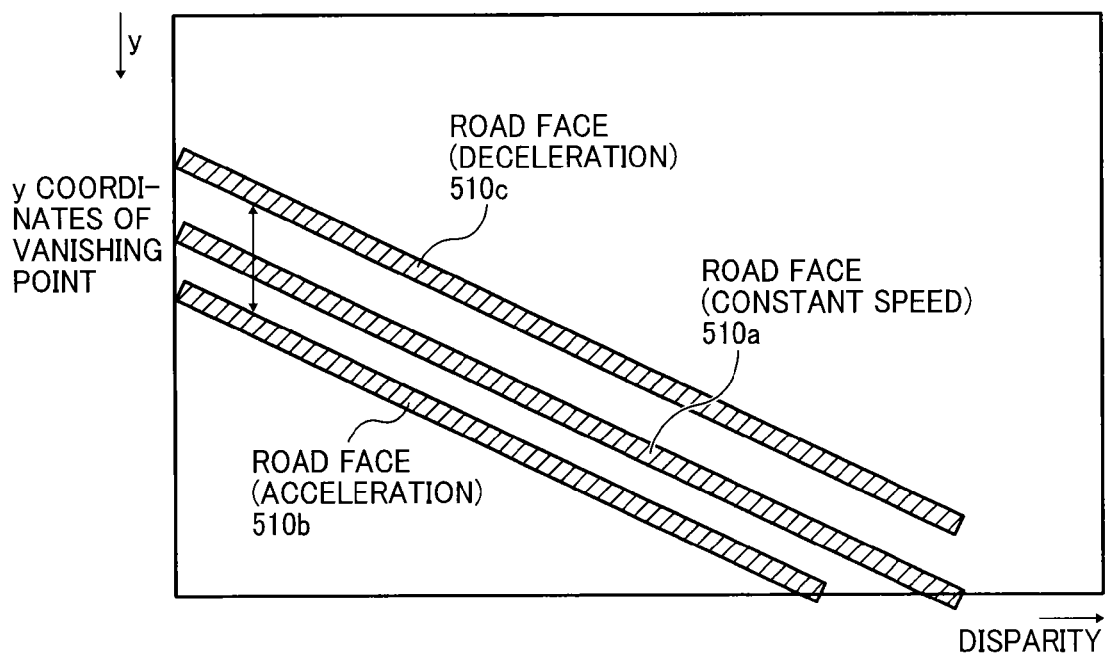

FIG. 11 is an example of a V map for explaining an extraction condition according to the example embodiment. The extraction condition can be defined as follows. A virtual reference road face (virtual reference face) ahead of the vehicle 100 is obtained by extending a face of the road face parallel to the road face 510 right below the vehicle 100 to the ahead direction of the vehicle 100. Using a relationship of the disparity value "d" and the image upper-lower direction position "y" corresponding to the virtual reference road face (reference road face), the extraction condition is set as an extraction range 512 having a given range from the reference road face. The relationship of the disparity value "d" and the image upper-lower direction position "y" corresponding to this reference road face can be expressed by a straight line (hereinafter, reference straight line 511) on the V map as illustrated in FIG. 11. In an example embodiment, a range of ±δ from this straight line in the image upper-lower direction is set as the extraction range 512. The extraction range 512 is set by including a variation range of V map component (d, y, f) of actual road face, which varies depending on conditions of roads.

Figure 12:
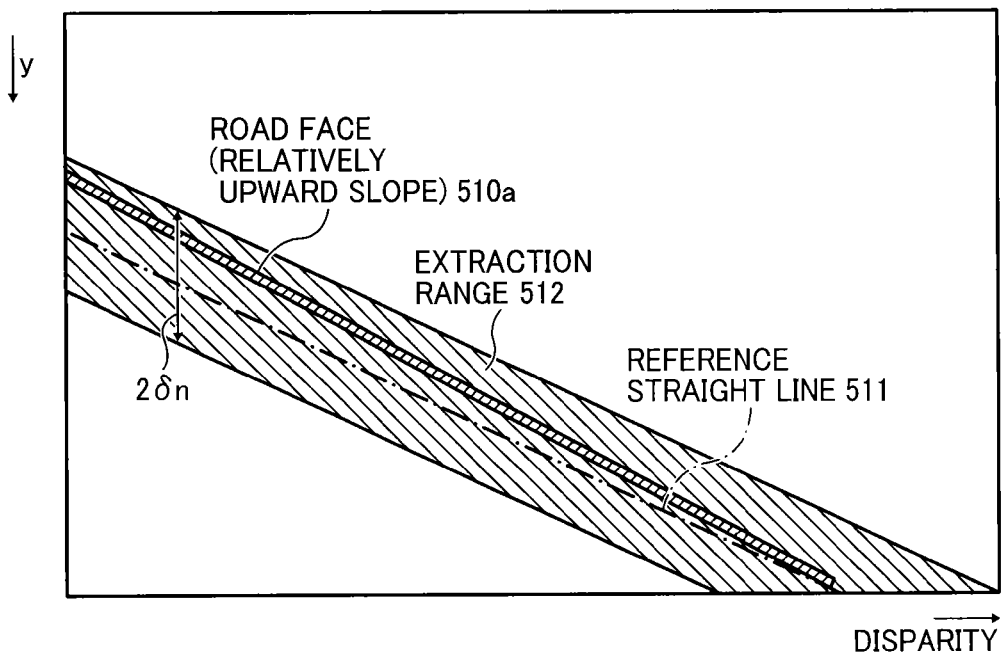
FIG. 12 is an example of V map information of a road face of relatively upward slope.

Specifically, for example, when the road face ahead of the vehicle 100 is a relatively upward slope, compared to when the road face ahead of the vehicle 100 is relatively flat, the road face image portion (face image area) displayed in the captured image becomes broader in the upper part of the image. Further, when the road face image portions displayed at the same image upper-lower direction position "y" are compared, the disparity value "d" for a relatively upward slope face becomes greater than the disparity value "d" for a relatively flat face. In this case, the V map component (d, y, f) on the V map for the relatively upward slope face indicates a straight line existing above the reference straight line 511, and has a gradient (absolute value) greater than the reference straight line 511 as illustrated in FIG. 12. In the example embodiment, if the relatively upward slope of the road face ahead of the vehicle 100 is within an expected range, the V map component (d, y, f) of the relatively upward slope face can be within the extraction range 512.

Further, for example, when a road face ahead of the vehicle 100 is a relatively downward slope, the V map component (d, y, f) on the V map for the relatively downward slope indicates a straight line existing at a portion lower than the reference straight line 511, and has a gradient (absolute value) smaller than the reference straight line 511. In the example embodiment, if the relatively downward slope of the road face ahead of the vehicle 100 is within an expected range, the V map component (d, y, f) of the relatively downward slope is within the extraction range 512.

Figure 13:
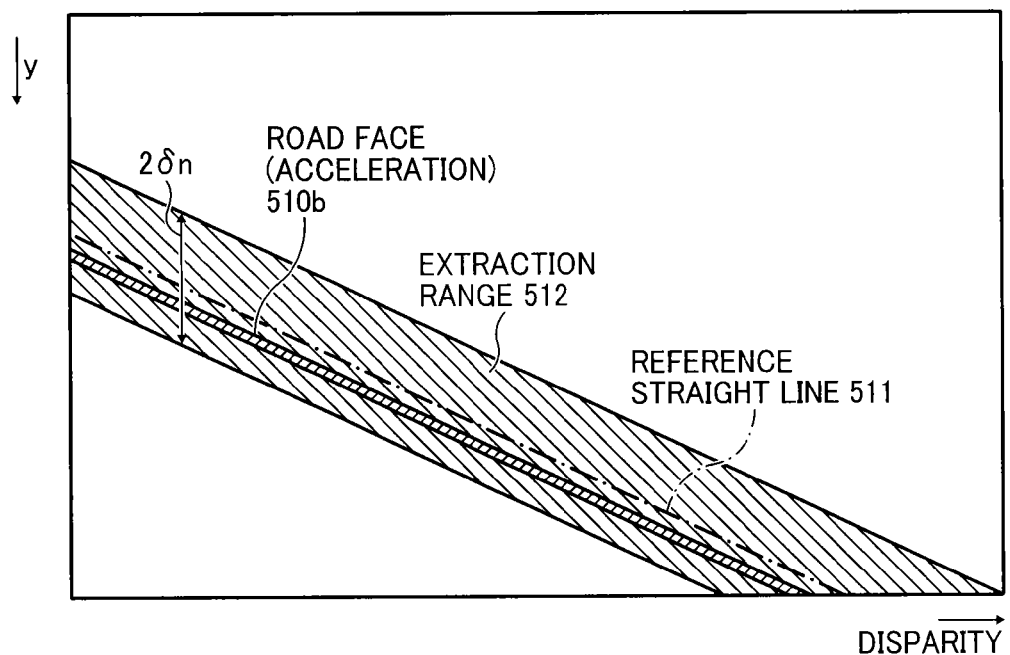
FIG. 13 is an example of V map information of a road face when a vehicle is in acceleration.

Further, for example, when the vehicle 100 is increasing speed (acceleration time), the weight is loaded to the rear side of the vehicle 100, and the vehicle 100 has an attitude that a front side of the vehicle 100 is directed to an upward in the vertical direction. In this case, compared to a case that the speed of the vehicle 100 is constant, the road face image portion (face image area) displayed in the captured image shifts to a lower part of the image. In this case, the V map component (d, y, f) on the V map for the acceleration time expresses a straight line existing at a portion lower than the reference straight line 511 and substantially parallel to the reference straight line 511 as illustrated in FIG. 13. In the example embodiment, if the acceleration of the vehicle 100 is within an expected range, the V map component (d, y, f) of road face for the acceleration time can be within the extraction range 51

Further, for example, when the vehicle 100 is decreasing speed (deceleration time), the weight is loaded to the front side of the vehicle 100, and the vehicle 100 has an attitude that the front side of the vehicle 100 is directed to a downward in the vertical direction. In this case, compared to a case that the speed of the vehicle 100 is constant, the road face image portion (face image area) displayed in the captured image shifts to an upper part of the image. In this case, the V map component (d, y, f) on the V map for deceleration time expresses a straight line existing above the reference straight line 511 and substantially parallel to the reference straight line 511. In the example embodiment, if the deceleration of the vehicle 100 is within an expected range, the V map component (d, y, f) of the road face for deceleration time can be within the extraction range 512.

As to the extraction range 512 used for detecting the road face, by setting the reference straight line 511 at a higher and lower level depending on acceleration and deceleration of a vehicle, disparity data of the road face can be set at the center of the extraction range 512 of the V map, with which data of the road face can be extracted and approximated with a suitable condition. Therefore, the value of δn can be reduced, and the extraction range 512 of the V map can be reduced, and thereby the processing time can become shorter.

The level of the reference straight line 511 can be set higher and lower for each vehicle depending on acceleration and deceleration based on experiments. Specifically, by generating a correlation table of output signals of accelerometer of a vehicle and the level variation of the reference straight line 511 due to the acceleration and deceleration, and by generating an equation approximating a relationship of the output signals of accelerometer of the vehicle and the level variation of the reference straight line 511, the level of reference straight line 511 can be set for each vehicle.

Typically, the reference straight line 511 is set lower (intercept is increased) for acceleration, and the reference straight line 511 is set higher (intercept is decreased) for deceleration. Specifically, a conversion table of the intercept value of the reference straight line 511 depending on acceleration and deceleration level can be generated.

When the intercept value of the reference straight line 511 changes, the "y" coordinate Vy of the vanishing point changes. Therefore, an area used for generating a multiple V map, to be described later, changes as the vanishing point changes, with which more correct disparity data of the road face can be applied to the V map. The vanishing point will be described later in detail.

(Internal Configuration of V Map Generation Unit)

FIG. 14 is a block diagram a process performable in the V map generation unit 134-1 of FIG. 4. The V map generation unit 134-1 includes, for example, a vehicle operation information input unit 134a, a disparity-image road-face-area setting unit 134b, a process range extraction unit 134c, and a V map information generation unit 134d.

As to the V map generation unit 134-1, upon receiving the disparity image data output from the disparity interpolation unit 133, a vehicle operation information input unit 134a acquires the vehicle operation information including acceleration/deceleration information of the vehicle 100. The vehicle operation information input to the vehicle operation information input unit 133A can be acquired from one or more devices mounted in the vehicle 100, or from a vehicle operation information acquiring unit such as an acceleration sensor mounted to the image capturing unit 101.

Upon acquiring the vehicle operation information as described above, the disparity-image road-face-area setting unit 134b sets a given road face image candidate area (face image candidate area), which is a part of the captured image, to the disparity image data acquired from the disparity interpolation unit 133. In this setting, within an expected condition range, an image area excluding a certain area not displaying the road face is set as the road face image candidate area. For example, a pre-set image area can be set as the road face image candidate area. In this example embodiment, the road face image candidate area is set based on vanishing point information indicating a vanishing point of a road face in the captured image.

Upon setting the road face image candidate area as described above, the process range extraction unit 134c extracts disparity pixel data (disparity image information component) that satisfies the above described extraction condition from the disparity image data in the road face image candidate area set by the disparity-image road-face-area setting unit 134b. Specifically, disparity pixel data having the disparity value "d" and the image upper-lower direction position "y" existing in the +δ range of the image upper-lower direction on the V map with respect to the reference straight line 511 is extracted. Upon extracting the disparity pixel data that satisfies this extraction condition, the V map information generation unit 134d converts disparity pixel data (x, y, d) extracted by the process range extraction unit 134c to V map component (d, y, f) to generate V map information.

In the above description, before generating the V map information using the V map information generation unit 134d, the process range extraction unit 134c distinguishes disparity image data not corresponding to the road face image portion, and disparity image data corresponding to the road face image portion are, and extracts the disparity image data corresponding to the road face image portion. Further, the extraction processing can be performed similarly after generating the V map information as follows.

FIG. 15 is another block diagram of a process performable in the V map generation unit of FIG. 4, in which a V map generation unit 134-2 is employed as another example of the V map generation unit 134, and the V map generation unit 134-2 performs the extraction processing after generating V map information. The V map generation unit 134-2 includes, for example, the vehicle operation information input unit 134a, the disparity-image road-face-area setting unit 134b, a V map information generation unit 134e, and a process range extraction unit 134f.

As to the V map generation unit 134-2, after setting the road face image candidate area by the disparity-image road-face-area setting unit 134b, the V map information generation unit 134e converts disparity pixel data (x, y, d) in the road face image candidate area set by the disparity-image road-face-area setting unit 134b to V map component (d, y, f) to generate V map information. Upon generating the V map information, the process range extraction unit 134f extracts V map component that satisfies the above described extraction condition from the V map information generated by the V map information generation unit 133e. Specifically, V map component having the disparity value "d" and the image upper-lower direction position "y" existing in the ±δ range of the image upper-lower direction on the V map with respect to the reference straight line 511 is extracted. Then, V map information composed of the extracted V map component is output.

(Process of Generating V Map)
(First Example of Generating V Map Information)

Figure 16:
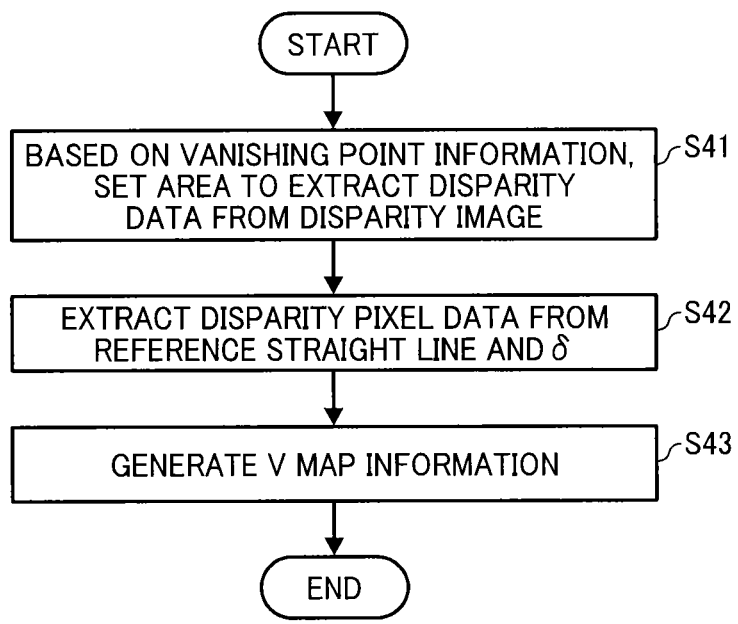
FIG. 16 is a flowchart showing the steps of a process of generating V map information (first V map information) according to one or more example embodiments.
Figure 17:
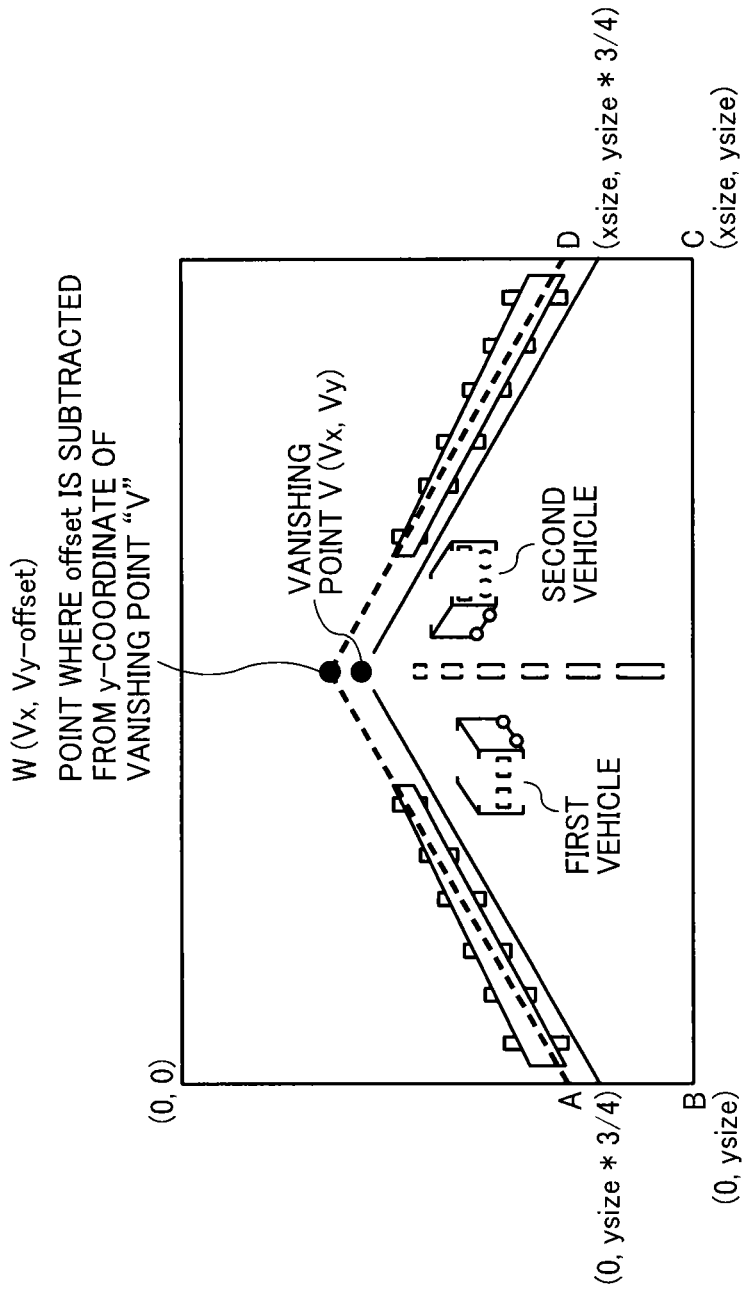
FIG. 17 is an example of a road face image candidate area set on a disparity image.

FIG. 16 is a flowchart showing the steps of a process of generating V map information (hereinafter, first V map information generation processing) according to one or more example embodiments. FIG. 17 is an example of road face image candidate area set on a disparity image.

In this first V map information generation processing, V map information is generated without using the vehicle operation information (acceleration/deceleration information in the front and rear side direction of the vehicle 100). Since acceleration/deceleration information of the vehicle 100 is not used for the first V map information generation processing, the extraction range 512 (i.e., value of δ) with respect to the reference straight line 511 corresponding to the reference road face is set relatively greater.

In this first V map information generation processing, a road face image candidate area is set based on vanishing point information of a road face (step S41). The vanishing point information of the road face can be obtained using any known methods.

The vanishing point information of the road face can be obtained using any known methods. In this first V map information generation processing, the vanishing point information of the road face is defined as (Vx, Vy), and a given offset value ("offset") is subtracted from the image upper-lower direction position Vy of the vanishing point as "Vy−offset." An area extending from a position having an image upper-lower direction position corresponding to "Vy−offset" to the maximum value "ysize (the lowest end of disparity image)" in the image upper-lower direction position "y" of the concerned disparity image data is set as a road face image candidate area. Further, a road face may not be displayed at the left and right side of an image portion corresponding to an image upper-lower direction position that is close to the vanishing point. Therefore, such image portion and its left and right side image portion can be excluded when setting the road face image candidate area. In this case, the road face image candidate area set on the disparity image corresponds to an area encircled by points of W, A, B, C, D illustrated in FIG. 17.

In this first V map information generation processing, upon setting the road face image candidate area as described above, disparity pixel data (disparity image information component) that satisfies the above described extraction condition is extracted from the disparity image data in the set road face image candidate area (step S42). In this processing, based on information of the pre-set reference straight line 511 and information of ±δ that defines the extraction range 512 for the reference straight line 511, disparity pixel data existing in the concerned extraction range 512 is extracted. Then, the extracted disparity pixel data (x, y, d) is converted to V map component (d, y, f) to generate V map information (step S43).

(Second Example of Generating V Map Information)

Figure 18:
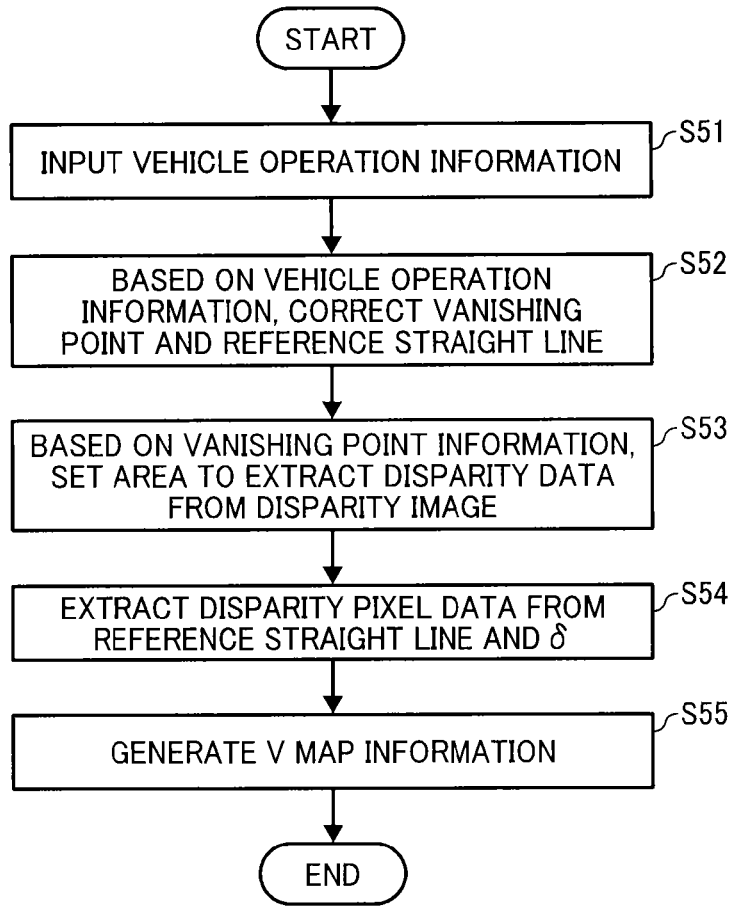
FIG. 18 is a flowchart showing the steps of another process of generating V map information (second V map information) according to one or more example embodiments.

FIG. 18 is a flowchart showing the steps of another process of generating V map information (hereinafter, second V map information generation processing) according to one or more example embodiments.

In this second V map information generation processing, V map information is generated using the vehicle operation information such as acceleration/deceleration information deceleration in the front and rear side direction of the vehicle 100. When the vehicle operation information is input (step S51), based on the acceleration/deceleration information in the front and rear side direction of the vehicle 100 included in the vehicle operation information, the vanishing point information and information of the reference straight line 511 are corrected (step S52). The subsequent steps S54 and S55 are same as the steps S42 and S43 of the first V map information generation processing.

The vanishing point information can be corrected at step S52 as follows. For example, when the vehicle 100 is in the acceleration, the weight is loaded to the rear side of the vehicle 100, and the vehicle 100 has an attitude that the front side of the vehicle 100 is directed to an upward in the vertical direction. With this attitude change, the vanishing point of road face shifts to a lower side of the image. In line with this shifting of the vanishing point, the image upper-lower direction position Vy of the vanishing point of road face information can be corrected based on the acceleration information. Further, for example, when the vehicle 100 is in the deceleration, the image upper-lower direction position Vy of the vanishing point of road face information can be corrected based on the deceleration information. By performing such correction process, an image portion displaying the road face can be effectively set as a road face image candidate area in the to-be-described setting process of road face image candidate area using the vanishing point information.

Further, information of the reference straight line 511 can be corrected as follows. The information of reference straight line 511 includes gradient α, and an intercept β of the reference straight line 511, in which the intercept β is a point in the image upper-lower direction position where the left end of image and the reference straight line 511 intersect. For example, when the vehicle 100 is in the acceleration, the weight is loaded to the rear side of the vehicle 100, and the vehicle 100 has an attitude that a front side of the vehicle 100 is directed to an upward in the vertical direction. With this attitude change, the road face image portion displaying the road face overall shifts to a lower side of the image.

To shift the extraction range 512 at a lower side of the image in line with such attitude change, the intercept β of the reference straight line 511, which is used as a base of the concerned extraction range 512, can be corrected based on the acceleration information. Further, for example, when the vehicle 100 is in the deceleration time, similarly, the intercept β of the reference straight line 511 can be corrected based on the deceleration information. By performing such correction process, an image portion displaying the road face can be effectively set as a road face image candidate area in the process of extracting disparity pixel data existing in the extraction range 512. Since the information of reference straight line 511 can be corrected using the acceleration/deceleration information, the "δ" defining the extraction range 512 can be determined without an effect of acceleration/deceleration of the vehicle 100. Therefore, the extraction range 512 of the second V map information generation processing can be set narrower compared to the extraction range 512 set by using a fixed reference straight line 511 used as the reference in the above described first V map information generation processing, with which processing time can be shortened and the road face detection precision can be enhanced.

As to the above described first V map information generation processing is performable by the V map generation unit 134-1 (FIG. 14), the disparity image data corresponding to the road face image portion is extracted before generating the V map information. Alternatively, as to the above described second V map information generation processing performable by the V map generation unit 134-2 (FIG. 15), V map component corresponding to the road face image portion can be extracted after generating the V map information.

(Detection of Road Face Shape)

A description is given of process performable by the road face shape detection unit 135. When the V map information is generated by the V map generation unit 134, the road face shape detection unit 135 performs the linear approximation processing based on a feature indicated by a combination of disparity value and y direction position (V map component) corresponding to the road face. Specifically, the linear approximation is performed for high frequency points on the V map indicating a feature that disparity values become smaller as closer to the upper part of the captured image. If the road face is flat, approximation can be performed using one straight line with enough precision. However, if the road face condition changes in the moving direction of the vehicle 100 due to slope or the like, the approximation cannot be performed with enough precision by using one straight line. Therefore, in the example embodiment, depending on disparity values of V map information, disparity values can be segmented into two or more disparity value segments, and the linear approximation is performed for each one of the disparity value segments separately.

Figure 19:
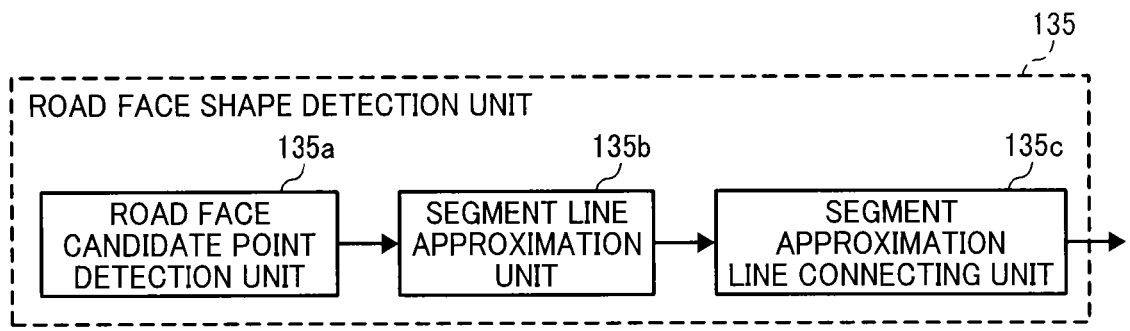
FIG. 19 is a block diagram showing a process performable in a road face shape detection unit.

FIG. 19 is a block diagram showing a process performable in the road face shape detection unit 135. The road face shape detection unit 135 includes, for example, a road face candidate point detection unit 135a, a segment line approximation unit 135b, and a segment approximation line connection unit 135c. Upon receiving V map information output from the V map generation unit 134, in the road face shape detection unit 135, based on a feature indicated by V map component corresponding to the road face, the road face candidate point detection unit 135a detects high frequency points on the V map, indicating a feature that disparity values become smaller as closer to the upper part of the captured image, as a road face candidate points.

In the example embodiment, the detection process of road face candidate points by the road face candidate point detection unit 135a can be performed as follows. Specifically, V map information is segmented into two or more disparity value segments depending on disparity values, and based on a determination algorism corresponding to each of the disparity value segments, road face candidate points for each of the disparity value segments are determined. Specifically, for example, V map is segmented into two segments in the X-axis direction with respect to a disparity value corresponding to a given reference distance, which means a segment having greater disparity values and a segment having smaller disparity values are set. Then, different detection algorisms for detecting road face candidate points are applied to different segments to detect road face candidate points. As to a shorter distance area having greater disparity values, a first road face candidate point detection process is performed, which is to be described later. As to a longer distance area having smaller disparity values, a second road face candidate point detection process is performed, which is to be described later.

The road face candidate point detection process is differently performed to the shorter distance area having greater disparity values and longer distance area having smaller disparity values due to the following reasons. As illustrated in FIG. 10A, in the captured image capturing ahead of the vehicle 100, the occupation area of road face image area at the shorter distance road face becomes great, and the number of pixels corresponding to the road face is great, with which frequency on the V map becomes great. By contrast, the occupation area of road face image area at the longer distance road face becomes small, and the number of pixels corresponding to the road face is small, with which frequency on the V map is small.

Therefore, frequency value of points corresponding to the road face on the V map becomes small at the longer distance, and becomes great at the shorter distance. Therefore, for example, if the same value such as the same frequency threshold is used for road face candidate point detection in the shorter distance area and longer distance area, road face candidate points can be effectively detected for the shorter distance area, but road face candidate points may not be effectively detected for the longer distance area, with which road face detection precision for the longer distance area decreases. By contrast, if a value that can effectively detect a road face candidate point for the longer distance area is used for detection of the shorter distance area, noise may be detected for the shorter distance area, with which road face detection precision for the shorter distance area decreases.

Therefore, in the example embodiment, V map is segmented into the shorter distance area and longer distance area, and the road face candidate points are detected using different values and detection methods suitable for each segment, with which road face detection precision for each area can be maintained at a high level.

Figure 20:
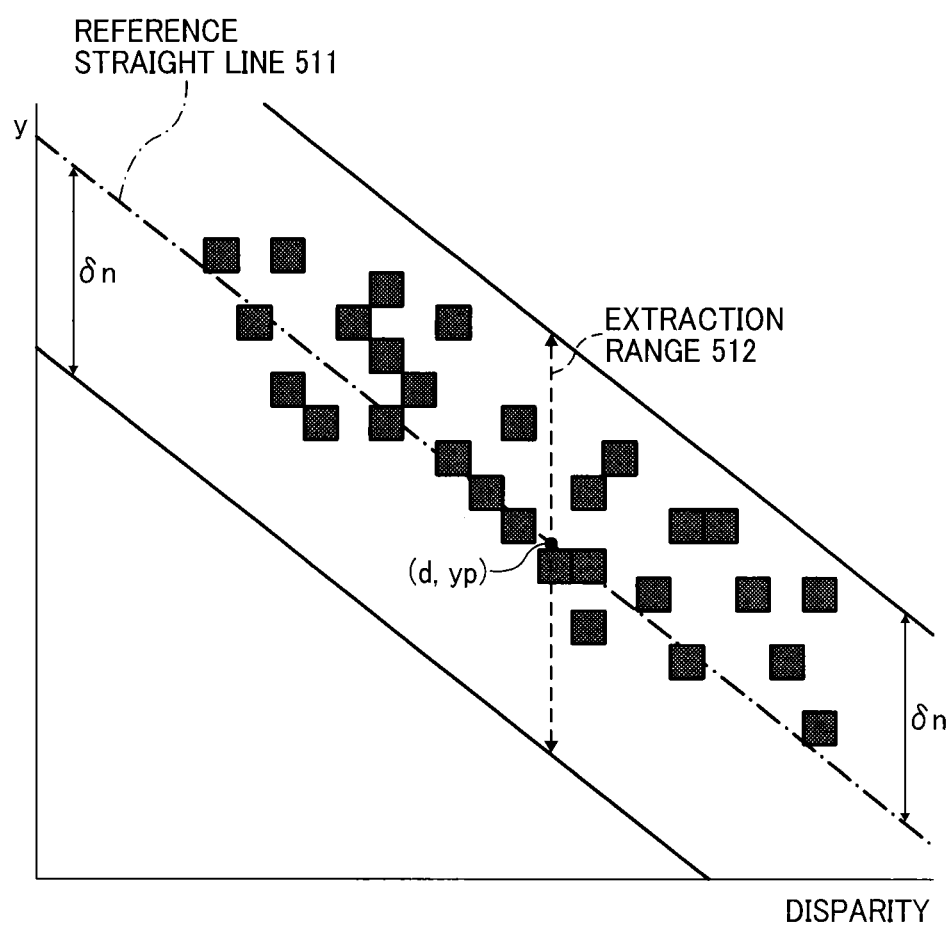
FIG. 20 is a chart for explaining a process of detecting first road face candidate points, and a process of detecting second road face candidate points.

FIG. 20 is a chart for explaining a detection process of first road face candidate points, and a detection process of second road face candidate points. In the detection process of the first road face candidate points, as to each disparity value "d," V map component (d, y, f) included in the V map information is searched within a given search range by changing positions in the y direction. Specifically, among V map component (d, y, f) included in the V map information, a V map component having a frequency value greater than a first frequency threshold and having the greatest frequency value is searched, and this searched V map component is determined as a road face candidate point for the concerned disparity value "d." In this process, the first frequency threshold is preferably set to a lower value so that V map component corresponding to the road face may not be missed. As above described, since the V map generation unit 134 extracts V map component corresponding to the road face, even if the first frequency threshold is set to the lower value, a probability of determining V map component not corresponding to the road face as a road face candidate point can be reduced.

The search range for changing y value for each disparity value "d" corresponds to the extraction range 512 set for the above described V map generation unit 134, which means a range of ±δ in the image upper-lower direction is set using an image upper-lower direction position "yp" of the reference straight line 511 as the center. Specifically, a range from "yp−δ" to "yp+δ" is used as the search range. With this configuration, a y-value range that is required to be searched can be set narrower, with which the road face candidate point detection process can be devised with faster speed.

The detection process of the second road face candidate points can be performed as similar to the above described detection process of the first road face candidate points except using the second frequency threshold instead of the first frequency threshold. In the detection process of the second road face candidate points, as to each of disparity value "d," V map component is searched by changing positions in the y direction within a given search range. Specifically, V map information includes a plurality of V map components (d, y, f). Among the V map components (d, y, f) included in the V map information, V map component (d, y, f) having a frequency value greater than the second frequency threshold and further having the greatest frequency value f is searched, and this searched V map component is determined as a road face candidate point for the concerned disparity value "d."

Figure 21:
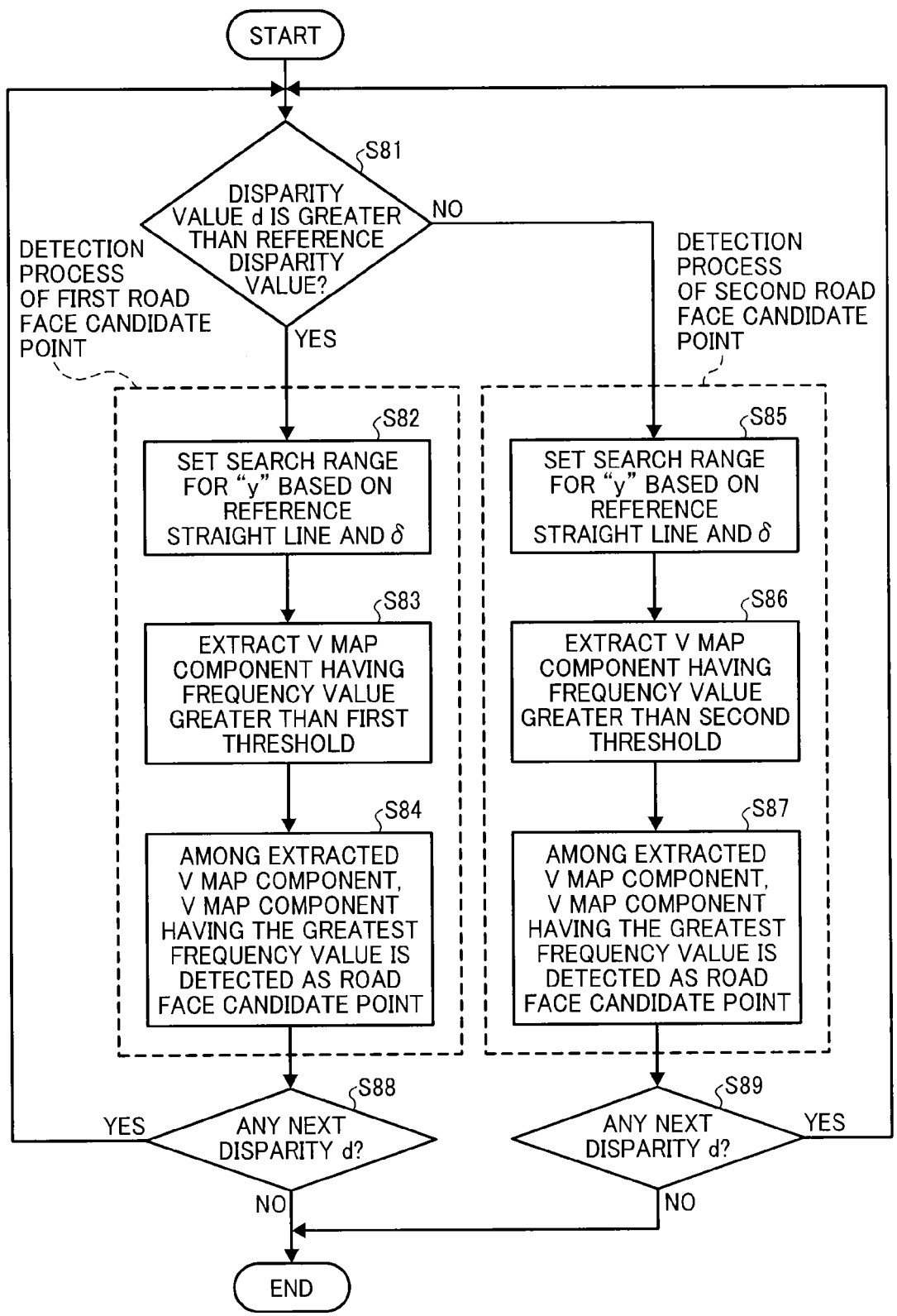
FIG. 21 is a flowchart showing the steps of a process of detecting road face candidate points performable by a road face candidate point detection unit.

FIG. 21 is a flowchart showing the steps of a detection process of road face candidate points performable by the road face candidate point detection unit 135a. For example, as to the input V map information, road face candidate points are detected for each of disparity values "d" starting from a disparity value "d" having the greatest value to detect a road face candidate point (y, d) for each disparity value "d." If the disparity value "d" is greater than a reference disparity value corresponding to a given reference distance (step S81: YES), the above described first road face candidate point detection process is performed. Specifically, a search range for "y" such as "yp−δ" to "yp+δ" corresponding to the concerned disparity value "d" is set (step S82), and then V map component (d, y, f) within the search range and having a frequency value "f" greater than the first frequency threshold is extracted (step S83). Then, among the extracted V map components, V map component (d, y, f) having the maximum frequency value "f" is detected as a road face candidate point for the concerned disparity value "d" (step S84).

The first road face candidate point detection process is repeatedly performed until the disparity value "d" becomes the reference disparity value or less (step S85). When the disparity value "d" becomes the reference disparity value or less (step S81: NO), the above described the second road face candidate point detection process is performed for the road face candidate point detection. In the second road face candidate point detection process, a search range for y such as "yp−δ" to "yp+δ" corresponding to the concerned disparity value "d" is set (step S86). Then, V map component (d, y, f) within the search range and having a frequency value greater than the second frequency threshold is extracted (step S87). Then, among the extracted V map components, V map component (d, y, f) having the maximum frequency value f is detected as a road face candidate point for the concerned disparity value "d" (step S88). This the detection process of the second road face candidate points is repeatedly performed until the disparity value "d" does not exist anymore (step S89).

By performing the above road face candidate point detection process using the road face candidate point detection unit 135a, the road face candidate point (extraction processing target) is detected for each disparity value "d." Then, the segment line approximation unit 135b performs linear approximation processing for the road face candidate points to obtain an approximated straight line on the V map. If the road face is flat, the approximation for entire disparity values on the V map can be performed using one straight line with enough precision. But if the road face condition changes in the moving direction of the vehicle 100 due to slope condition or the like, the approximation cannot be performed with enough precision by using one straight line. Therefore, in an example embodiment, V map information is segmented into two or more disparity value segments depending on disparity values, and linear approximation is performed for each one of disparity value segments separately.

The linear approximation processing can be performed using least squares approximation, but the linear approximation processing can be performed more correctly using other approximation such as RMA (Reduced Major Axis). The least squares approximation can be computed correctly on an assumption that X-axis data has no error and Y-axis data has error. However, when considering a feature of road face candidate point detected from the V map information, Y-axis data "y" of each V map component included in the V map information may indicate a correct position on an image, but X-axis data of each V map component such as the disparity value "d" may include error. Further, in the road face candidate point detection process, searching of road face candidate point is performed along the Y-axis direction to detect a V map component having the maximum y value as a road face candidate point. Therefore, the road face candidate point may also include error in the Y-axis direction. Therefore, V map component set as the road face candidate point may include error in the X-axis direction and the Y-axis direction, which means the assumption of the least squares approximation may not be established. Therefore, reduced major axis (RMA) compatible with two variables of "d" and "y" can be effectively used.

Figure 22:
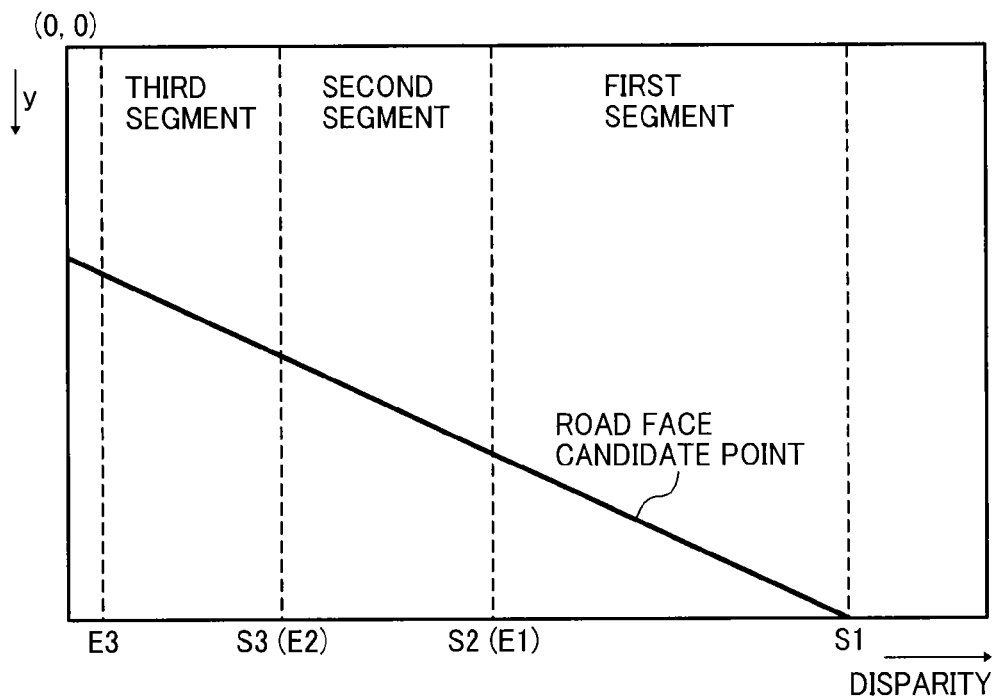
FIG. 22 is an example case segmenting a V map into three segments.

FIG. 22 is an example case segmenting a V map into three segments (disparity value segments). In this example case, V map information is segmented into, for example, three disparity value segments depending on disparity values. Specifically, in the order from great to small disparity values, a first segment, a second segment, and a third segment are set for the V map information as illustrated in FIG. 22. If the V map information is segmented into a plurality of segments having equal range using the distance as a reference, a segment width (disparity value range) becomes narrower for a segment having a longer distance on the V map, in which linear approximation precision deteriorates. Further, if the V map information is segmented into a plurality of segments equally using the disparity value as a reference, a segment width (disparity value range) becomes narrower for a segment having a shorter distance on the V map, in which the first segment becomes too narrow, and the first segment becomes useless.

In light this issue, a segmentation rule is employed for the example embodiment, in which the first segment is set with a width corresponding to a pre-set fixed distance, and the second segment and the third segment are respectively set with a width in view of a previous segment right before a concerned segment (e.g. the first segment is right before the second segment). Specifically, for example, a width corresponding to a distance of the previous segment right before the concerned segment is multiplied by a constant number (e.g., two), and is set as a width of the concerned segment. With this segmentation rule, a suitable width (disparity value range) can be set for any segments. With this segmentation rule, a distance range becomes different for each of the segments, but the number of road face candidate points used for the linear approximation processing for each of the segments can be equalized, with which the linear approximation processing can be performed effectively at any segments.

Figure 23:
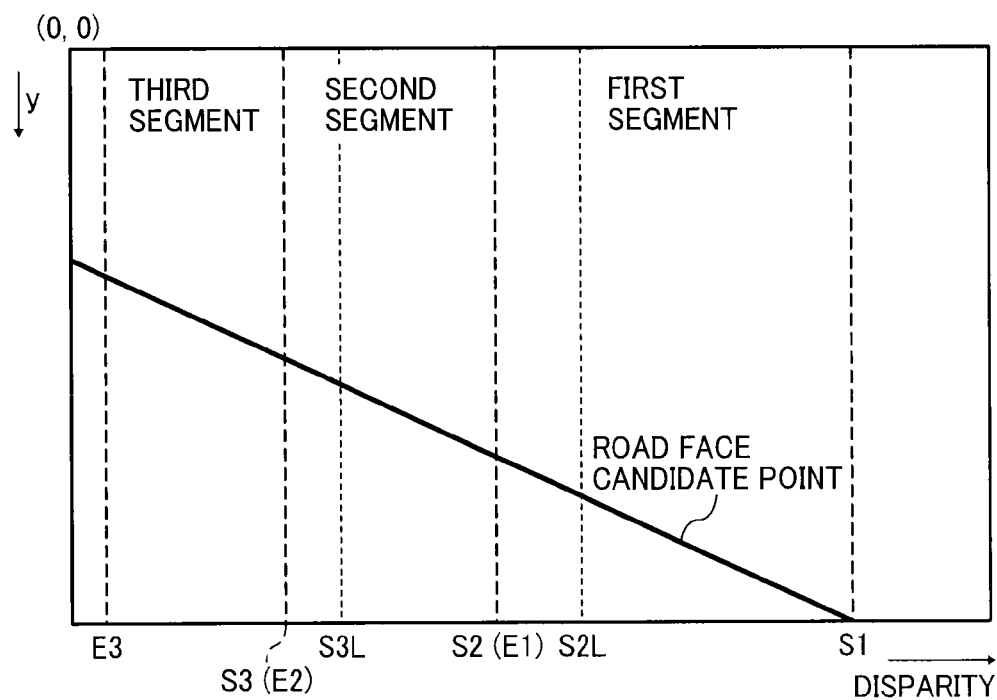
FIG. 23 is another example case segmenting a V map into three segments.

In an example case illustrated in FIG. 22, the first segment and the second segment are continuous segments without overlapping the segments, and the second segment and the third segment are continuous segments without overlapping the segments, but each segment can be set by overlapping with other segment. For example, as illustrated in FIG. 23, the start point S2L of the second segment can be set at a middle point between the start point S1 and the end point E1 of the first segment (e.g., the middle point is at a 3:1 dividing point of the first segment) while the end point E2 of the second segment is same as FIG. 22. Further, the start point S3L of the third segment can be set at a middle point between the end point E1 of the first segment and the end point E2 of the second segment (e.g., the middle point is at a 3:1 dividing point of the end point E1 of the first segment and the end point E2 of the second segment first segment) while the end point E3 of the third segment is same as FIG. 22.

By changing a distance range depending on the segment and overlapping the segments, the number of candidate points used for the linear approximation processing for each segment can be equalized, with which precision of the linear approximation processing for each segment can be enhanced. Further, by overlapping segments, correlation of the linear approximation processing between each of the segments can be enhanced.

Figure 24A:
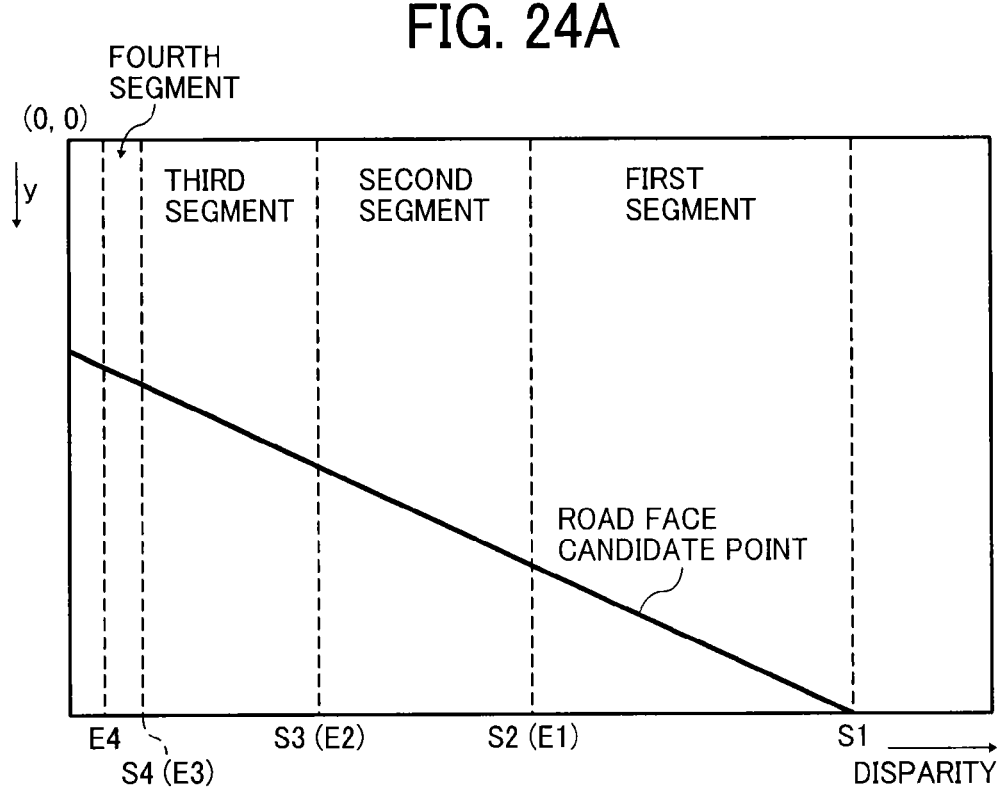
FIG. 24A is an example case segmenting a V map into four segments, in which a width of the last segment is narrower than a given width.
Figure 24B:
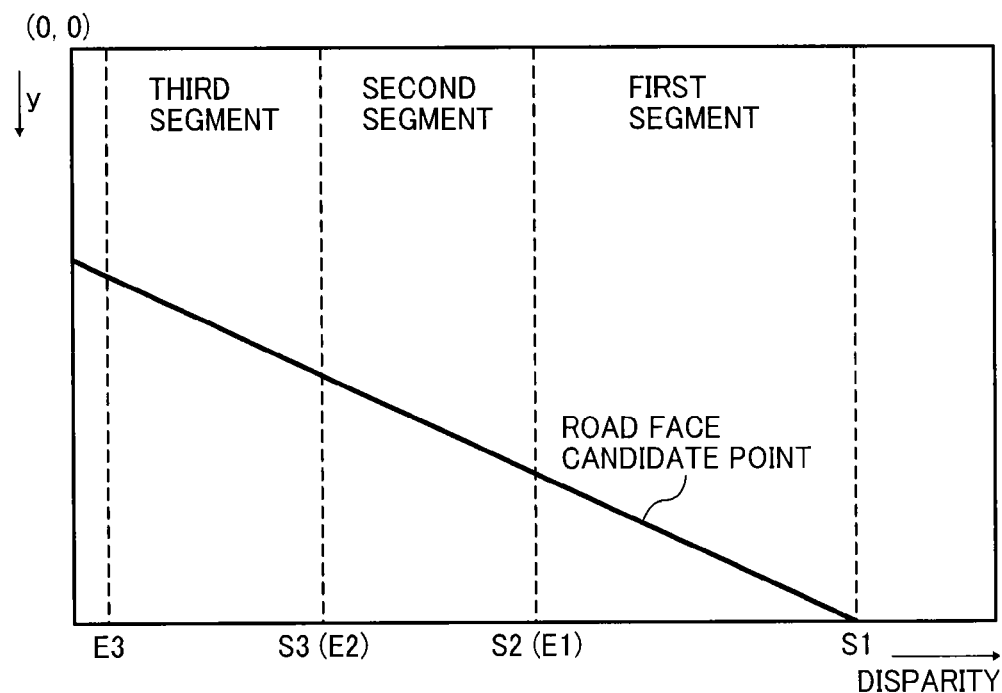
FIG. 24B is an example case that the last segment is combined with a previous segment to set a combined one segment.

Further, if the segments are set in the order from great to small disparity values using the above described segmentation rule, as illustrated in FIG. 24A, for example, the last segment such as a fourth segment may be set with a width (disparity value range) narrower than a width required for one segment. In this case, as illustrated in FIG. 24B, the fourth segment, which is the last segment, can be combined with a previous segment (i.e., third segment) and the combined one segment can be used as a third segment.

(Process of Segment Linear Approximation)

Figure 25B:
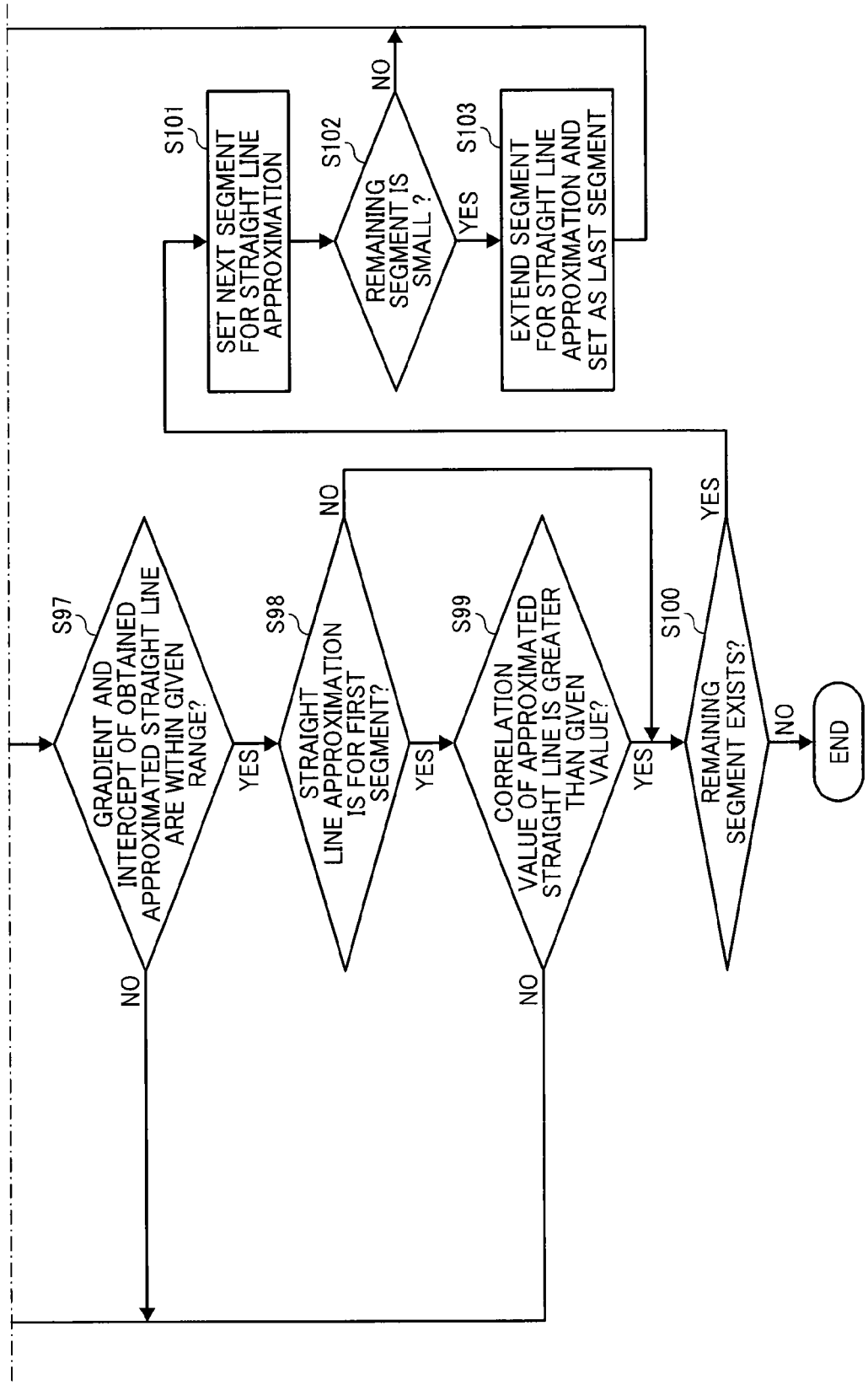
Figure 26A:
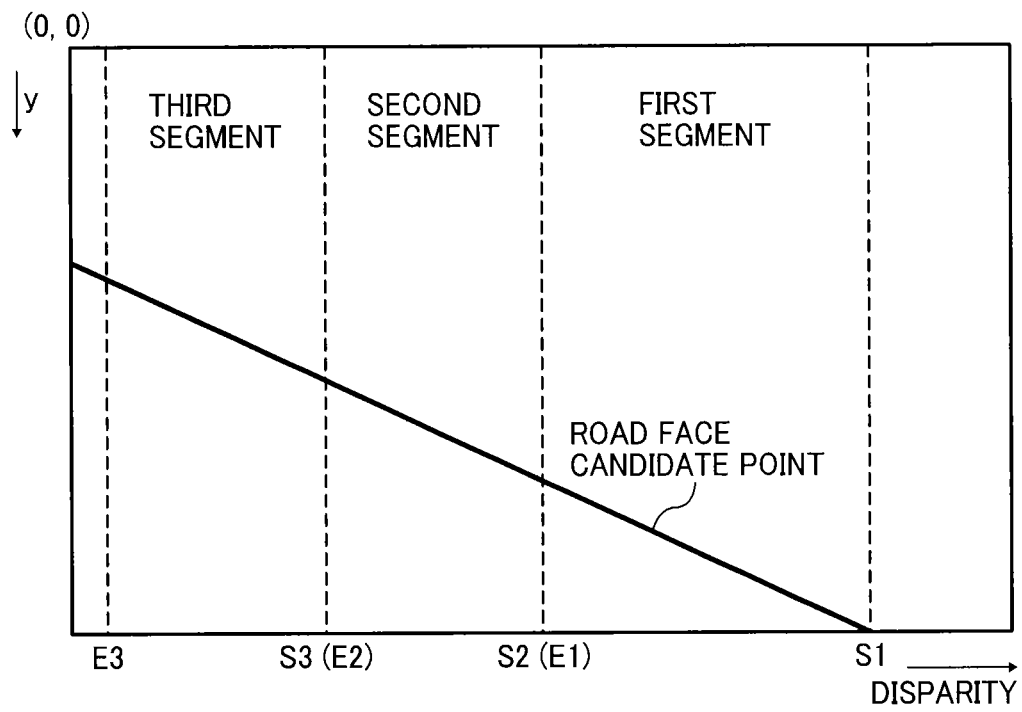
FIG. 26A illustrates an original first segment and an original second segment.
Figure 26B:
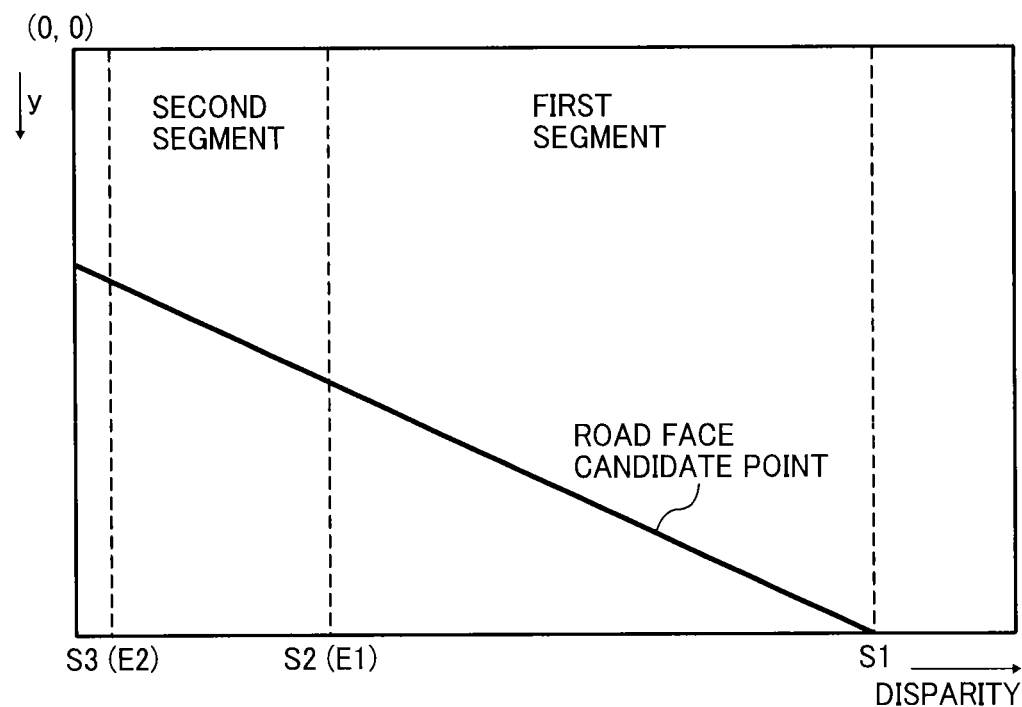
FIG. 26B illustrates a combined segment generated as a new one segment, which is referred to as a new first segment generated by extending the original first segment.
Figure 27A:
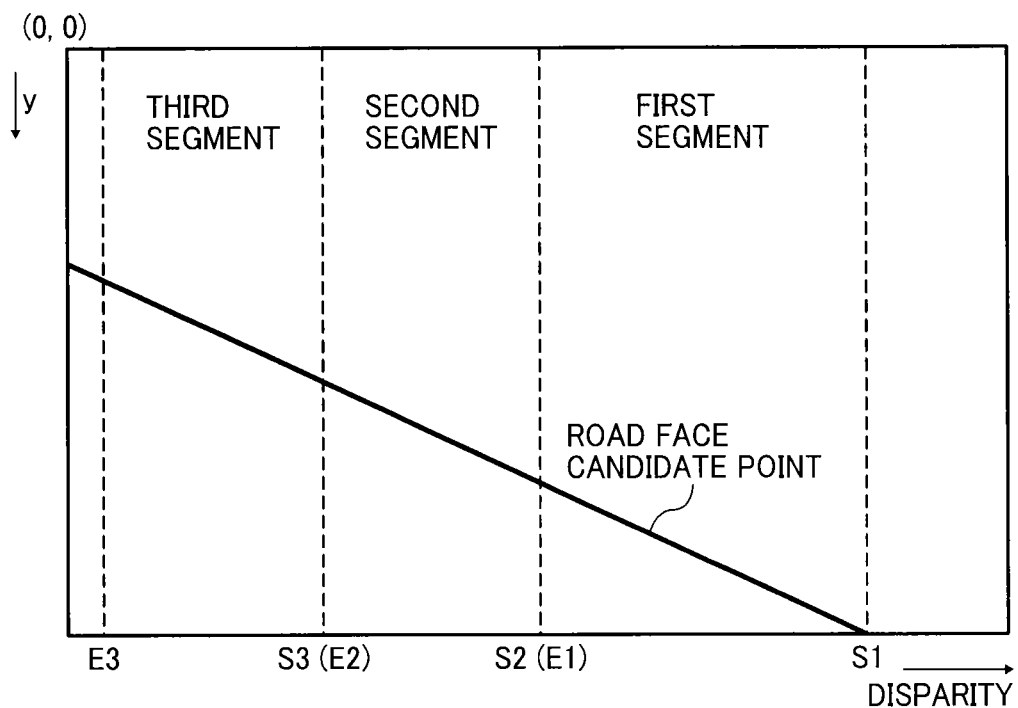
FIG. 27A illustrates an original second segment and an original third segment.
Figure 27B:
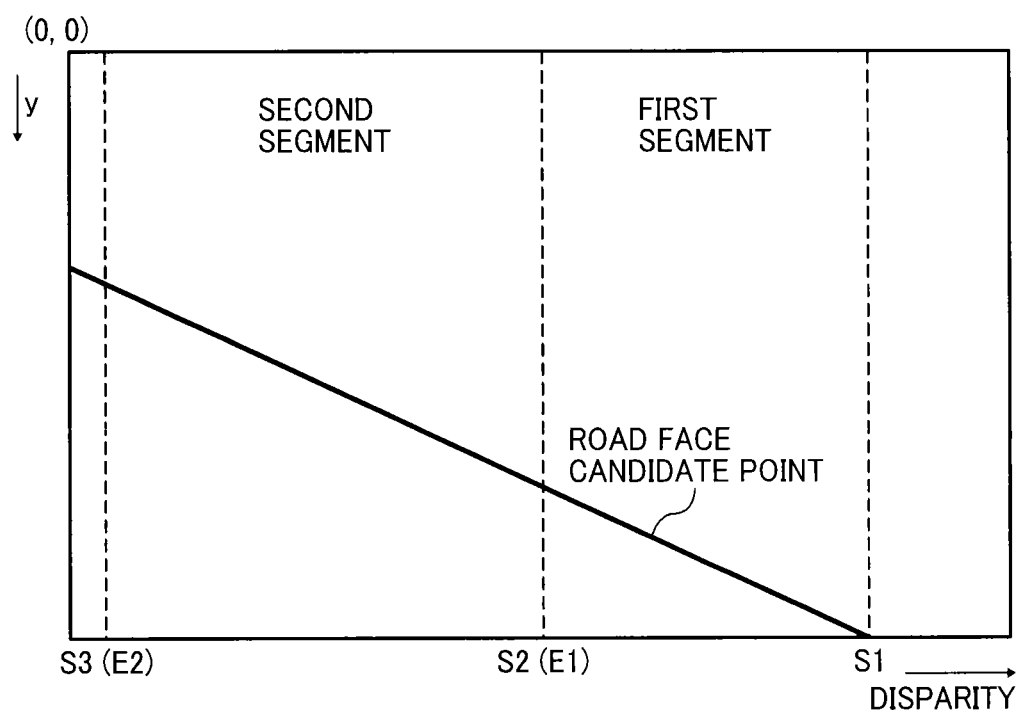
FIG. 27B illustrates a combined segment generated as a new one segment, which is referred to as a new second segment generated by extending the original second segment.
Figure 28A:
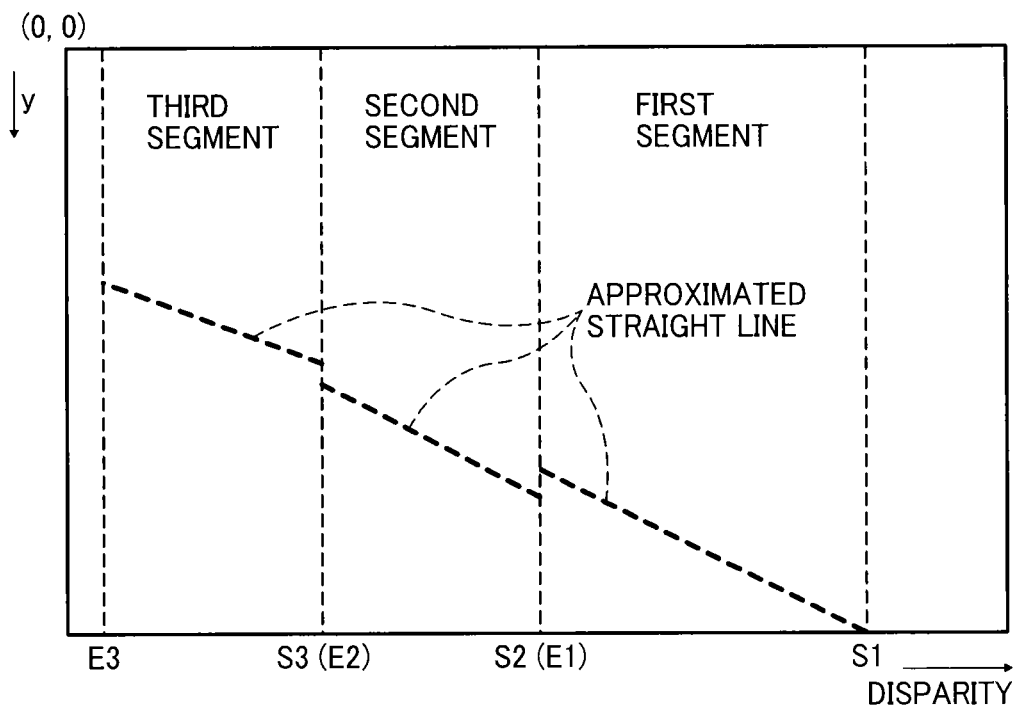
FIG. 28A illustrates one case that a plurality of approximated straight lines are not continuous at a segment boundary.
Figure 28B:
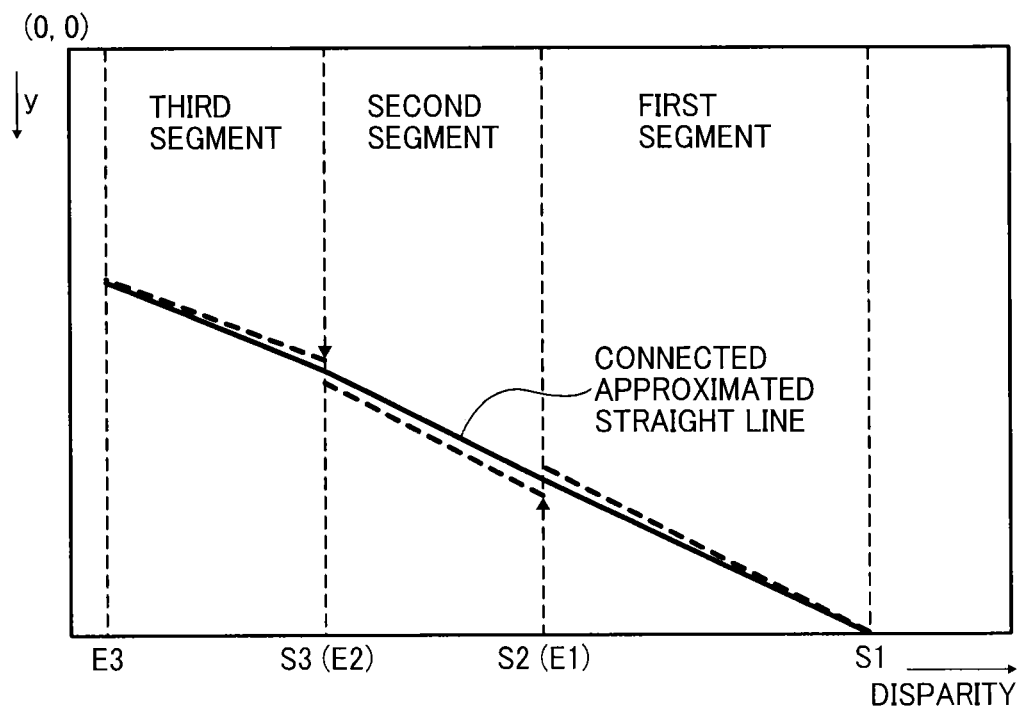
FIG. 28B illustrates one case that a plurality of approximated straight lines are corrected so that the approximated straight lines become continuous at a segment boundary.

FIGS. 25A and 25B are a flowchart showing the steps of a process of approximation of lines of segments performable by the segment line approximation unit 135b. FIG. 26A illustrates an original first segment and an original second segment, and FIG. 26B illustrates a combined segment generated as a new one segment, which is referred to as a new first segment generated by extending the original first segment (extended first segment). FIG. 27A illustrates the original second segment and the original third segment, and FIG. 27B illustrates a combined segment generated as a new one segment, which is referred to as a new second segment generated by extending the original second segment (extended second segment). FIG. 28A illustrates one case that a plurality of approximated straight lines obtained by performing the linear approximation processing to each of segments by the segment line approximation unit 135b are not continuous at the segment boundary, and FIG. 28B illustrates one case that a plurality of approximated straight lines output from the segment line approximation unit 135b are corrected so that the approximated straight lines in each of the segments become continuous at the segment boundary.

In this segment linear approximation processing, upon receiving data of road face candidate points of each disparity value "d" output from the road face candidate point detection unit 135a, the segment line approximation unit 135b sets the first segment having greater disparity values, which have the shorter distance from the vehicle (step S91). Then, the segment line approximation unit 135b extracts road face candidate points corresponding to each disparity value "d" in the first segment (step S92). If the extracted number of road face candidate points is a given number of less (step 93: NO), the concerned first segment is extended for a given disparity value (step S94). Specifically, an original first segment and an original second segment illustrated in FIG. 26A are combined, and the combined segment is generated as a new one segment, which is referred to as a first segment (extended first segment) as illustrated in FIG. 26B. In this case, an original third segment becomes a new second segment. Then, the segment line approximation unit 135b extracts road face candidate points corresponding to each disparity value "d" in the extended first segment again (step S92). If the extracted number road face candidate points becomes greater than a given value (step S93: YES), the linear approximation processing is performed for the extracted road face candidate points (step S95).

When a segment other than the first segment is extended such as when the second segment is extended, the original second segment and the original third segment illustrated in FIG. 27A are combined to prepare a new one segment, which is referred to as a new second segment (extended second segment) as illustrated in FIG. 27B.

Upon performing the linear approximation processing as described above and the processed segment is not the last segment (step S96: NO), reliability determination processing is performed to the approximated straight line obtained by the linear approximation processing. In this reliability determination processing, at first, it is determined whether a gradient and an intercept of the obtained approximated straight line are within a given range (step S97). If it is determined that the gradient and the intercept are not within the given range (step S97: NO), the concerned first segment is extended for a given disparity value (step S94), and the linear approximation processing is performed for the extended first segment again (steps S92 to S95). If it is determined that the gradient and the intercept are within the given range (step S97: YES), it is determined whether the segment having received the linear approximation processing is the first segment (step S98).

If it is determined that the segment having received the linear approximation processing is the first segment (step S98: YES), it is determined whether a correlation value of the approximated straight line is greater than a given value (step S99). If it is determined that the correlation value of the approximated straight line is greater than the given value (step S99: YES), the concerned approximated straight line is determined as an approximated straight line of the concerned first segment. Further, if it is determined that the correlation value of the approximated straight line is the given value or less, the concerned first segment is extended for a given disparity value (step S94), and the linear approximation processing is performed for the extended first segment again (steps S92 to S95), and further the reliability determination processing is performed again (steps S97 to S99). If it is determined that the segment having received the linear approximation processing is not the first segment (step S98: NO), the determination process for the correlation value of the approximated straight line (step S99) is not performed.

Then, it is checked whether a remaining segment exists (step S100). If the remaining segment does not exist (S100: NO), the segment line approximation unit 135b ends the segment linear approximation processing. By contrast, if the remaining segment exists (S100: YES), a next segment (e.g., second segment) is set, in which the next segment (e.g., second segment) is set with a width corresponding to a distance obtained by multiplying the distance corresponding to the width of the previous segment width with a constant number (step S101).

Then, the segment line approximation unit 135b determines whether a remaining segment that remains after setting the one segment (second segment) is smaller than a next setting segment (third segment) (step S102). If it is determined that the remaining segment is not smaller than the next setting segment (step S102: NO), the segment line approximation unit 135b extracts road face candidate points corresponding to each disparity value "d" in the concerned second segment, and performs the linear approximation processing for the extracted road face candidate points (step S92 to S95), and the reliability determination processing is performed (steps S97 to S99).

By repeating the setting of segments sequentially, the linear approximation processing, and reliability determination processing for the concerned segments as above described, at last at step S102, it is determined that the remaining segment is smaller than a next setting segment (S102: YES). In this case, the set segment is extended to include the concerned remaining segment, and this extended segment is set as the last segment (step S103). Then, the segment line approximation unit 135b extracts road face candidate points corresponding to each disparity value "d" in this last segment (step S92), and performs the linear approximation processing to the extracted road face candidate points (step S95). Then, it is determined that the concerned segment is the last segment (S96: YES), with which the segment line approximation unit 135b ends the segment linear approximation processing.

Typically, a plurality of approximated straight lines obtained by performing the linear approximation processing to each of the segments by the segment line approximation unit 135b are not continuous at the segment boundary as illustrated in FIG. 28A. Therefore, in the example embodiment, to set approximated straight lines of each of the segments as a continuous line at the segment boundary, the approximated straight lines output from the segment line approximation unit 135b are corrected so that the approximated straight lines of each of the segments become continuous at the segment boundary as illustrated in FIG. 28B. Specifically, for example, as to one segment and a next segment, the start point of approximated straight line of next segment (side where disparity value is greater) is shifted to the end point of approximated straight line of the one segment. Further, for example, two end points of approximated straight lines of two adjacent segments at one segment boundary are corrected, in which two end points of approximated straight lines of two adjacent segments are corrected to a middle point of the two end points so that the two approximated straight lines are connected at the middle point.

(Computation of Road Face Height Table)

Upon obtaining information of the approximated straight line on the V map by the road face shape detection unit 135 as described above, a road face height table computing unit 136 performs computing of road face height table, in which road face height, which is a relative height from the road face right below the vehicle 100 is computed and tabled. Based on the approximated straight line information on the V map generated by the road face shape detection unit 135, a distance to each road face portion displayed at each line area (each position in the image upper-lower direction) of a captured image can be computed. Further, the virtual plane extended in the moving direction of the vehicle 100 parallel to the road face right below the vehicle 100 is assumed, and the virtual plane is composed of a plurality of partial faces. It can be predetermined which line area in the captured image displays each of the partial faces of the virtual plane in the moving direction of the vehicle 100, and the virtual plane (reference road face) is expressed by a straight line (reference straight line 511) on the V map. By comparing the approximated straight line, output from the road face shape detection unit 135, with the reference straight line 511, height information of each road face portion ahead of the vehicle 100 can be obtained. In a simple method, height information of road face portion existing ahead of the vehicle 100 can be computed based on Y-axis position of the road face portion on the approximated straight line, output from the road face shape detection unit 135, in which the road face portion is at a distance n obtained from a disparity value corresponding to the Y-axis position. The road face height table computing unit 136 prepares a table of height of each road face portion obtained from the approximated straight line for a required disparity range.

The height of an object from the road face, displayed at one point in the captured image, can be computed as follows. When an object displayed in the captured image is at y' position for the Y-axis at one disparity value "d," the height of object displayed in the captured image from the road face can be computed as "y'−y0", wherein y0 is the Y-axis position on the approximated straight line for the concerned disparity value "d." The height H of object from the road face, corresponding to the coordinates (d, y') on the V map, can be computed using the following formula (2). In the following formula (2), "z" is distance computed from the disparity value "d" (z=BF/(d−offset)), and "f" is a value obtained by converting the units of focal distance of the camera to the same unit used for (y'−y0). "BF" is a value obtained by multiplying a base length of the stereo camera, and focal distance of the stereo camera, and "offset" is a disparity value when an object at infinity is captured.

$$H = z \times (y'-y0)/f \qquad (2)$$

Figure 29:
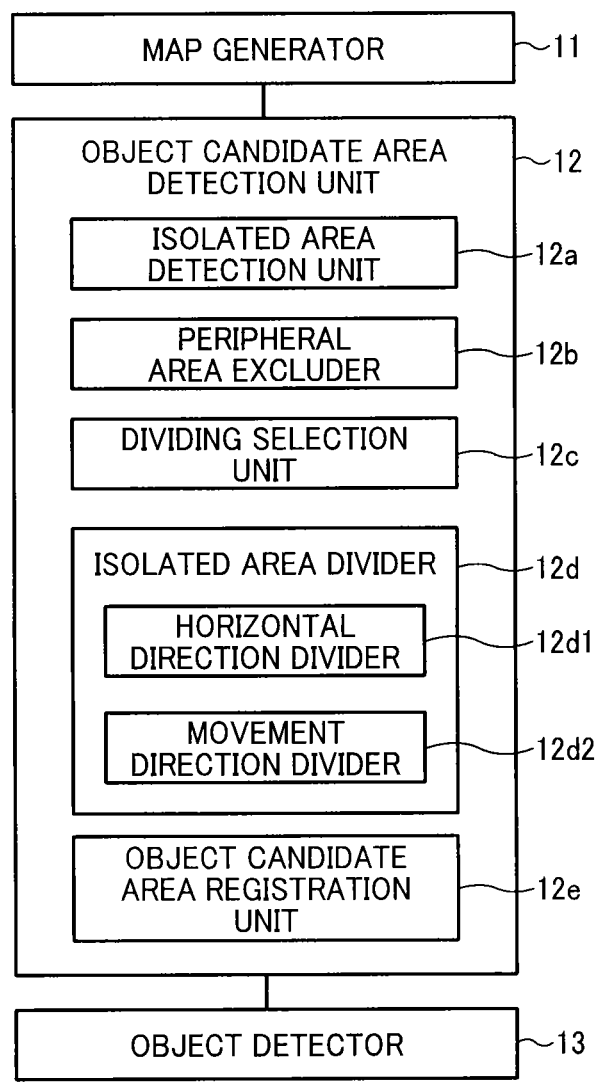
FIG. 29 is a functional block diagram of a feature performable by a map generation unit to a three dimensional position determination unit shown in FIG. 4.
Figure 30:
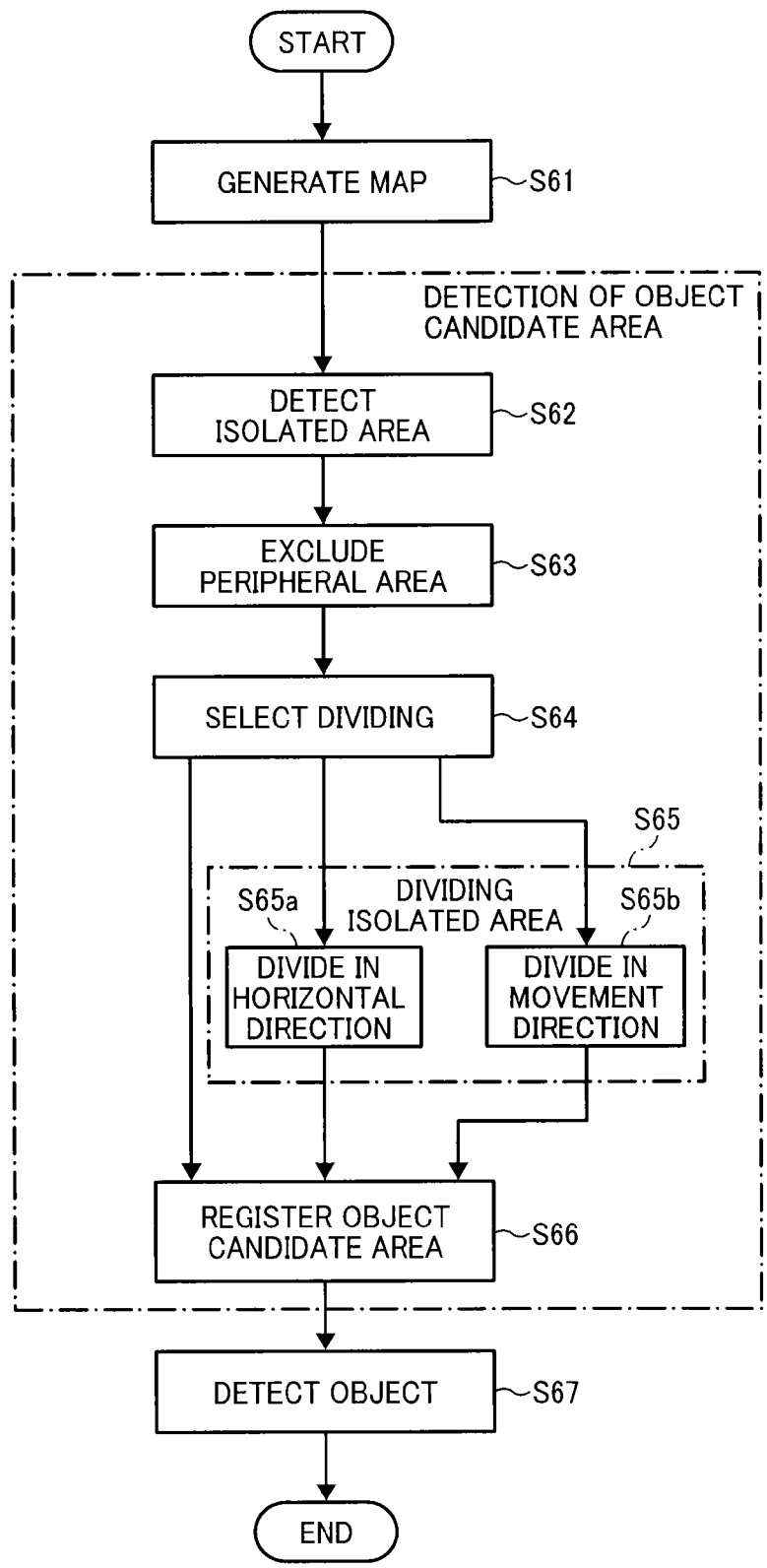
FIG. 30 is a flowchart showing the steps of a process performable by the functional blocks shown in FIG. 29.

A description is given of a feature of one or more example embodiments with reference to FIGS. 29 and 30. FIG. 29 is a functional block diagram of the feature of one or more example embodiments performable by the map generation unit 137 to the three dimensional position determination unit 143 shown in FIG. 4. FIG. 30 is a flowchart showing the steps of a process performable by the functional blocks shown in FIG. 29.

As illustrated in FIG. 29, the feature of one or more example embodiment includes, for example, a map generator 11, an object candidate area detection unit 12, and an object detector 13. Further, the object candidate area detection unit 12 includes, for example, an isolated area detection unit 12a, a peripheral area excluder 12b, a dividing selection unit 12c, an isolated area divider 12d, and an object candidate area registration unit 12e. Further, the isolated area divider 12d includes, for example, a horizontal direction divider 12d1, and a movement direction divider 12d2.

Further, as illustrated in FIG. 30, the process performable by the functional blocks of FIG. 29 includes, for example, a step of generating a map (S61), a step of detecting an isolated area (S62), a step of excluding peripheral areas (S63), a step of selecting of dividing (S64), a step of dividing an isolated area (S65) including a step of dividing in the horizontal direction (S65a) and a step of dividing in the movement direction (S65b), a step of registering an object candidate area (S66), and a step of detecting an object (S67).

A description is given of details of the functional block diagram of FIG. 29, and the process shown in FIG. 30.

(Generation of U Map)

A description is given of a U map generation unit 137 corresponding to the map generator 11 of FIG. 29. The U map generation unit 137 performs a process of generating U map, corresponding to the step of generating the map (S61) of FIG. 30, such as generating a frequency U map, and a height U map.

As to the frequency U map generation process, each disparity pixel data included in the disparity image data includes (x, y, d), which is a combination of the x direction position, the y direction position and the disparity value "d" set on the X-axis, Y-axis, and Z-axis respectively. By setting x for X-axis, d for Y-axis and frequency for Z-axis, a X-Y two dimensional histogram can be generated, which is referred to as the frequency U map. In the example embodiment, based on the height information of each road face portion tabled by the road face height table computing unit 136, the U map generation unit 137 generates a frequency U map using points (x, y, d) at given height H in the disparity image, which exist within a given height range (e.g., from 20 cm to 3 m) from the road face. With this configuration, an object existing in the given height range from the road face can be effectively extracted. For example, the U map is generated for points (x, y, d) in the disparity image corresponding to the lower fifth-sixth (⅚) of the image area of the captured image because the upper one-sixth (⅙) of the captured image displays sky in most cases, which means a target object may not be displayed in the upper one-sixth.

As to the process of generating the height U map, each disparity pixel data included in the disparity image data includes (x, y, d), which is a combination of the x direction position, the y direction position and the disparity value "d" set on the X-axis, Y-axis, and Z-axis respectively. By setting x for X-axis, d for Y-axis, and height from the road face for Z-axis, a X-Y two dimensional histogram can be generated, which is referred to as the height U map, in which a height value corresponds to a value of the highest point from the road face.

Figure 31:
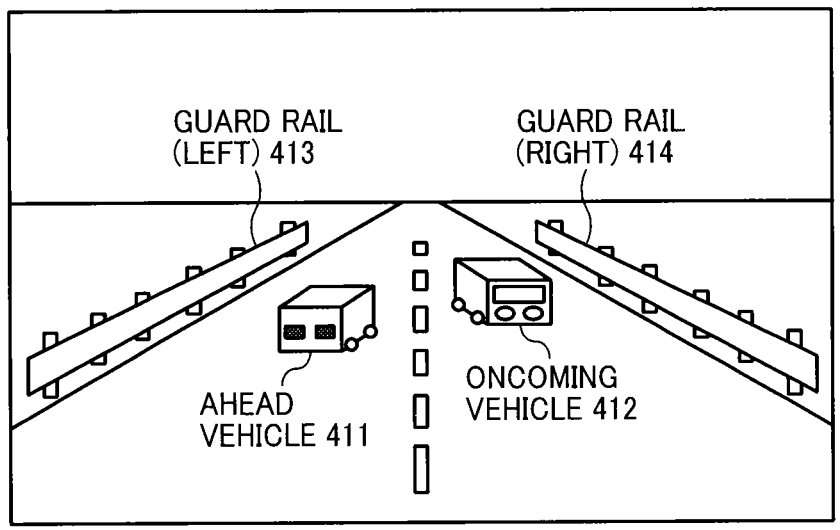
FIG. 31 is an example of a reference image captured by one capturing unit of FIG. 2.

FIG. 31 is an example of a reference image captured by the first capturing unit 110A, and FIG. 32 illustrates U maps corresponding to the image of FIG. 31, in which FIG. 32A illustrates a frequency U map, and FIG. 32B illustrates a height U map.

In an example image of FIG. 31, guard rails 413 and 414 exist respectively at the left and right sides of the road face, and other vehicles such as one ahead vehicle 411 and one oncoming vehicle 412 exist on the road face. In this example case, as illustrated in the frequency U map of FIG. 32A, high frequency points corresponding to the left and right guard rails 413 and 414 are respectively plotted as substantially straight lines 603 and 604 extending from the left end and the right end to the center while directed to a upward direction in the image. Further, high frequency points corresponding to the ahead vehicle 411 and oncoming vehicle 412 are respectively plotted as lines 601 and 602 substantially parallel to the X-axis direction between the left and right guard rails.

Further, in a case that side faces of the ahead vehicle 411 and oncoming vehicle 412 are displayed in addition to a rear side of the ahead vehicle 411 or a front side of the oncoming vehicle 412, disparity occurs in an image area displaying the same ahead vehicle 411 or the oncoming vehicle 412. In this case, as illustrated in FIG. 32A, high frequency points corresponding to the vehicle 411 or the oncoming vehicle 412 are plotted as a line substantially parallel to the X-axis direction and a line slanted to the X-axis direction, and these lines are connected.

Further, similar to the frequency U map of FIG. 32A, the highest points of the left and right guard rails 413 and 414, the ahead vehicle 411 and oncoming vehicle 412 from the road face are plotted as the height U map of FIG. 32B, in which profile 701 is composed of height points of the ahead vehicle 411, profile 702 is composed of height points of the oncoming vehicle 412, profile 703 is composed of height points of the left guard rail 413, and profile 704 is composed of height points of the right guard rail 414, and the height of profiles 701 and 702 are higher than the height of profiles 703 and 704.

With this configuration, height information of objects in the height U map can be used to detect the objects.

(Generation of Real U Map)

After generating the U map as above described, a real U map generation unit 138 generates a real U map. The real U map can be generated by converting the horizontal axis of the U map from the units of pixels of image to real distance, and converting the vertical axis of the U map from the disparity value to thinned-out disparity by applying a distance-dependent thinning rate. The real U map generation unit 138 can be included in the map generator 11, but can be omitted if following processing can be performed without the real U map generation unit 138.

Figure 33:
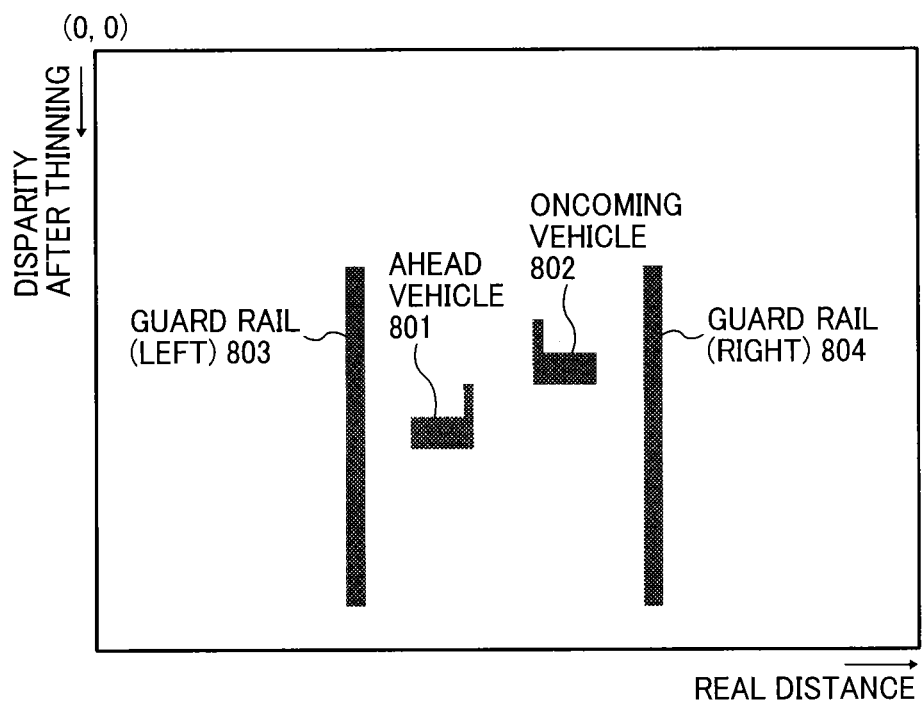
FIG. 33 is a real U map corresponding to the frequency U map of FIG. 32A.

FIG. 33 is a real U map corresponding to the frequency U map of FIG. 32A. Hereinafter, the real U map of FIG. 33 is referred to the real frequency U map. As illustrated in FIG. 33, the left and right guard rails are represented by vertical line patterns 803 and 804, and the ahead vehicle and oncoming vehicle are represented by patterns 801 and 802, which may have shapes close to actual or real shapes.

As to the thinning out of disparity in the vertical axis, for example, no thinning is set for far distance (e.g., 50 m or more), one-half (½) thinning is set for middle distance (e.g., 20 m or more to less than 50 m), one-third (⅓) thinning is set for near distance (e.g., 10 m or more to less than 20 m), and one-eighth (⅛) thinning is set for very close distance (e.g., less than 10 m).

As above described, the thinning rate is reduced as the distance becomes far. Since an object at the far distance is formed as a smaller image, an amount of disparity data is small, and distance resolution is small, and thereby the thinning rate is reduced. By contrast, since an object at near distance is formed as a larger image, an amount of disparity data is greater, and distance resolution is higher, and thereby the thinning rate is increased.

Figure 34:
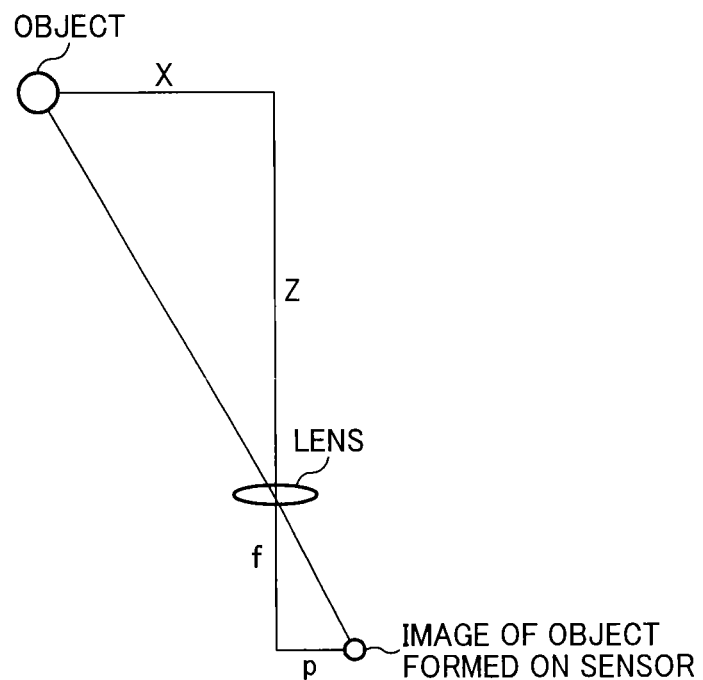
FIG. 34 is a method of computing a value in the horizontal axis of a real U map from a value in the horizontal axis of a U map.

A description is given of a method of converting the horizontal axis from the units of pixels of image to real distance with reference to FIG. 34, in which (X, d) of the real U map is computed from (x, d) of the U map. Specifically, a given width is set as an object detection range. For example, a range of 10 m is set for each of the left and right sides of a stereo camera, with which a width of 20 m is set as the object detection range. If a width of one pixel of the real U map in the horizontal direction is 10 cm, the horizontal direction size of the real U map becomes 200 pixels.

As illustrated in FIG. 34, the camera has the focal distance "f," a horizontal direction position of an image sensor from the center of the camera is set "p," a distance from the camera to an object is "Z," a horizontal direction position of the object from the center of the camera is "X," and a pixel size of the image sensor is set "s," in which "X" and "p" has a relationship expressed by "X=p/s." Further, based on property of the stereo camera, a relationship of "Z=Bf/d" is set.

Further, as illustrated in FIG. 34, since a relationship of "X=p×Z/f" is set, X can be expressed by "X=s×B/d." The "X" indicates the real distance. Since the width of one pixel in the horizontal direction on the real U map is, for example, 10 cm, a position of X on the real U map can be computed easily.

Further, a real U map corresponding to the height U map of FIG. 32B (hereinafter, real height U map) can be generated by using the above described process similarly.

The real U map has a feature that the height in the vertical and horizontal direction can be set smaller than the U map, with which processing can be performed with a faster speed. Further, since the horizontal direction is not depend on distance, the same object can be detected with the same width whether the same object is at far distance or near distance, with which the subsequent processes such as a process of excluding of peripheral areas, a process of determination of a horizontal direction dividing, a process of determination of vertical direction dividing (processing of width threshold), to be described later, can be performed easily.

The height of U map is determined by how long distance (e.g., meters) is set as the shortest distance, and based on "d=Bf/Z," the maximum value of "d" can be set. Since the disparity value "d" is used for the stereo imaging, the disparity value "d" is typically computed with the units of pixels. Since the disparity value "d" includes decimal, the disparity value is multiplied by a number such as 32 to round off the decimal so that the nearest whole number is used as the disparity value.

For example, when a stereo camera has the minimum distance of 4 m, and disparity value of 30 with the units of pixels, the maximum height of U map becomes 30×32=960. Further, when a stereo camera has the minimum distance of 2 m and the maximum disparity value of 60 with the units of pixels, the maximum height of U map becomes 60×32=1920.

When "Z" becomes one half (½), a value of "d" increases two times. Therefore, data of height direction of U map becomes greater with an amount corresponding to the increased amount. Therefore, when generating the real U map, the nearer the distance, the more the thinning of data to compress the height.

As to the above stereo camera, for example, a disparity value is 2.4 pixels at 50 m, a disparity value is 6 pixels at 20 m, a disparity value is 15 pixels at 8 m, and a disparity value is 60 pixels at 2 m. Therefore, no thinning is performed for the disparity value at 50 m or more, one-half (½) thinning is performed for the disparity value at 20 m to less than 50 m, one-third (⅓) thinning is performed for the disparity value at 8 m to less than 20 m, and one-fifteenth (1/15) thinning is performed for the disparity value at less than 8 m, which means the nearer the distance, the greater the thinning.

In this case, the height is set 2.4×32=77 from infinity to 50 m, the height is set (6−2.4)×32/2=58 from 50 m to 20 m, the height is set (15−6)×32/3=96 from 20 m to 8 m, and the height is set (60−15)×32/15=96 for less than 8 m. Therefore, the total height of the real U map becomes 77+58+96+96=327, which is very small compared to the height of U map, and thereby an object detection based on labeling can be performed at faster speed.

(Detection of Object Candidate Area)

A description is given of an object candidate area detection unit 139 corresponding to the object candidate area detection unit 12 shown in FIG. 29.

FIG. 35 is a flowchart showing the steps of a process of detecting an object candidate area performable by the object candidate area detection unit 139, which shows details of the step of detecting the isolated area (S62), the step of excluding peripheral area (S63), the step of selecting of dividing (S64), and the step of dividing the isolated area (S65), and the step of registering the object candidate area (S66) shown in FIG. 30.

(Detection of Isolated Area)

At first, the object candidate area detection unit 139 performs smoothing processing using information of the frequency real U map generated by the real U map generation unit 138 (step S111)

The smoothing is performed because effective isolated areas can be detected easily by averaging frequency values. Since disparity values have variance due to computation error, and disparity values may not be computed for the entire pixels, a real U map has noise different from a schematic image of FIG. 33. Therefore, the smoothing is performed to the real U map to remove noise and to divide a detection target object easily. Similar to the image smoothing, a smoothing filter (e.g., simple average of 3×3 pixels) can be applied to frequency values of the real U map (frequency real U map) to reduce noise frequency, with which frequency values of the target object becomes higher compared to a peripheral area, and one consolidated group of the frequency values, with which an isolated area detection process, to be performed later, can be performed easily.

Then, a binarization threshold is set (step S112). At first, the binarization of the smoothed real U map is performed using a small value such as zero "0" (step S113). Then, the labeling is performed for coordinates having values to detect an isolated area (step S114).

In steps S113 and S114, an isolated area (also referred to as island) having frequency greater than frequency of peripheral areas in the real frequency U map is detected. At first, the real frequency U map is binarized to detect an isolated area (step S113), in which the real frequency U map is binarized using a threshold of zero "0" because some islands are isolated but some islands are connected to other islands depending on height and shape of objects, and road face disparity. Binarization of the real frequency U map is started from a small threshold to detect an isolated island with a suitable size, and then, by increasing the threshold, connected islands can be divided to detect each isolated island with a suitable size.

A labeling is employed as a method for detecting an island after binarization (step S114). The labeling is performed to coordinates of islands having received the binarization process (i.e., coordinates having frequency values greater than the binarization threshold) based on the connection status of the islands, and an area assigned with the same label is set as one island.

Figure 36A:
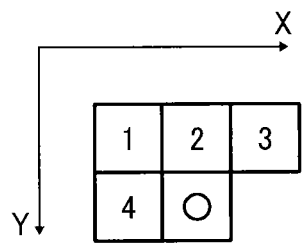
FIG. 36A is a chart for explaining a labeling process by the object candidate area detection unit.
Figure 36B:
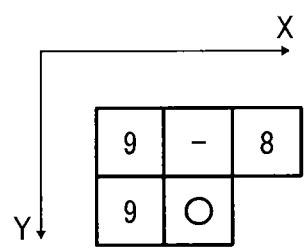
FIGS. 36B and 36C are charts for explaining a process of labeling when different labels exist around a concerned coordinate.
Figure 36C:
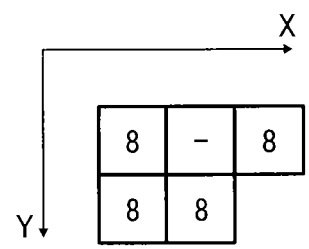

FIG. 36 illustrates a method of labeling. For example, FIG. 36A illustrates an example case that a coordinate 0 (island) is a target coordinate or pixel for labeling. If the coordinates corresponding to positions (pixels) 1, 2, 3, 4 existing around the coordinate 0 are labeled already, the same label of the pixels 1, 2, 3, 4 is assigned to the coordinate 0. If different labels (e.g., 8 and 9) are assigned to the positions 1, 2, 3, 4 as illustrated in FIG. 36B, a label having the smallest value (e.g., 8) is assigned to the coordinate 0, and other label (e.g., 9) assigned to the positions 1, 2, 3, 4 are substituted by the label having the smallest value (e.g., 8) as illustrated in FIG. 36C. Then, the width of isolated area (island) can be assumed close to the width W of the object. If the width W of the isolated area is within a given range, the isolated area is assumed as a candidate object area.

Referring back to FIG. 35, a size of the detected plurality of isolated areas is determined (step S115). Since the detection target includes various objects such as pedestrians, large cars, and others, it is determined whether the width of the isolated area is within a size range of a specific object. If the size is greater than (step S115: YES), the binarization threshold is incremented by one "1" (step S112), and then the binarization is performed for the specific isolated area in the real frequency U map (step S113). Then, the labeling is performed to detect a smaller isolated area (step S114), and a size of the detected isolated area is determined (step S115).

The above described processes from the threshold setting to the labeling are repeatedly performed to detect one or more isolated areas having desired size. The process from steps S113 to S115 corresponds to the step of detecting the isolated area (S62) of FIG. 30 performable by the isolated area detection unit 12*a*.

When the one or more isolated areas having the desired size are detected (step S115: NO), a process of excluding peripheral areas is performed (step S116). As to the process of excluding the peripheral areas, when an object is at a far distance and the detection precision of road face is low, disparity of the road face may be included in the real U map, and then disparity of the object and disparity of the road face may be detected as one block. In this case, the process of excluding peripheral areas is performed to exclude peripheral areas of the isolated area, wherein the peripheral areas exist at the left, right, and near side of the isolated area, and the peripheral areas may have a height that is close to the height of the road face. If it is determined that the excluding-required peripheral areas still exists (step S117: YES), the labeling is performed again to set an isolated area again (step S114). The process from steps S116 to S117 corresponds to the step pf excluding the peripheral areas (S63) of FIG. 30 performable by the peripheral area excluder 12b.

When the excluding-required peripheral areas do not exist anymore (step S117: NO), a size (e.g., width, height, distance) of the isolated area that has received the excluding process of peripheral areas is determined (step S118). Based on a result at step S118, the isolated area is registered as an object candidate area after performing the horizontal direction dividing (step S119), the vertical direction dividing (step S120), or without no further processing. When the horizontal direction dividing process or vertical direction dividing process is performed (S121: YES, S122: YES), the labeling is performed again to set an isolated area again (step S114).

The process at step S118 corresponds to the step of selecting of dividing (S64) of FIG. 30 performable by the dividing selection unit 12c. Further, the dividing in the horizontal direction (step S119) corresponds to the step of dividing in the horizontal direction (step S65a) of FIG. 30 performable by the horizontal direction divider 12d1, and the dividing in the vertical direction (step S120) corresponds to the step dividing in the movement direction (step S65b) of FIG. 30 performable by the movement direction divider 12d2. Further, the registering as the object candidate area corresponds to the step of registering the object candidate area (step S66) of FIG. 30 performable by the object candidate area registration unit 12e When different objects (e.g., automobile and motor cycle, automobile and pedestrian, two automobiles) exist closely side by side, due to the effect of smoothing of the real frequency U map, the different objects may be detected as one isolated area, or disparity of different objects may be converged due to the disparity interpolation effect of disparity image. The horizontal direction dividing process detects such cases and performs the dividing, which will be described later in detail.

Further, when a plurality of ahead vehicles existing at far distance are running on the next lane, and variance of disparity of the ahead vehicles obtained by the stereo imaging is great, disparity values of each of the vehicles (objects) may extend in the upper and lower directions on the real frequency U map, and may be connected with each other, with which disparity values of the vehicles (objects) may be detected as one isolated area. The vertical direction dividing process detects such cases and divides a near-side running ahead vehicle and a far-side running ahead vehicle, which will be described later in detail.

A description is given of a process of excluding peripheral areas, a process of dividing in the horizontal direction, and a process of dividing in the vertical direction respectively performable by the peripheral area excluder 12b, the horizontal direction divider 12d1, and the movement direction divider 12d2.

(Excluding of Peripheral Area)

Figure 37A:
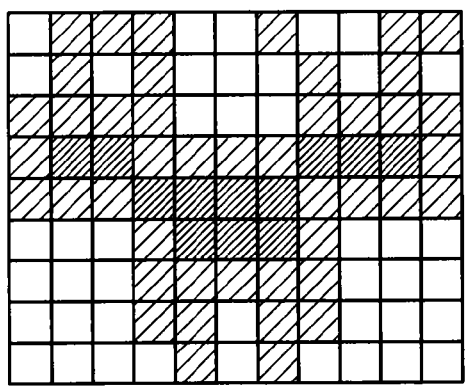
FIG. 37A is real frequency U map after performing a smoothing.
Figure 37B:
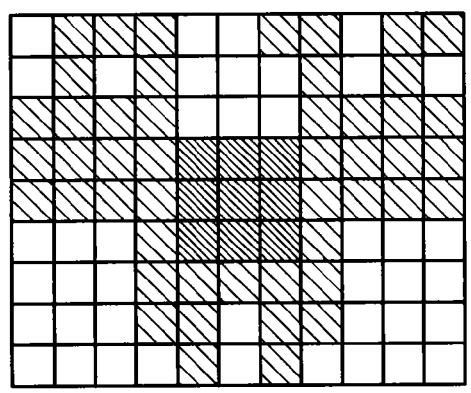
FIG. 37B is a real height U map.
Figure 37C:
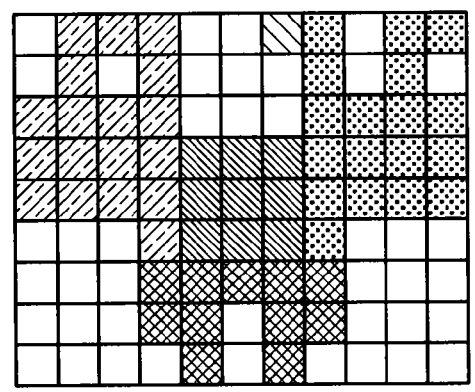
FIG. 37C is a real height U map after excluding peripheral areas.
Figure 38:
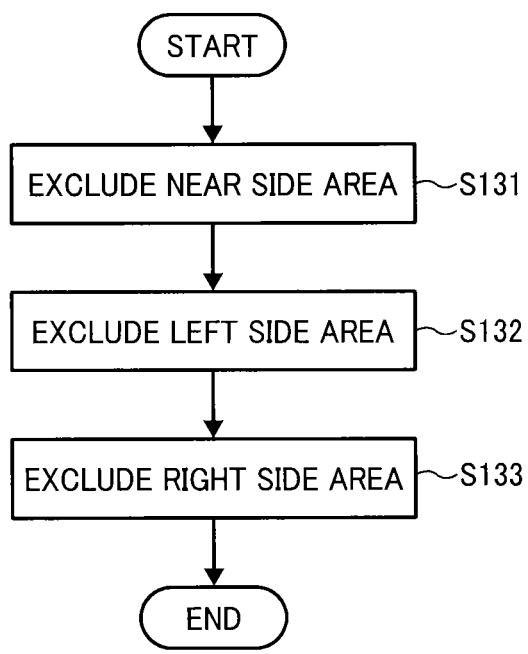
FIG. 38 is a flowchart showing the steps of a process of excluding peripheral areas.

FIG. 37 is a real U map showing a process of excluding peripheral areas, and FIG. 38 is a flowchart showing the steps of a process of excluding peripheral areas. FIG. 37A is a real frequency U map after performing the smoothing, FIG. 37B is a real height U map, and FIG. 37C is a real height U map after excluding peripheral areas. These maps schematically express actual data, which is same as FIG. 39 and FIG. 41 to be described later. The real frequency U map is generated by extracting points corresponding to vehicles such as ahead and oncoming vehicles in FIG. 33. Further, the real height U map is generated by extracting points corresponding to vehicles such as ahead and oncoming vehicles in a real height U map, which is not shown.

In FIGS. 37A and 37B, a road face (e.g., white line) at a far point is detected with a height lower than a real height, and the road face and a vehicle (object) are detected together as one block. When FIGS. 37A and 37B are compared, the higher height area and lower height area in FIG. 37B and the higher frequency area and lower frequency in FIG. 37A are not matched. In this case, instead of the frequency information, the height information is used to detect a boundary of the object and the road face to exclude peripheral areas because the height information can correctly express a shape of the object compared to the frequency information.

The excluding process of peripheral areas includes, for example, an excluding at a near side area (step S131), an excluding at a left side area (step S132), and an excluding at a right side area (step S133) as illustrated in FIG. 38.

The excluding at the near side area (step S131) includes a determination process using a height threshold set by the following conditions (i), (ii), or (iii). When the following conditions (i), (ii), or (iii) is established from the lowest end (bottom line) of the isolated area, the frequency of the concerned line is changed and excluded.

(Setting of Height Threshold)

A height threshold is set depending on a maximum height in one block. For example, if the maximum height is 120 cm or more, a threshold of 60 cm is set, and if the maximum height is less than 120 cm, a threshold of 40 cm is set.

Condition (i): the number of points having a height in one line is a given number (e.g., 5) or less, and points having a height of a threshold or more do not exist.

Condition (ii): the number of points having the height of the threshold or more in one line is smaller than the number of points having a height of less than the threshold, and the number of points having the height of the threshold or more is less than two (2).

Condition (iii): the number of points having the height of the threshold or more is less than ten (10) percent of the number of points having a height in the entire points of line.

The excluding at the left side area (step S132) and the excluding at the right side area (step 5133) include a determination process using a height threshold set by the following conditions (iv), (v), or (vi). When the following conditions (iv), (v), or (vi) is established from the left end row or the right end row of the isolated area, the frequency of the concerned line is changed and excluded.

(Setting of Height Threshold)

A height threshold is set depending on a maximum height in one bock. For example, if the maximum height is 120 cm or more, a threshold of 60 cm is set, and if the maximum height is less than 120 cm, a threshold of 40 cm is set. Condition (iv): the number of points having a height in one row is a given number (e.g., 5) or less, and points having a height of a threshold or more does not exist.

Condition (v): the number of points having the height of the threshold or more in one row is smaller than the number of points having a height less than the threshold, and the number of points having the height of the threshold or more is less than two (2).

Condition (vi): the number of points having the height of the threshold or more is less than ten (10) percent of the number of points having a height in the entire row.

By excluding the areas having lower height from the near side, left side, and right side, a center area having higher height remains as illustrated in FIG. 37C while the areas having lower height at the near side, left side, and right side are excluded. It should be noted that the above mentioned numbers for the conditions are just examples, and other numbers can be used.

(Dividing in Horizontal Direction)

Figure 39A:
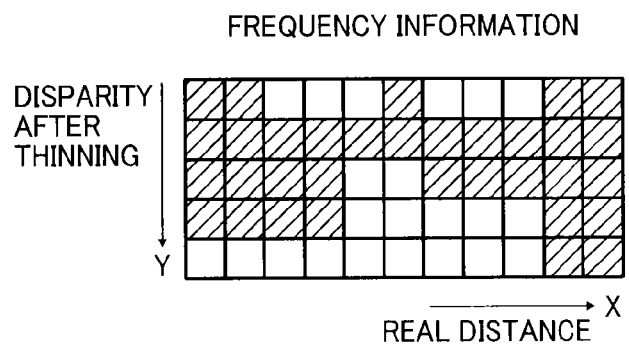
FIG. 39A is a real frequency U map after performing a smoothing.
Figure 39B:
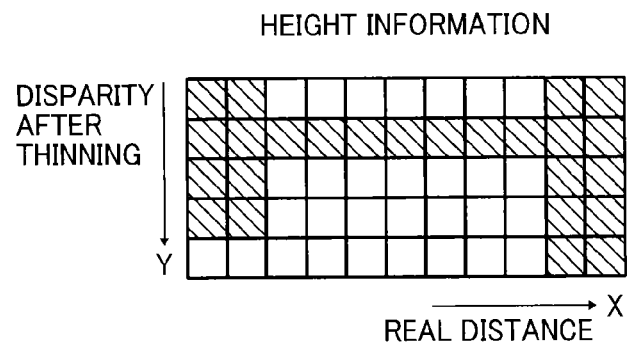
FIG. 39B is a real height U map.
Figure 39C:
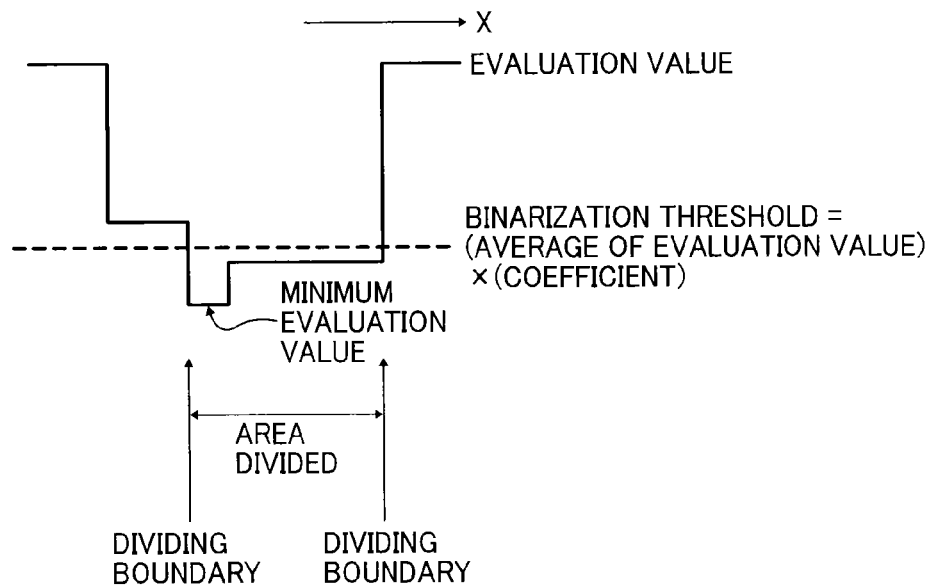
FIG. 39C illustrates a process of detecting a dividing boundary.
Figure 40:
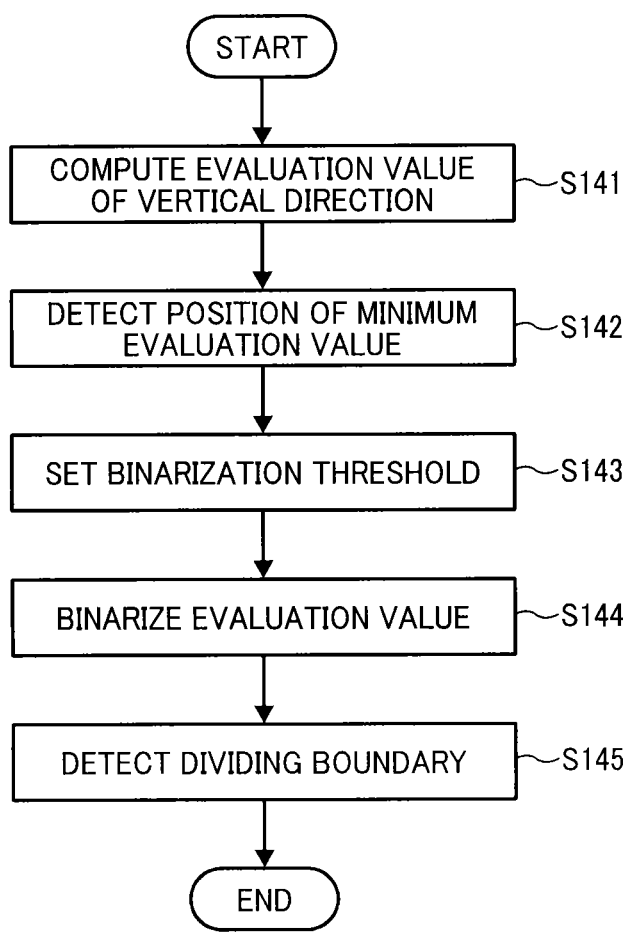
FIG. 40 is a flowchart showing the steps of dividing a disparity image in the horizontal direction.

FIG. 39 illustrates a process of dividing in the horizontal direction, and FIG. 40 is a flowchart showing the steps of dividing a disparity image in the horizontal direction. FIG. 39A is a real frequency U map after performing the smoothing, FIG. 39B is a real height U map, and IG. 39C illustrates a process of detecting a dividing boundary.

A description is given of an execution condition of dividing in the horizontal direction (S118→S119). In a case that the horizontal direction dividing is effective, since objects are connected in the horizontal direction, when one car having a width (about 2 m) is close to other object (e.g., distance is 50 cm), it can be estimated that a width of an isolated area detected from the real U map may exceed 2.5 m. Therefore, for example, when the width (or length) of the isolated area exceeds a given length (e.g., 2.5 m), the horizontal direction dividing processing is performed.

The horizontal direction dividing processing includes, for example, a process of computing evaluation values in the vertical direction (step S141), a process of detecting a position of a minimum evaluation value (step S142), a process of setting a binarization threshold (step S143), a process of binarization of evaluation values (step S144), and a process of detecting a dividing boundary (step S145) as illustrated in FIG. 40.

As to the process of computing the evaluation values in the vertical direction (step S141), after excluding the peripheral areas, products, which are obtained by multiplying values of each of points on the real frequency U map and values of each of points on the real height U map of the isolated area are added along the row direction to compute evaluation values in the horizontal direction, in which an evaluation value at each of X coordinates shown FIGS. 39A and 39B can be computed as "Σ(frequency×height)," in which Σ means a total of the values along the Y direction.

As to the process of detecting the position of the minimum evaluation value (step S142), as illustrated in FIG. 39C, the minimum evaluation value and the position of the minimum evaluation value can be detected from the computed evaluation values. Further, as to the process of setting the binarization threshold (step S143), as illustrated in FIG. 39C, an average of the evaluation values is multiplied by a given coefficient (e.g., 0.5) to obtain a binarization threshold of the evaluation value.

As to the process of binarization of the evaluation value (step S144), the evaluation values are binarized by the binarization threshold. As to the process of detecting the dividing boundary (step S145), as illustrated in FIG. 39C, an area having the minimum evaluation value and evaluation values smaller than the binarization threshold is set as a dividing area or area divided. Then, the both ends of the dividing area is set as a dividing boundary. By changing frequency values inside the dividing boundary, an isolated area can be divided in the horizontal direction. As above described, the horizontal direction divider 12d1 of the isolated area divider 12d can divide one connected isolated areas into two or isolated areas based on the frequency profile in the isolated area.

The above described evaluation value is used because of following reasons (vii), (viii), and (ix) such as (vii) frequency values at a connected portion become smaller than frequency values of an object, (viii) the connected portion on a height U map has different height compared to the object portion, or the number of data of the connected portion having a height is smaller than the number of data of the object portion, and (ix) variance of disparity at the connected portion on the height U map becomes smaller due to the effect of disparity interpolation.

(Dividing in Vertical Direction)

Figure 41:
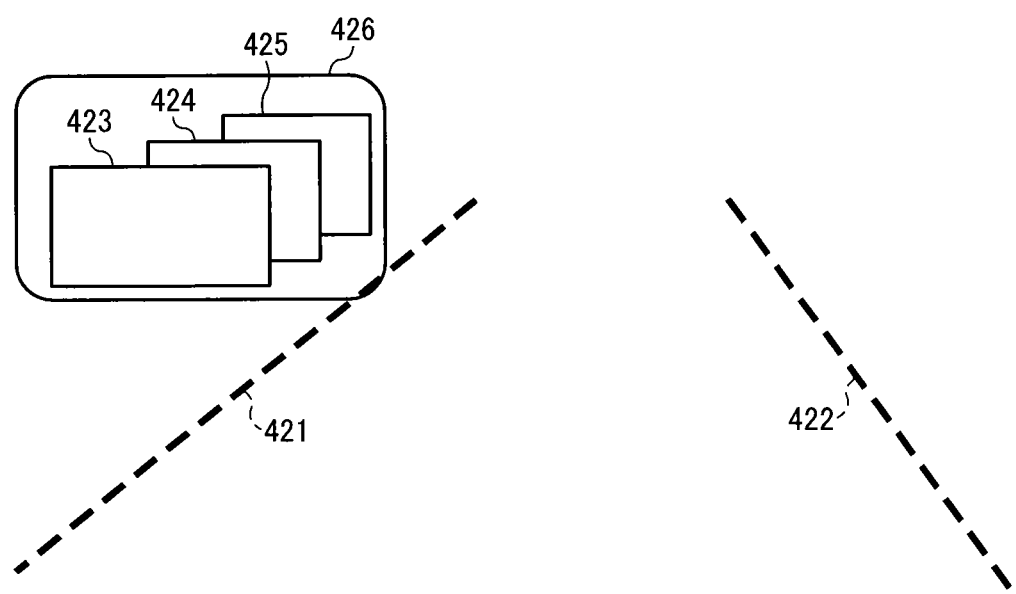
FIG. 41 is an example case when a vertical direction dividing is effective.
Figure 42D:
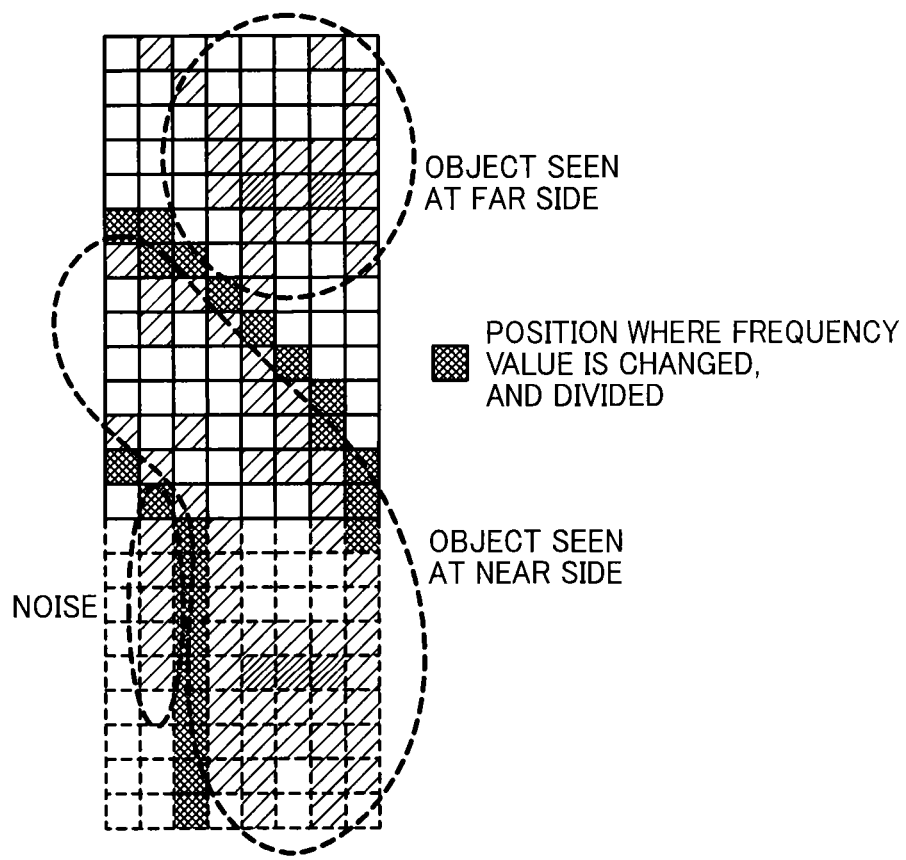
FIG. 42D is a result that indicates portions having positions that frequency values are updated and divided.
Figure 43:
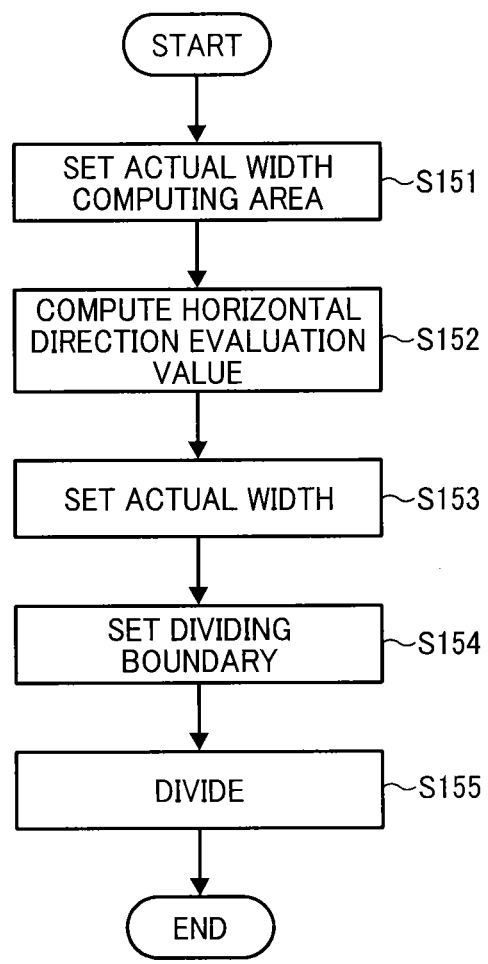
FIG. 43 is a flowchart showing the steps of dividing a disparity image in the vertical direction.
Figure 44:
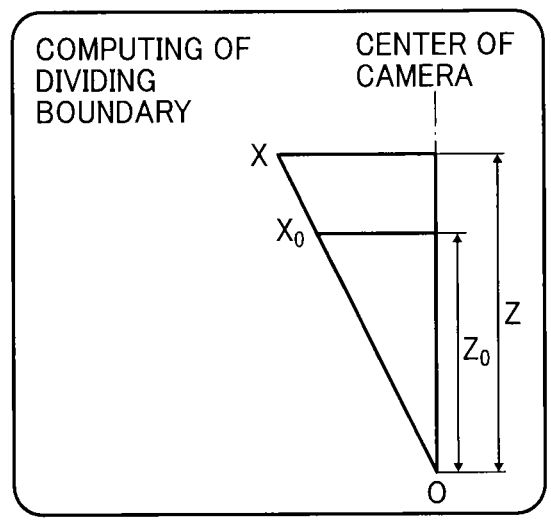
FIG. 44 is a schematic view explaining a computation of a dividing boundary used for dividing a disparity image in the vertical direction.

FIG. 41 is an example case when the vertical direction dividing is effective. FIG. 42 are schematic views for a process of dividing a disparity image in the vertical direction. FIG. 43 is a flowchart showing the steps of dividing a disparity image in the vertical direction. FIG. 44 is a schematic view explaining a computation of a dividing boundary used for dividing a disparity image in the vertical direction.

For example, the vertical direction dividing process can be effective to a following case. For example, a case that a plurality of objects such as three ahead vehicles 423, 424, 425 are running on a lane next to a lane defined by white lines 421 and 422 illustrated in FIG. 41 is considered. When the three ahead vehicles 423, 424, 425 are at a far point, and variance of disparity values obtained from the stereo imaging is great, disparity values of each of the objects may extend in the upper and lower directions on the real frequency U map, and then the disparity values may be detected as one isolated area 426. The vertical direction dividing process can be effective for detecting and dividing one ahead vehicle running at a near side and another ahead vehicle running at a far side.

A description is given of an execution condition of the vertical direction dividing process (S118→S120). When objects exist on the real U map along the vertical direction, the vertical direction dividing process is effectively used. For example, when two or more vehicles existing in the vertical direction are detected as one isolated area, a range of disparity range of the two or more vehicles and a range of the distance between two cars becomes disparity range of the isolated area. Therefore, other than guard rails and walls, the two or more vehicles have a broader disparity (distance) range. The vertical direction dividing is used for an isolated area having a greater disparity (distance) range depending on distance such as when vehicles running at a far point (e.g., 20 m or more) in the vertical direction and the vehicles are difficult to be detected separately. By contrast, since the guard rails and walls of buildings have a broader disparity range with a narrower width, the isolated area having the narrower width does not become a target of the vertical direction dividing process.

For example, when the nearest distance Zmin, the farthest distance Zmax, and a width W are set for the isolated area, the vertical direction dividing processing is conduced when any one of the following conditions (x) and (xi) is satisfied.

Condition (x): when W>1500 mm and Zmin>100 m, Zmax−Zmin>50 m

Condition (xi): when W>1500 mm and 100 m≥Zmin>20 m, Zmax−Zmin>40 m

As illustrated in FIG. 43, the vertical direction dividing processing includes, for example, a process of setting an area for computing an actual width (S151), a process of computing evaluation values in the horizontal direction (step S152), a process of setting an actual width (step S153), a process of setting a dividing boundary (step S154), and a process of dividing (step S155).

FIG. 42A is an example of a real frequency U map after performing the smoothing, in which two ahead vehicles running on the next lane at the left-side are detected as one isolated area. In this case, an area at the lower-side (near side) having greater frequency represents an ahead vehicle running at the near side, and an area at the upper-side (far side) having greater frequency represents an ahead vehicle running at the far side. Since disparity appears mostly at the left end and right end of the ahead vehicles, and variance of the disparity at the left end and right end is great, disparity extends by drawing a left curve at the both sides of areas having the greater frequency. Since this disparity extension becomes larger, disparity extension of the near-side ahead vehicle and disparity extension of the far-side ahead vehicle are connected, with which the two ahead vehicles are detected as one isolated area.

In this example case, a width of the detected isolated area is typically greater than a width of an actual ahead vehicle. Therefore, an area for computing the actual width is set (step S151: setting actual width computing area), in which a given distance range Zr is set depending on a size of the isolated area definable by Zmax and Zmin as indicated by the following three conditions (xii), (xiii), (xiv), and an actual width of the near-side ahead vehicle is searched within a disparity range corresponding to the distance range.

Condition (xii): when Zmin<50 m, Zr=20 m
Condition (xiii): when 50 m≤Zmin<100 m, Zr=25 m
Condition (xiv): when 100 m≤Zmin, Zr=30 m In FIG. 42A, the upper end of the disparity image corresponds to the Zmax, and the lower end of the disparity image corresponds to the Zmin. An area indicated by a frame of broken line is used as the actual width computing area Zr. Values of the Zr can be set based on a size of variance of disparity values obtained by the stereo camera.

Then, the evaluation values in the horizontal direction are computed in the actual width computing area (step S152: computing evaluation values in the horizontal direction). FIG. 42B illustrates computing of evaluation values at each line in the actual width computing area. Specifically, a frequency value is computed at each of pixels of each line in the actual width computing area and accumulated, and the accumulated frequency values can be set as an evaluation value at each line. Then, a line having the maximum evaluation value is detected as a detection position of an actual width.

Then, an area having the maximum length (or width) and continuous frequency values at the actual width detection position is detected as an actual width area. Further, the length of the actual width area, which is the maximum length of continuous frequency values at the actual width detection position, is estimated as an actual width (step S153: actual width setting). In an example case of FIG. 42C, the actual width becomes five (5).

Then, an outside of a boundary of the actual width is set as a dividing boundary (step S154: setting of dividing boundary). By using the dividing boundary as a reference, a position of the dividing boundary at each disparity of the isolated area is sequentially computed for each disparity, and set (step S155: dividing).

A method of computing the dividing boundary is described with reference to FIG. 44. The original point (center of lens) of the camera is set "O," a direction that the camera is directed is set parallel to a direction of the center axis of the camera, which is the vertical axis at the center of the real U map. Further, a position of dividing boundary of an actual width area is at a distance $Z_0$ and a horizontal position $X_0$. In this configuration, when a position of the dividing boundary at the distance Z is set X, a following formula (3) is established.

$$X = X_0 \times (Z/Z_0) \quad (3)$$

Further, when "BF," which is a product of the base line length "B" of the stereo camera and the focal distance "F" is set, disparity "$d_0$" corresponding to the distance $Z_0$, disparity "d" corresponding to the distance Z, are set, and disparity at infinity is set "offset," the above formula (3) can be converted to a following formula (4) using "Z=BF/(d−offset)" and "$Z_0$=BF/($d_0$−offset)."

$$X = X_0 \times (d_0 - \text{offset})/(d - \text{offset}) \quad (4)$$

Since a relationship of the disparity value "d" and the thinned disparity on the real U map is known, the position of the dividing boundary in the isolated area can be determined using all of the thinned disparity values by using the formula (4). FIG. 42D illustrates a result that indicates "portions having positions where frequency values are updated and divided." The frequency values of these portions are updated to zero (0) when the sequence proceeds to step S114 after step S122 of FIG. 35.

With this configuration, an object area of the near-side ahead vehicle and an object area of the far-side ahead vehicle can be divided. As above described, the movement direction divider 12d2 of the isolated area divider 12d can divide one connected isolated areas into two or more isolated areas based on the frequency profile in the isolated area. Further, an area that is longer in the vertical direction at the lower left in the isolated area can be divided, but since this lower-left area has a small width, the lower-left area can be processed as noise.

FIG. 42 illustrates a case that the ahead vehicles are running on the next lane at the left-side. If the ahead vehicles are running on the next lane at the right-side, the real frequency U map of the isolated area can be generated by inverting the left-side and the right-side of the real frequency U map of FIG. 42.

(Detection of Disparity-Image Corresponding Area, Extraction of Object Area)

Figure 45:
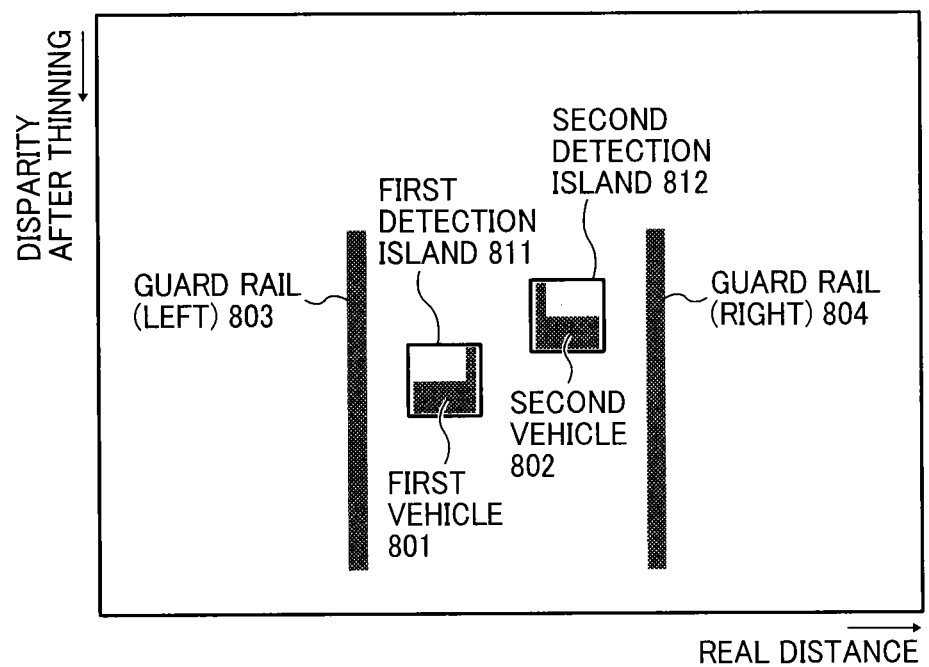
FIG. 45 is a real frequency U map setting a rectangle area inscribed by an isolated area registered as an object candidate area by an object candidate area detection unit.
Figure 46:
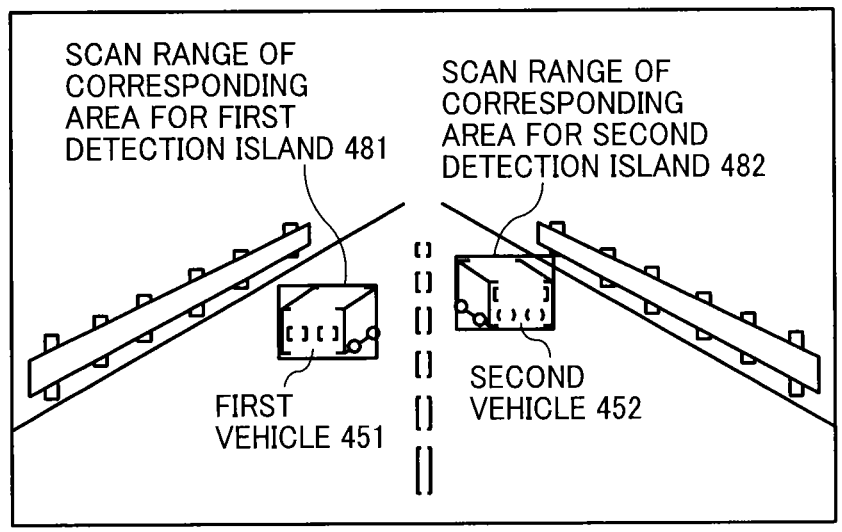
FIG. 46 is a disparity image set with a scan range corresponding to the rectangle area in FIG. 45.
Figure 47:
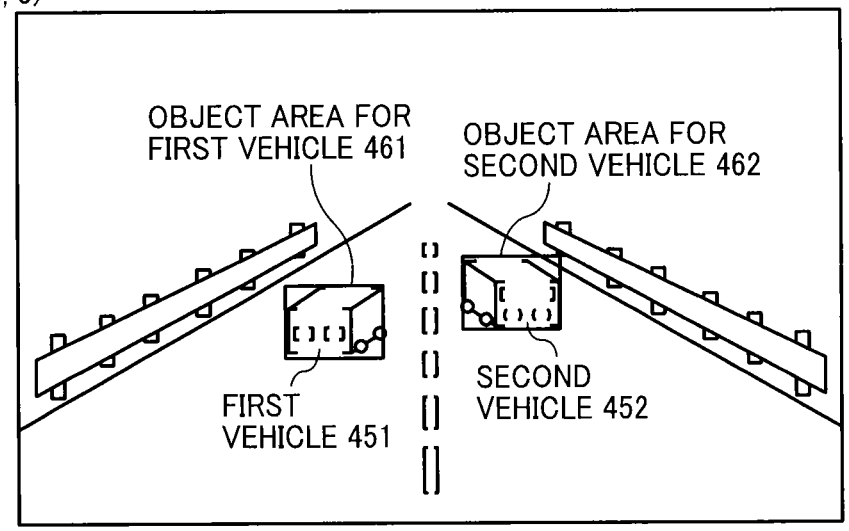
FIG. 47 is a disparity image set with an object area after searching a scan range in FIG. 46.

A description is given of a disparity-image corresponding area detection unit 140 and an object area extraction unit 141, which may correspond to the object detector 13 of FIG. 29. FIG. 45 is a real frequency U map setting a rectangle area inscribed by an isolated area registered as an object candidate area by the object candidate area detection unit 139. FIG. 46 is a disparity image set with a scan range corresponding to the rectangle area in FIG. 45. FIG. 47 is a disparity image set with an object area after searching the scan range in FIG. 46.

As to the isolated area registered as the object candidate area by the object candidate area detection unit 139, as illustrated in FIG. 45, a rectangle area inscribed by an isolated area is set. For example, rectangle areas such as a first detection island 811 and a second detection island 812 respectively inscribed by concerned isolated areas such as a first vehicle 801 and a second vehicle 802 are set, in which a width of the rectangle area (length in X-axis direction on U map) corresponds to a width of a target object corresponding to the concerned isolated area. Further, a height of the rectangle area corresponds to a depth of the target object (length in the moving direction of the vehicle 100) corresponding to the concerned isolated area while the height of the target object corresponding to each isolated area is not determined yet at this stage. To obtain the height of the object corresponding to the isolated area for an object candidate area, the disparity-image corresponding area detection unit 140 detects a corresponding area on the disparity image, which corresponds to the concerned isolated area.

Based on information of the isolated area output from the object candidate area detection unit 139 (i.e., isolated area registered as the object candidate area) such as the position, width, and minimum disparity of the first detection island 811 and the second detection island 812 detected from the real U map, the disparity-image corresponding area detection unit 140 can determine a X-axis direction range (e.g., xmin and xmax) for a scan range of a corresponding area for a first detection island 481, and a scan range of a corresponding area for a second detection island 482, in which the scan range is to be detected on the disparity image of FIG. 46, Further, the disparity-image corresponding area detection unit 140 can determine the height and position of an object in the disparity image, wherein the position of the object is a difference of the y coordinate "ymin" and "ymax," wherein "ymin" corresponds to a maximum height from the road face for the maximum disparity "dmax," and "ymax" corresponds to a height of the road face obtained for the maximum disparity "dmax."

Then, to correctly detect positions of the objects, the set scan range is scanned, and pixels having disparity values in a range from the minimum disparity "dmin" to the maximum disparity "dmax," which is the height of the rectangle area inscribed by the isolated area registered by the object candidate area detection unit 139, are extracted as candidate pixels. Then, among the extracted candidate pixels, a line having the candidate pixels with a given ratio or more in the horizontal direction with respect to the detection width is set as a candidate line.

Then, the scanning operation is performed in the vertical direction. If other object candidate lines exist around the concerned object candidate line with a given density or more, the concerned object candidate line is determined as an object line. Then, an object area extraction unit 141 searches the object lines in the search range in the disparity image to determine the lowest end and the highest end of the object lines. Specifically, the object area extraction unit 141 determines circumscribed rectangles 461 and 462 of the object lines as an object area 451 for a first vehicle (i.e., object) and an object area 461 for a second vehicle (i.e., object) in the disparity image as illustrated in FIG. 47.

Figure 48:
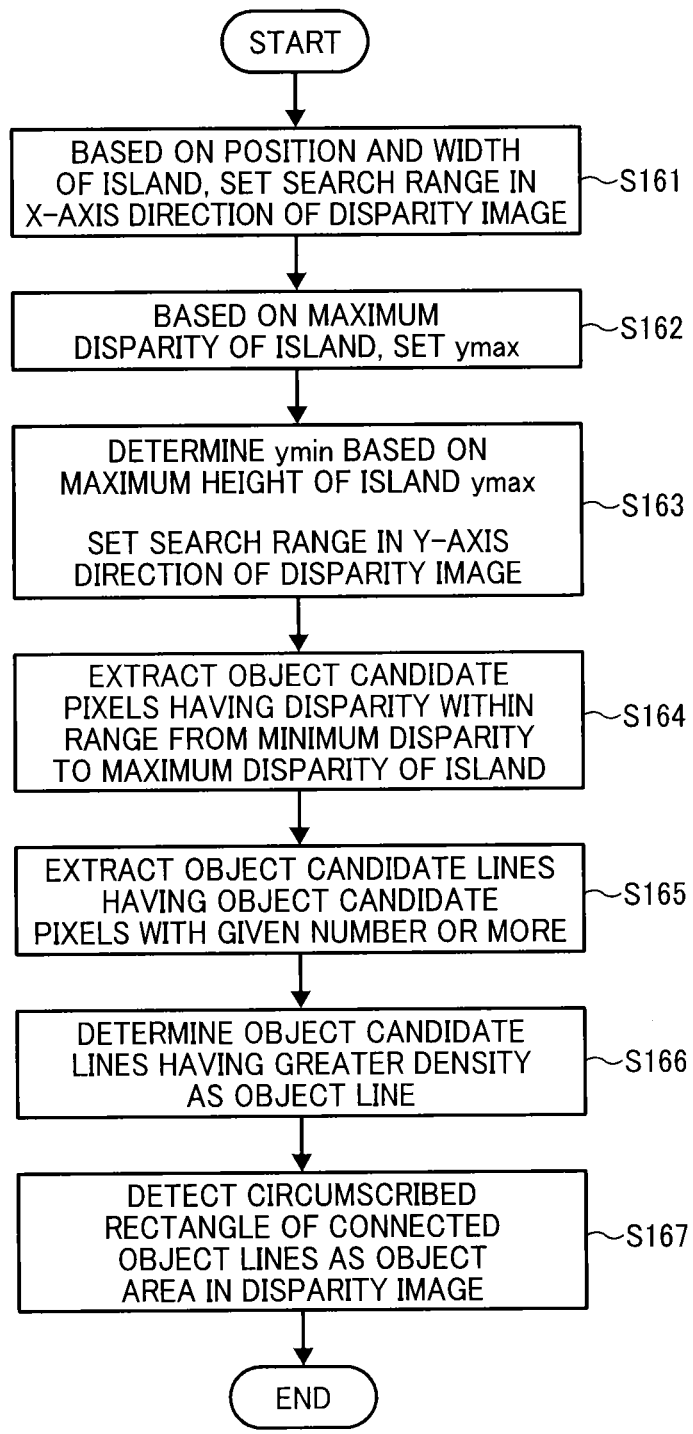
FIG. 48 is a flowchart showing the steps of a process performable by a disparity-image corresponding area detection unit and an object area extraction unit.

FIG. 48 is a flowchart showing the steps of a process performable by the disparity-image corresponding area detection unit 140 and the object area extraction unit 141. At first, based on the position, width, and minimum disparity of each isolated area (island) on the real U map, a search range in the X-axis direction of the disparity image is set (step S161).

Then, based on a relationship of the maximum disparity "dmax" and the height from the road face of each isolated area (island), a maximum search value "ymax" in the Y-axis direction of the disparity image is set (step S162). Then, a minimum search value "ymin" in the Y-axis direction of the disparity image is computed and set based on the maximum height of the isolated area (island) in the real height U map, the "ymax" set at step S162, and the dmax so as to set a search range in the Y-axis direction in the disparity image (step S163).

Then, the disparity image is searched in the set search range to extract pixels existing in the range from the minimum disparity "dmin" to the maximum disparity "dmax" in the concerned isolated area (island), and the extracted pixels are used as object candidate pixels (step S164). Then, if a given number or more of the object candidate pixels exist on a line in the horizontal direction, the line is extracted as a candidate object line (step S165).

Then, the density of the candidate object lines is computed. If the computed density of the candidate object lines is greater than a given value, the candidate object lines can be determined as object lines (step S166). Then, a circumscribed rectangle circumscribing a group of the determined object lines is detected as an object area in the disparity image (step S167).

(Classification of Object Type)

A description is given of an object type classification unit 142. Based on the height of the object area ("yomax–yomin") extracted by the object area extraction unit 141, an actual height Ho of a target object displayed in an image area corresponding to the object area can be computed using the following formula (5), in which "zo" is a distance between the vehicle 100 and an object corresponding to the concerned object area, which is computed from the minimum disparity value "dmin" of the concerned object area, and "f" is a value obtained by converting the unit of focal distance of the camera to the same unit of "yomax–yomin."

$$Ho = zo \times (yomax - yomin)/f \quad (5)$$

Similarly, based on the width of the object area (xomax–xomin) extracted by the object area extraction unit 141, an actual width Wo of the target object displayed in an image area corresponding to the concerned object area can be computed using a following formula (6).

$$Wo = zo \times (xomax - xomin)/f \quad (6)$$

Further, based on the maximum disparity "dmax" and the minimum disparity "dmin" in the isolated area corresponding to the concerned object area, a depth "Do" of the target object displayed in the image area corresponding to the concerned object area can be computed using the following formula (7).

$$Do = BF \times (1/(dmin - offset) - 1/(dmax - offset)) \quad (7)$$

Figures 49, 50:
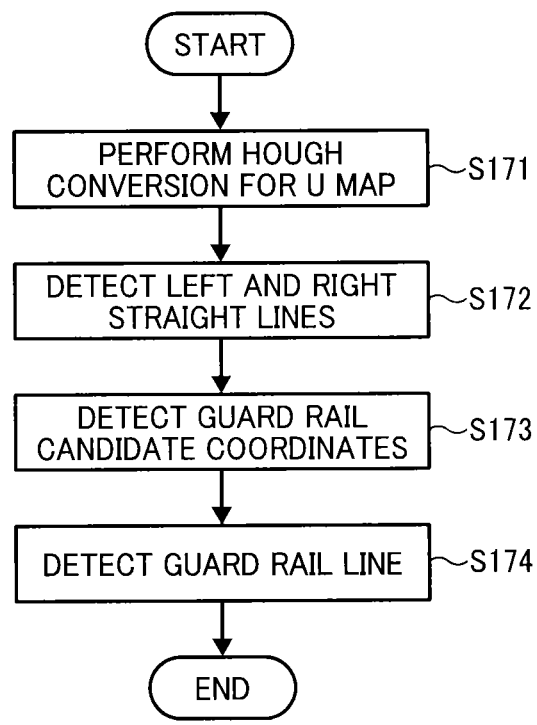
FIG. 49 is an example of table data used for classification of object type.
FIG. 50 is a flowchart showing the steps of a process of detecting a guard rail performable by a guard rail detection unit.

Based on the height, width, and depth information of the object corresponding to the object area computable by the above described processing, the object type classification unit 142 performs the classification of object type. FIG. 49 is an example of table data used for classification of object type. With this table, types of target objects such as pedestrians, bicycles, small cars, or trucks existing ahead of the vehicle 100 can be detected or identified separately.

(Determination of Three Dimensional Position)

A description is given of a three dimensional position determination unit 143. Since a distance to an object corresponding to a detected object area, and a distance between the image center of disparity image and the center of an object area on the disparity image can be determined, a three dimensional position of the object can be determined.

When the center coordinate of the object area on the disparity image is defined as (region_centerX, region_centerY), and the image center coordinate of the disparity image is defined as (image_centerX, image_centerY), a relative horizontal direction position and a relative height direction position of the target object with respect to the first capturing unit 110A and the second capturing unit 110B can be computed using the following formulas (8) and (9).

$$Xo = Z \times (region\_centerX - image\_centerX)/f \quad (8)$$

$$Yo = Z \times (region\_centerY - image\_centerY)/f \quad (9)$$

(Detection of Guard Rail)

Figure 51:
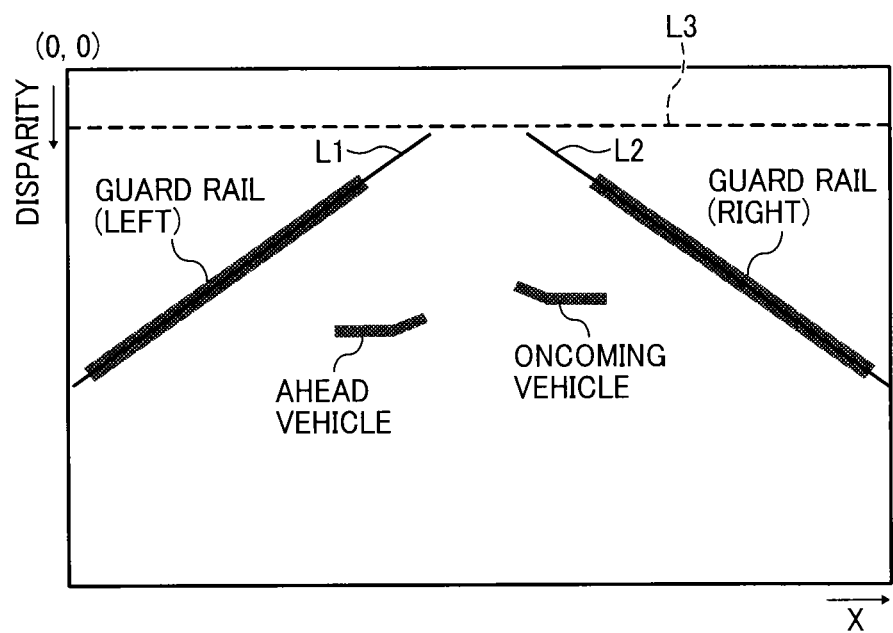
FIG. 51 is a U map showing approximated straight lines obtained by performing an approximation process of straight line to a target area used for a guard rail detection.
Figure 52:
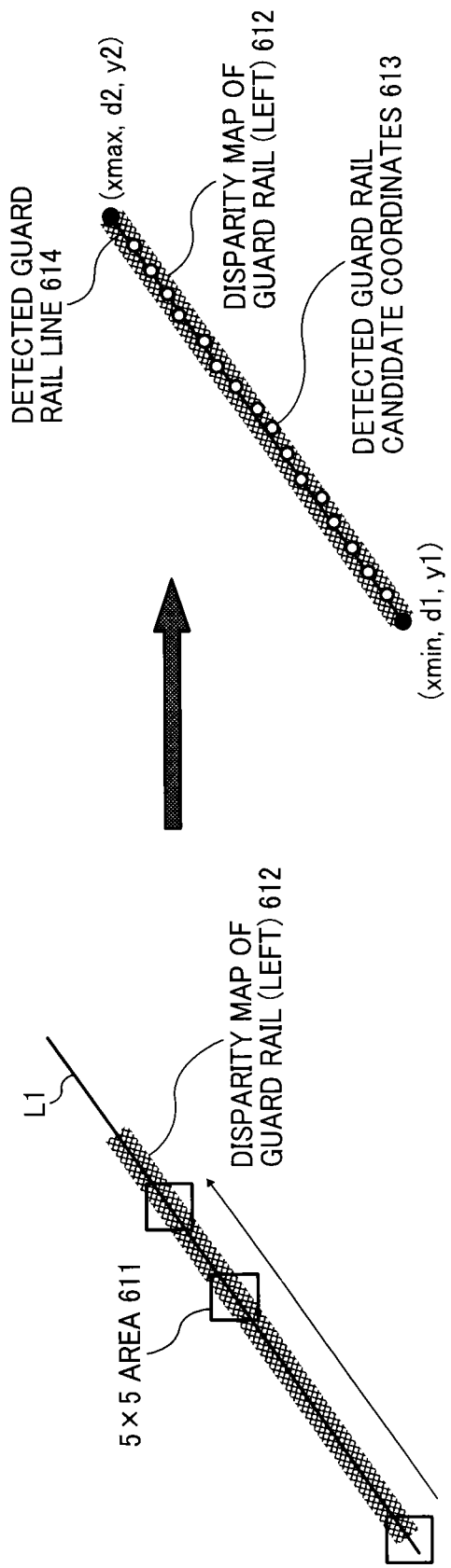
FIG. 52 is a chart for explaining a process of detecting guard rail candidate coordinates based on a straight line obtained by performing an approximation process of straight line.

A description is given of a unit 144. FIG. 50 is a flowchart showing the steps of a detection process of guard rail performable by the guard rail detection unit 144. FIG. 51 is a U map showing approximated straight lines obtained by performing the approximation process of straight line to a target area used for the guard rail detection. FIG. 52 illustrates a chart explaining a process of detecting guard rail candidate coordinates based on a straight line obtained by performing the approximation process of straight line.

Typically, side walls and guard rails existing at sides of road faces may exist in a height range of 30 cm to 100 cm from the road faces. Therefore, an area in the U map corresponding to the height range of 30 cm to 100 is selected as a target area of the guard rail detection process. Then, weighting is performed for frequency on the U map for this target area, and Hough conversion is performed (step S171), with which approximated straight lines L1 and L2 illustrated in FIG. 51 are detected (step S172). As to the end points of the approximated straight lines L1 and L2, an end point having a greater disparity is used as image boundary, and an end point having a smaller disparity may correspond to a disparity value corresponding to a distance of, for example, 30 m, which can be obtained by distance conversion. Further, if no straight lines are detected by Hough conversion, guard rails are not detected.

Upon obtaining the approximated straight line as above described, a plurality of areas 611 (e.g., 5×5 area) are set on and around the approximated straight line as illustrated in FIG. 52, in which the center of the area 611 is positioned at a coordinate on the approximated straight line. Frequency is detected for each of areas 611, and coordinate positions having a total of frequency values exceeding a given threshold are detected as guard rail candidate coordinates 613 (step S173). If an interval between the detected guard rail candidate coordinates 613 is a given distance or less, these guard rail candidate coordinates 613 are connected and determined as a guard rail line 614 (step S174).

Then, disparity values d1 and d2 respectively corresponding to a minimum X coordinate "xgmin" and a maximum X coordinate "xgmax" of the above obtained guard rail line 614 can be computed based on the formula of the detected approximated straight line. In this process, based on the approximated straight line for "y" and "d" computed by the above described road face shape detection unit 136, road face coordinates (y1, y2) at the disparity d1 and d2 can be determined. Since the height of guard rail is set in a range of, for example, 30 cm to 1 m from the road face, the height of guard rail on the disparity image can be determined as yg1_30, yg1_100, yg2_30, and yg2_100 by applying the above formula (2).

Figure 53:
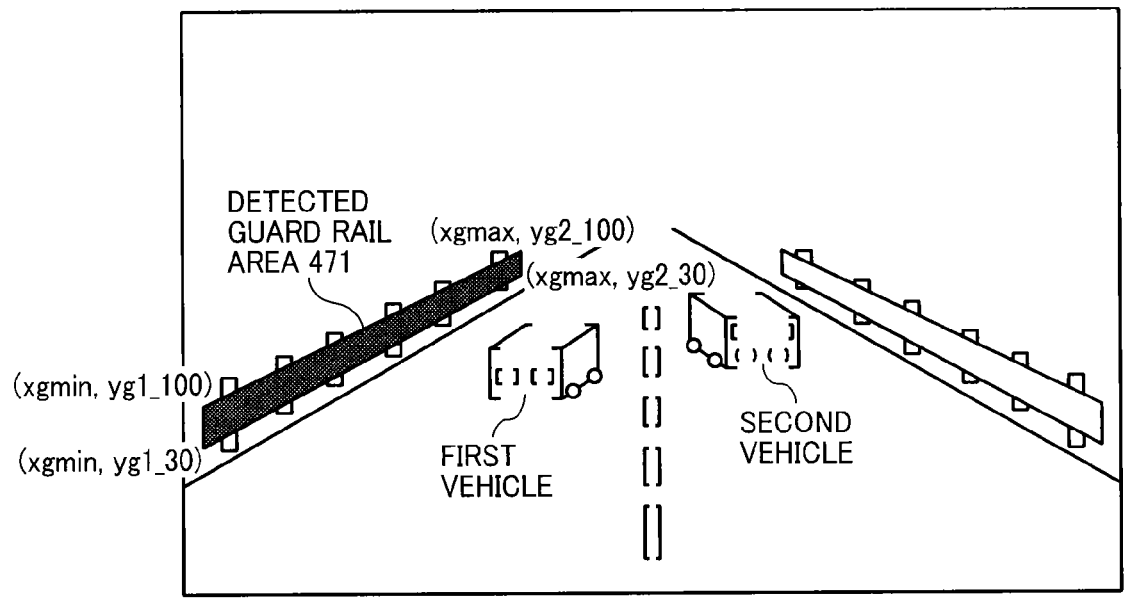
FIG. 53 is an example of a disparity image superimposing a guard rail area, detected by a guard rail detection unit, on the disparity image of FIG. 17.

FIG. 53 is an example of a disparity image superimposing a guard rail area 471, detected by the guard rail detection unit 144, on the disparity image of FIG. 17. The guard rail area 471 on the disparity image corresponds to an area encircled by four points of (xgmin, yg1_30), (xgmin, yg1_100), (xgmax, yg2_100), and (xgmax_yg2_30) indicated as a meshed area in FIG. 53. FIG. 53 illustrates the guard rail area for the guard rail at the left side. Similarly, the guard rail area can be detected for the guard rail at the right side.

(Vanishing Point Information)

A description is given of vanishing point information used for the processing by the V map generation unit 134. The vanishing point information indicates a coordinate position on an image corresponding to a vanishing point of the road face. The vanishing point information can be identified using a white line on a road face displayed on a captured image and vehicle operation information.

Figure 54:
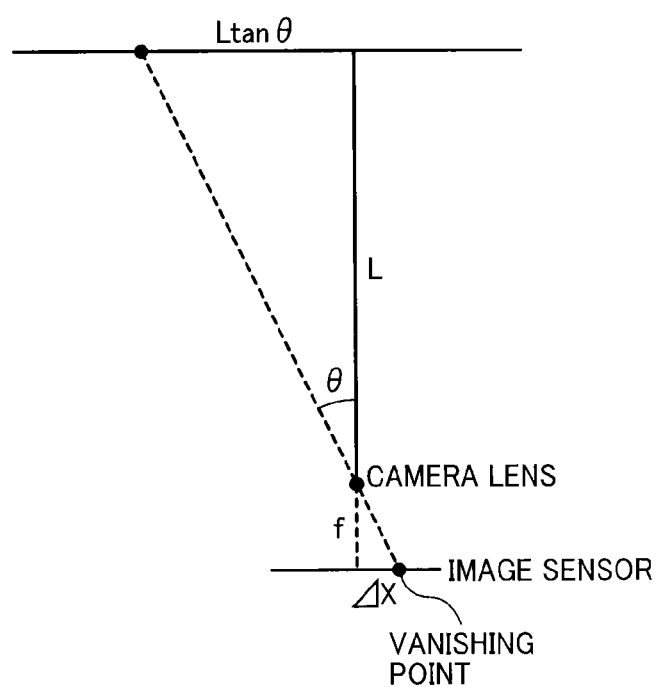
FIG. 54 is the principal of detection of image left-right direction position Vx of a vanishing point based on a rudder angle of a front wheel of a vehicle.
Figure 55:
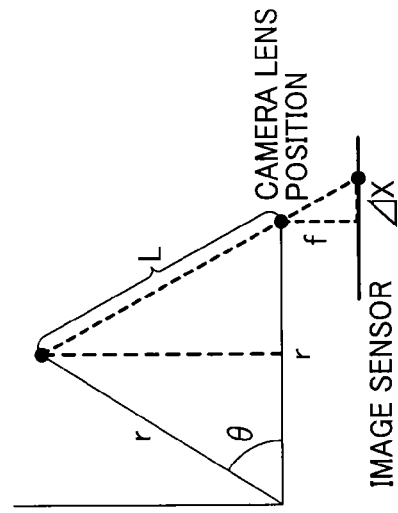
FIG. 55 is the principal of detecting an image left-right direction position Vx of a vanishing point based on yaw rate and vehicle speed of a vehicle.
Figure 56:
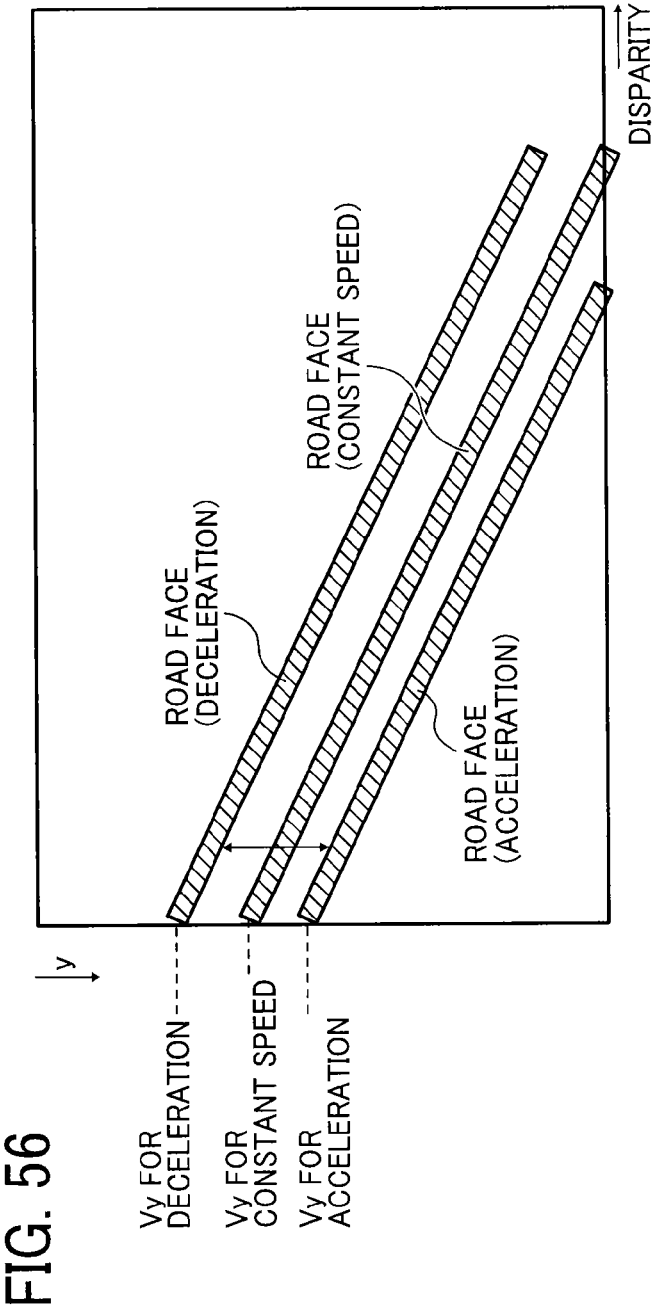
FIG. 56 is a change of an image upper-lower direction position Vy of a vanishing point when a vehicle increases speed or decreases speed.

FIG. 54 is the principal of detecting an image left-right direction position Vx of a vanishing point based on a rudder angle of a front wheel of the vehicle 100. FIG. 55 is the principal of detecting an image left-right direction position Vx of a vanishing point based on yaw rate (angular velocity) and vehicle speed of the vehicle 100. FIG. 56 is a change of an image upper-lower direction position Vy of a vanishing point when the vehicle 100 increases speed (acceleration) or decreases speed (deceleration).

For example, if a rudder angle θ of a front wheel of the vehicle 100 can be acquired as the vehicle operation information, as illustrated in FIG. 54, based on the rudder angle θ, an image left-right direction position Vx of the vanishing point can be detected. At a position distanced from a camera lens for a distance L, a positional deviation amount in a horizontal direction from the camera can be computed as "L×tan θ." Therefore, a positional deviation amount Δx on an image sensor in the horizontal direction can be computed using the following formula (10), wherein "f" is a focal distance of camera, and "pixelsize" is a pixel size of the image sensor. When the size of the image sensor in the X direction is defined as "xsize," the x coordinate "Vx" of the vanishing point can be computed using the following formula (10) and formula (11).

$$\Delta x = f \times \tan \theta / \text{pixelsize} \tag{10}$$

$$Vx = xsize/2 + \Delta x \tag{11}$$

Further, for example, if yaw rate (angular velocity) "ω" and vehicle speed "v" of the vehicle 100 can be acquired as the vehicle operation information, as illustrated in FIG. 55, the image left-right direction position Vx of the vanishing point can be detected using the yaw rate "ω" and the vehicle speed "v." A positional deviation amount in the horizontal direction, which may occur when the vehicle 100 moves for the distance L, becomes "1−cos θ" based on a rotation radius "r (r=L/θ)" and rotation angle "θ" of the vehicle 100. Therefore, a positional deviation amount Δx on the image sensor in the horizontal direction can be computed using the following formula (12). By using Δx obtained by the formula (12), the x coordinate Vx of the vanishing point can be computed using the above formula (11), in which the distance L is set, for example, 100 m.

$$\Delta x = \pm (1 - \cos \theta) \times f \times r / L / \text{pixelsize} \tag{12}$$

If the x coordinate Vx of the vanishing point, determined by the above process, indicates that the x coordinate Vx is outside the image, the x coordinate Vx of the vanishing point information is set as an end of image.

Further, the y coordinate Vy of the vanishing point can be obtained from the intercept of approximated straight line of the road face obtained by the previous processing. The y coordinate Vy of the vanishing point corresponds to the intercept of approximated straight line of the road face obtained by the above described processing on the V map. Therefore, the intercept of approximated straight line of the road face obtained by the previous processing can be determined as the y coordinate Vy of the vanishing point.

However, when the vehicle 100 is in the acceleration by increasing speed, the weight is loaded to the rear side of the vehicle 100, and the vehicle 100 has an attitude that a front side of the vehicle 100 is directed to an upward in the vertical direction. With this attitude change, compared to an approximated straight line of the road face when the speed of the vehicle 100 is constant, an approximated straight line of the road face when the vehicle 100 in the acceleration is shifted to a lower part of the V map as illustrated in FIG. 56. By contrast, compared to the approximated straight line of the road face when the speed of the vehicle 100 is constant, an approximated straight line of the road face when the vehicle 100 in the deceleration is shifted to an upper part of the V map as illustrated in FIG. 56. Therefore, the y coordinate Vy of the vanishing point is preferably determined by correcting the intercept of approximated straight line of the road face obtained by the previous processing using the vehicle operation information such as information of acceleration/deceleration in the front and rear direction of the vehicle 100.

VARIANT EXAMPLE 1

A description is given of a variant example of processing of the above described example embodiment (hereinafter, variant example 1). In the above described example embodiment, the height change of road face along the movement direction of vehicle (e.g., slope along the movement direction of vehicle) be detected, but the height change of road face along the width direction of road face (e.g., slope along the width direction of the road face) cannot be detected. The variant example 1 describes a configuration that can detect the slope along the width direction of the road face.

Figure 57:
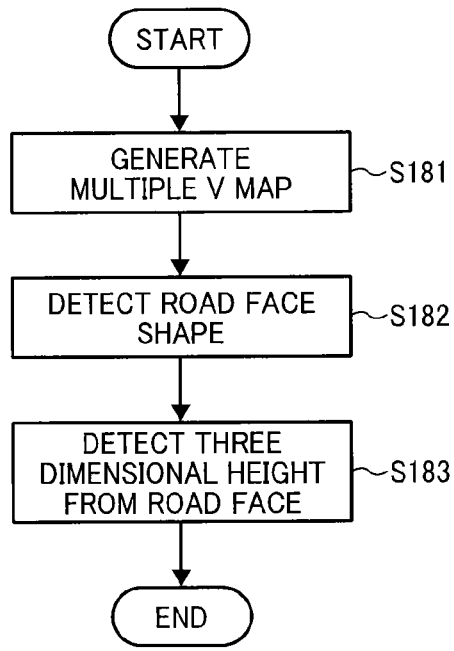
FIG. 57 is a flowchart showing the steps of a process of a variant example 1.
Figure 58:
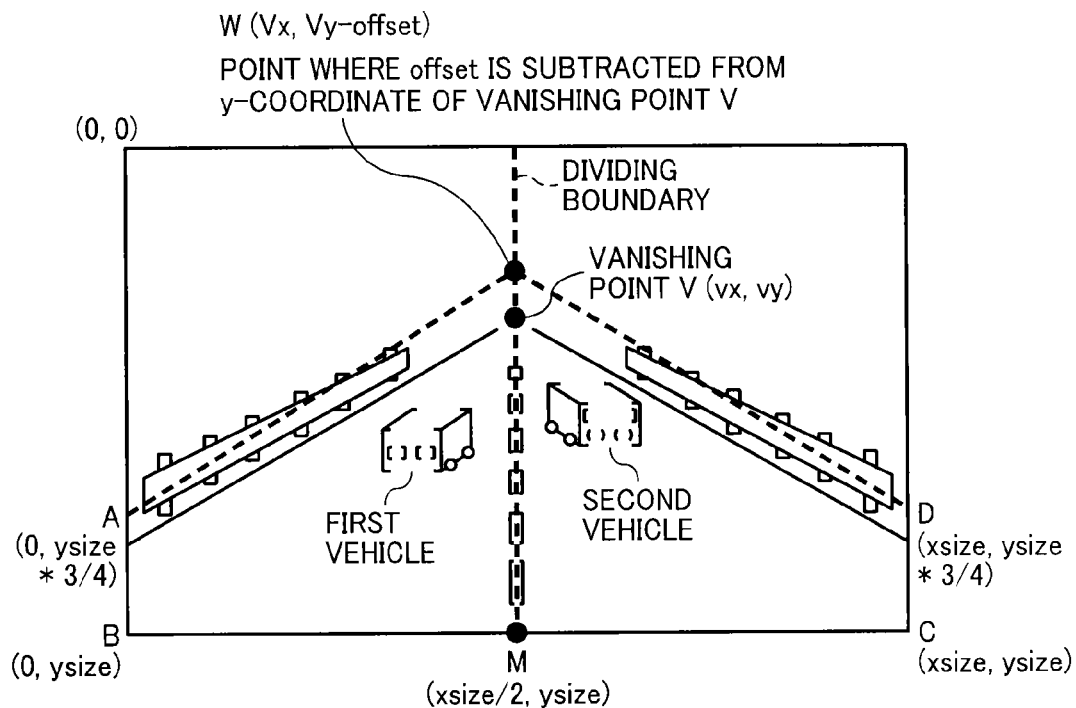
FIG. 58 is a disparity image divided into two areas, in which a straight line connecting a vanishing point of road face and the lowest-center point of the disparity image is used as a boundary to divide the disparity image into two areas.
Figure 59:
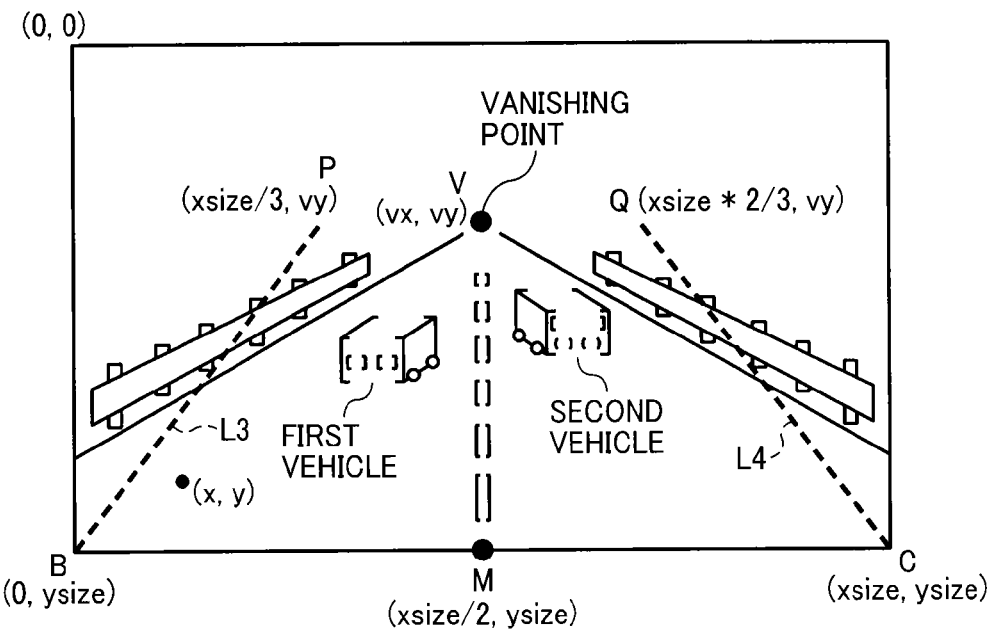
FIG. 59 is a disparity image set with a straight line L3 connecting a lowest-left corner point of a disparity image and a point having the same y coordinate of a vanishing point, and a straight line L4 connecting a lowest-right corner point of the disparity image and a point having the same y coordinate of the vanishing point V.
Figure 60:
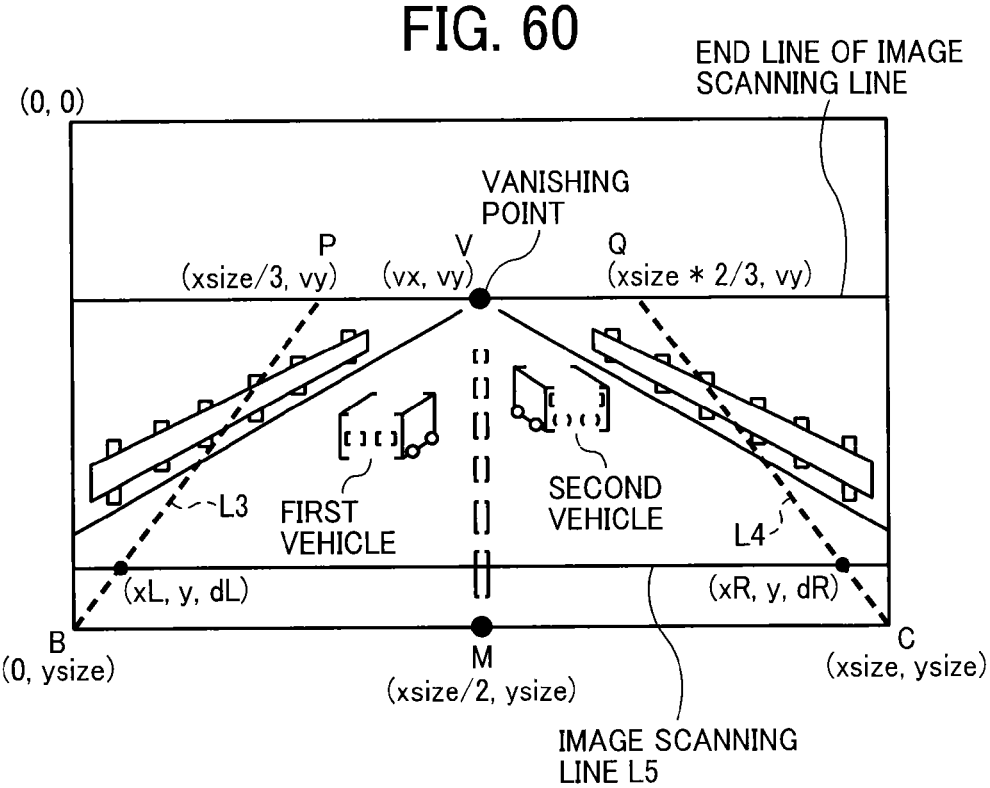
FIG. 60 is a disparity image set with an image scanning line L5 on the disparity image of FIG. 59.
Figure 61:
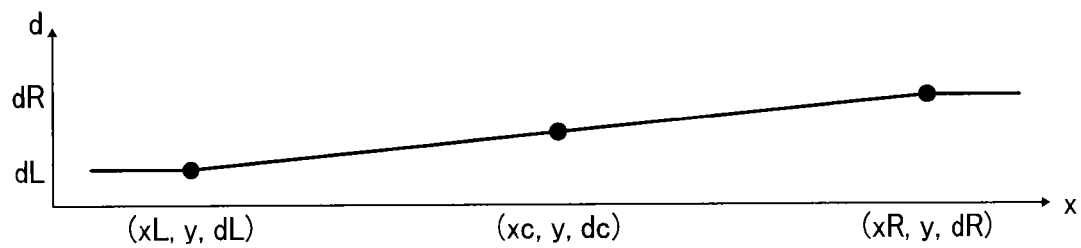
FIG. 61 is a disparity profile generated by performing a linear interpolation of disparity on an image scanning line L5 between intersection points of the image scanning line L5 and straight lines L3 and L4, and on the image scanning line L5 outside the intersection points.

FIG. 57 is a flowchart showing the steps of a process of the variant example 1. FIG. 58 is a disparity image divided into two areas such as a left area and a right area, in which a straight line connecting the vanishing point V of the road face and the lowest-center point M of the disparity image is used as a boundary to divide the disparity image into the two areas. FIG. 59 is a disparity image set with a straight line L3 connecting a lowest-left corner point B of the disparity image and a point P having the same y coordinate of the vanishing point V, and a straight line L4 connecting a lowest-right corner point C of the disparity image and a point Q having the same y coordinate of the vanishing point V. FIG. 60 is a disparity image set with an image scanning line L5 on the disparity image of FIG. 59. FIG. 61 is a disparity profile generated by performing a linear interpolation of disparity on the image scanning line L5 between intersection points of the image scanning line L5 and the straight lines L3 and L4, and on the image scanning line L5 outside the intersection points.

In the variant example 1, similar to the above described example embodiment, as illustrated in FIG. 58, a given offset value is subtracted from the image upper-lower direction position Vy of the vanishing point (Vx, Vy), which is the vanishing point of the road face, to set a point W having the image upper-lower direction position (Vy−offset). Then, an area encircled by points A, B, C, D and W is set as illustrated in FIG. 58. Then, as illustrated in FIG. 58, by using a straight line connecting the vanishing point of road face (Vx, Vy) and the center of lowest end M (xsize/2, ysize) of the disparity image as a boundary on the disparity image, the area encircled by the points W, A, B, C, D is divided into a left area encircled by the points W, A, B, M, and a right area encircled by the points W, M, C, D, and each of the left area and right area is set as a road face image candidate area. Then, a V map is generated for each of the road face image candidate areas by applying the above described method separately (step S181). In this process, the disparity image is divided into a plurality of road face image candidate areas, and the V map is generated separately for each of the road face image candidate areas, wherein each V map is referred to as a partial V map. When a plurality of partial V maps is combined, such combined V map may be referred to as a multiple V map.

Then, based on the partial V map for each of the areas, an approximated straight line corresponding to the road face is obtained for each of the area using the above described method. Further, as illustrated in FIG. 59, the straight line L3 connecting the point B (0, ysize) and the point P (xsize/3, Vy) having the same y coordinate of the vanishing point V (Vx, Vy) is generated. Further, the straight line L4 connecting the point C (xsize, ysize) and the point Q (xsize×2/3, Vy) having the same y coordinate of the vanishing point V (Vx, Vy) is generated. Then, points (x, y) on each straight line are related to points (y, d) on the approximated straight line obtained for the each of left area and right area to generate a relationship of (x, y, d) (step S182). With this configuration, the height of the straight lines L3 and L4 from the road face illustrated in FIG. 59 can be determined (step S183).

If the X coordinate of points P and Q is set at the same "x" coordinate of the vanishing point V, when a height of the point P from the road face and a height of the point Q from the road face are different, the height from the road face may change abruptly at the points P and Q, and thereby error may occur. Further, if the X direction distance between the points P and Q is set too far, it may not match to an actual condition of a road face having a feature that the road face becomes narrower as farther away from the vehicle 100 in the image. In view of such issues, in the variant example 1, for example, the X coordinate of point P is set to "xsize/3" and the X coordinate of point Q is set to "xsize×2/3."

Then, the height of the road face at a portion other than the straight lines L3 and L4 illustrated in FIG. 59 is determined. As illustrated in FIG. 60, one image scanning line L5, which is a line along X-axis direction in the disparity image, is set. An intersection point of the image scanning line L5 and the straight line L3 (left side) is set as (xL, y, dL), and an intersection point of the image scanning line L5 and the straight line L4 (right left side) is set as (xR, y, dR). Disparity values on the image scanning line L5 between the two intersection points are linear interpolated as illustrated in FIG. 61, and disparity values outside the left intersection point and right intersection point on the image scanning line L5 are respectively assigned with the disparity value dR at the right intersection point, and the disparity value dL at left intersection point. With this configuration, even if the road face is inclined along the width direction of the road face, the road face shape having such inclination can be detected (steps S172 and S173). Further, a scanning start end of the image scanning line L5 is a line connecting the point B and point C, and a scanning complete end of the image scanning line L5 is a line connecting the point P and point Q.

VARIANT EXAMPLE 2

A description is given of further other variant example (hereinafter, variant example 2) of the example embodiment. As to actual road faces, some road faces have a semicircular shape, in which the center portion in the width direction of road face is set higher than other portions to drain water from the road face effectively. This inclination in the width direction of the road face can be detected with enhanced precision by using the variant example 2.

Figure 62:
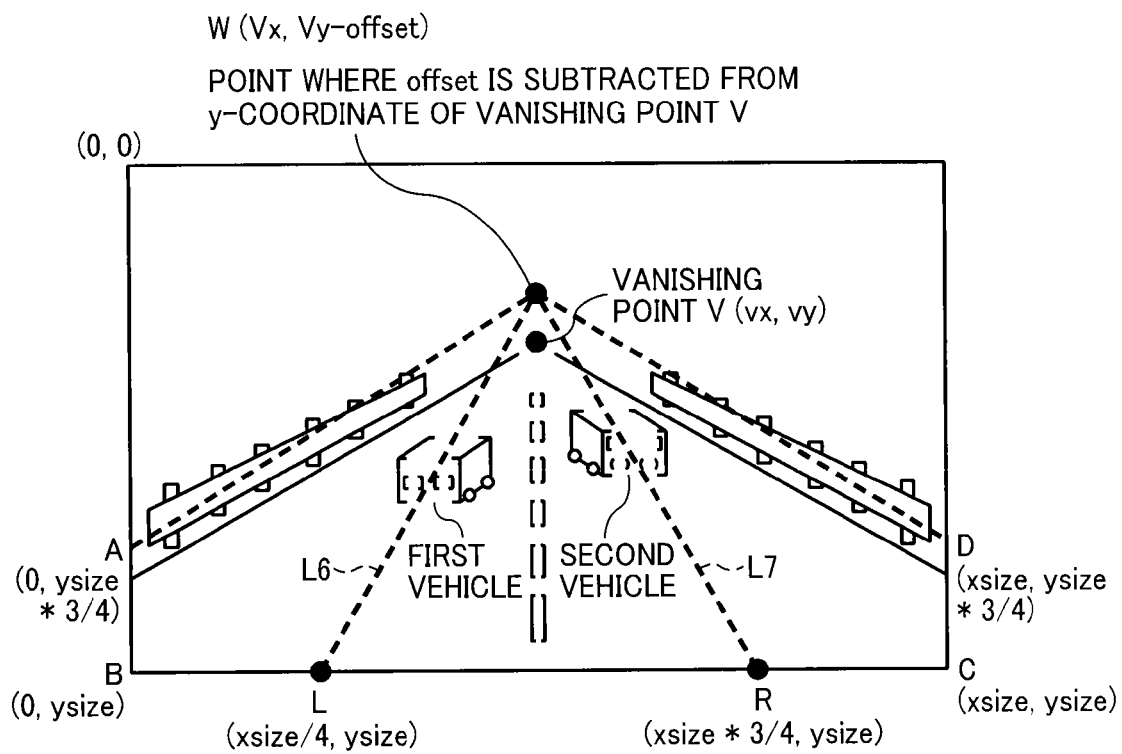
FIG. 62 is a disparity image divided into three areas using a straight line L6 connecting a one-fourth (¼) point in the left and a vanishing point of a road face, and a straight line connecting a one-fourth point in the right and the vanishing point of the road face as boundaries in variant example 2.
Figure 63:
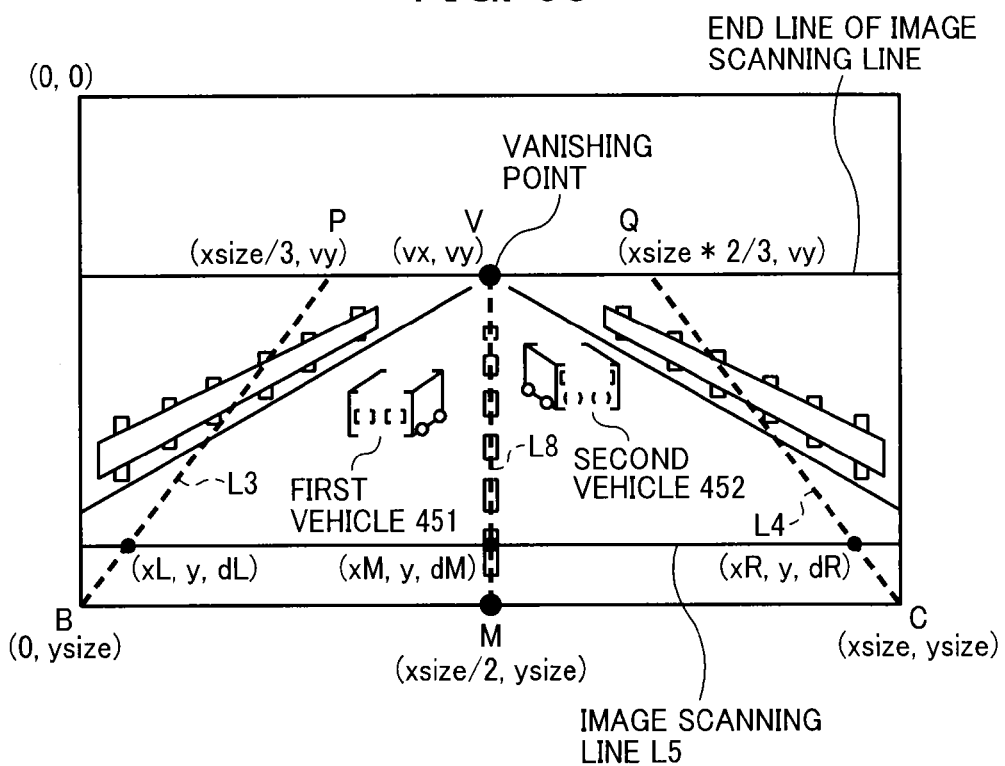
FIG. 63 is a disparity image set with one image scanning line L5 to the disparity image of FIG. 62.
Figure 64:
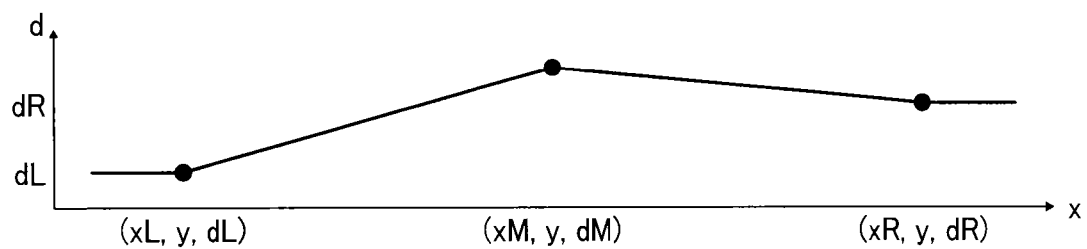
FIG. 64 is a disparity profile generated by performing a linear interpolation of disparity on the image scanning line L5 between intersection points of the image scanning line L5 and three straight lines L3, L4 and L8, and on the image scanning line L5 outside the intersection points.

FIG. 62 is a disparity image divided into three areas using a straight line L6 connecting a one-fourth (¼) point L (xsize/4, ysize) in the left and the vanishing point V of a road face, and a straight line L7 connecting the one-fourth (¼) point R (3/4×xsize, ysize) in the right and the vanishing point V of the road face in the variant example 2. FIG. 63 is a disparity image set with one image scanning line L5 to the disparity image of FIG. 62. FIG. 64 is a disparity profile generated by performing a linear interpolation of disparity on the image scanning line L5 between intersection points of the image scanning line L5 and the three straight lines L3, L4 and L8, and on the image scanning line L5 outside the intersection points.

Specifically, as illustrated in FIG. 62, the lowest end of disparity image is equally divided into four points on the disparity image, in which a point (xsize/4, ysize) corresponding a one-fourth (¼) point among the four points from the left-side bottom, and a point (xsize3/4, ysize) corresponding a one-fourth (¼) point among the four points from the right-side bottom are set. Then, the straight line L6 connecting the one-fourth (¼) point (xsize/4, ysize) in the left and the vanishing point of road face is set, and the straight line L7 connecting the one-fourth (¼) point (3/4×xsize, ysize) in the right and the vanishing point of the road face is set. In the variant example 2, the disparity image is divided into three areas using the straight lines L6 and L7 as boundaries. Specifically, an area encircled by points A, B, C, D and W is set as illustrated in FIG. 62. Then, as illustrated in FIG. 62, by using the straight lines L6 and L7 as boundaries, the area encircled by the points the A, B, C, D and W is divided into three areas such as a left area encircled by the points A, B, L and W, a center area encircled by the points L, R and W, and a right area encircled by the points R, C, D and W, and each of the areas is set as a road face image candidate area. Then, a V map is generated for each of the road face image candidate areas by applying the above described method separately. Then, based on the V map generated for each of the areas, an approximated straight line corresponding to the road face is obtained for each of the areas by applying the above described method.

Further, as illustrated in FIG. 63, similar to the above described variant example 1, in the variant example 2, the straight line L3 connecting the point B (0, ysize) and the point P (xsize/3, Vy) is generated, and the straight line L4 connecting the point C (xsize, ysize) and the point Q (xsize×2/3, Vy) is generated, and further, a straight line L8 connecting the vanishing point V of road face and the lowest-center point M (xsize/2, ysize) of disparity image is newly generated. Then, points (x, y) on each straight line are related to points (y, d) on the approximated straight line obtained for the above described three areas to generate a relationship of (x, y, d). With this configuration, the height of the three straight lines L3, L4, L8 from the road face illustrated in FIG. 63 can be determined.

Then, the height of the road face portion other than the three straight lines L3, L4, L8 illustrated in FIG. 63 is determined. Similar to the above described variant example 1, as illustrated in FIG. 63, one image scanning line L5, which is a line along X-axis direction in the disparity image, is set. An intersection point of the image scanning line L5 and the straight line L3 (left side) is set as (xL, y, dL), an intersection point of the image scanning line L5 and the straight line L4 (right left side) is set as (xR, y, dR), and an intersection point of the image scanning line L5 and the straight line L8 (center) is set as (xM, y, dM). Disparity values on the image scanning line L5 between the intersection points are linear interpolated as illustrated in FIG. 64, and disparity values outside the left intersection point and right intersection point on the image scanning line L5 are respectively assigned with the disparity value dR at the right intersection point, and the disparity value dL at left intersection point. With this configuration, even if the road face has a semicircular shape in the width direction of the road face, the road face shape having such shape can be detected.

Figure 65:
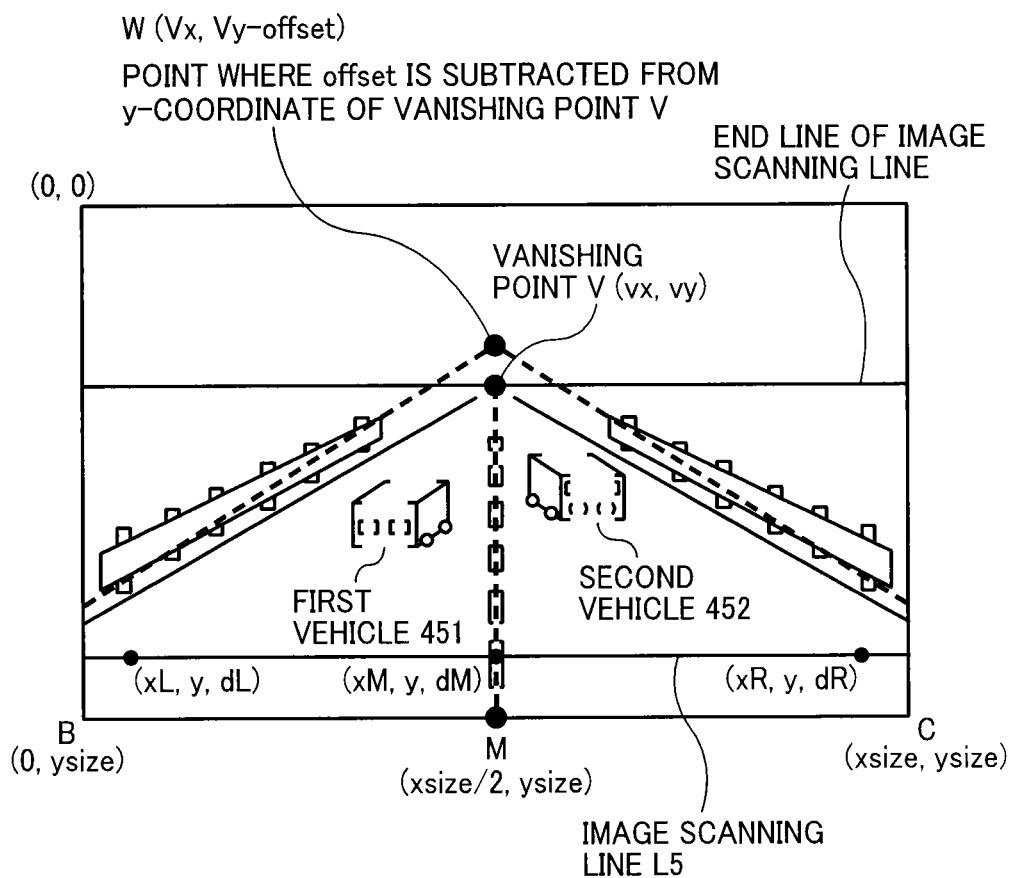
FIG. 65 is a disparity image including straight lines set variably for setting a height from a road face depending on road conditions.

By approximating the height from the road face using the above described three approximated straight lines, the height from the road face can be detected with enhanced precision. The approximated straight lines indicated by dot lines are not the fixed lines but can be set differently depending on road conditions. For example, as illustrated in FIG. 65, the approximated straight lines can be set at the lower end of the guard rail or on the white line, with which the height from the road face in three dimensional space can be detected with enhanced precision.

As to the above described variant examples 1 and 2, a disparity image is divided into two or three areas. By increasing the dividing numbers of disparity image, a road face shape can be detected with higher or enhanced precision.

As to the above described one or more example embodiments, the height from the road face can be detected with higher or enhanced precision, wherein the height from the road face means the uphill and downhill of the road face in the moving direction of a vehicle, and the inclination of the road face along the width direction of the road face. By enhancing the detection precision of the height from the road face, the detection precision of object detectable based on the height from the road face can be enhanced, and the precision of object classification such as pedestrians and other vehicles can be enhanced, with which probability of collisions with other objects can be reduced such as collisions can be averted, with which road safety can be enhanced.

As to the above described one or more example embodiments, based on a plurality of captured images of scenes ahead of a moveable apparatus captured by a plurality of image capturing units mounted to the moveable apparatus and disparity image generated from the captured images, positions and sizes of objects existing in three dimensional space ahead of the moveable apparatus can be detected correctly by preventing connection of disparity values of a plurality of objects. The above described one or more example embodiments can be applied to an object detection apparatus, an object detection method, an object detection program, and a device control system for moveable apparatus.

The present invention can be implemented in any convenient form, for example using dedicated hardware, or a mixture of dedicated hardware and software program. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software program, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic Tape, a hard disk in a server, a solid state memory device or the like, but not limited these. The software program can be distributed by storing the program in a storage medium or carrier medium such as CD-ROM. Further, the program can be distributed by transmitting signals from a given transmission device via a transmission medium such as communication line or network (e.g., public phone line, specific line) and receiving the signals. When transmitting signals, a part of data of the program is transmitted in the transmission medium, which means, entire data of the program is not required to be on in the transmission medium. The signal for transmitting the program is a given carrier wave of data signal including the program. Further, the program can be distributed from a given transmission device by transmitting data of program continually or intermittently.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps.

What is claimed is:

1. An object detection apparatus mountable to a moveable apparatus for detecting an object existing outside the moveable apparatus by capturing a plurality of images using a plurality of imaging devices mounted to the moveable apparatus and generating a disparity image from the captured images, the object detection apparatus comprising:
    a map generator to generate a map indicating a frequency profile of disparity values correlating a horizontal direction distance of the object with respect to a movement direction of the moveable apparatus, and a distance of the movable apparatus to the object in the movement direction of the moveable apparatus based on the disparity image;
    an isolated area detection unit to detect an isolated area based on the frequency profile;
    an isolated area divider to divide the isolated area into two or more isolated areas based on the frequency profile in the isolated area; and
    an object detector to detect an object based on the divided isolated area.

2. The object detection apparatus of claim 1, wherein the isolated area divider includes a movement direction divider that divides the isolated area in the movement direction when a length of the isolated area in the movement direction is greater than a given value.

3. The object detection apparatus of claim 2, wherein the movement direction divider estimates an actual width of the object in the isolated area based on the frequency profile when the length of the isolated area in the movement direction is greater than a length variably settable depending on the distance of the movable apparatus to the object in the movement direction, and the movement direction divider determines a position used for dividing the isolated area based on the actual width and the disparity values of the frequency profile.

4. The object detection apparatus of claim 3, wherein the movement direction divider adds frequency values in the isolated area along the horizontal direction to detect a position in the movement direction corresponding to the maximum value of frequency based on the added frequency values, and estimates the maximum length of frequency connected at the detected position as the actual width of the object.

5. The object detection apparatus of claim 1, wherein the isolated area divider includes a horizontal direction divider that divides the isolated area in the horizontal direction when a length of the isolated area in the horizontal direction is greater than a given value.

6. The object detection apparatus of claim 5, wherein the map generator generates a map indicating a height profile of the disparity values, and the horizontal direction divider adds values of products, obtained by multiplying values of each of points on the real frequency U map and values of each of corresponding points on the real height U map of the isolated area along the movement direction, and determines one or more positions used for dividing the isolated area based on the added values.

7. The object detection apparatus of claim 1, wherein the map generator generates a map indicating a height profile of the disparity values, and the isolated area divider includes a peripheral area excluder that excludes one or more peripheral areas each having a low height in the isolated area.

8. A device control system mountable to a moveable apparatus, comprising;
    the object detection apparatus of claim 1 to detect an object existing outside the moveable apparatus based on a disparity image generated from a plurality of images captured by a plurality of imaging devices mounted to the moveable apparatus; and
    one or more device controllers to control one or more devices mounted to the moveable apparatus based on a result obtained by the object detection apparatus.

9. A method of detecting an object, existing outside a moveable apparatus by capturing a plurality of images using a plurality of imaging devices mounted to the moveable apparatus and generating a disparity image from the captured images, the method comprising the steps of:
    generating a map indicating a frequency profile of disparity values correlating a horizontal direction distance of the object with respect to a movement direction of the moveable apparatus, and a distance to the object in the movement direction of the moveable apparatus based on the disparity image;
    detecting an isolated area based on the frequency profile;
    dividing the isolated area into two or more isolated areas based on the frequency profile in the isolated area; and
    detecting an object based on the divided isolated area.

10. A non-transitory computer-readable storage medium storing a program that, when executed by a computer, causes the computer to execute a method of detecting an object, existing outside a moveable apparatus by capturing a plurality of images using a plurality of imaging devices mounted to the moveable apparatus and generating a disparity image from the captured images, the method comprising the steps of:
    generating a map indicating a frequency profile of disparity values correlating a horizontal direction distance of the object with respect to a movement direction of the moveable apparatus, and a distance to the object in the movement direction of the moveable apparatus based on the disparity image;

detecting an isolated area based on the frequency profile;
dividing the isolated area into two or more isolated areas based on the frequency profile in the isolated area; and
detecting an object based on the divided isolated area.

* * * * *